United States Patent [19]

Alliston et al.

[11] 3,916,445

[45] Oct. 28, 1975

[54] TRAINING SIMULATOR FOR NUCLEAR POWER PLANT REACTOR COOLANT SYSTEM AND METHOD

[75] Inventors: William H. Alliston, Murrysville, Pa.; Adewunmi A. Desalu, Cambridge, Mass.

[73] Assignee: Westinghouse Electric Corporation, Pittsburgh, Pa.

[22] Filed: Feb. 23, 1973

[21] Appl. No.: 335,294

[52] U.S. Cl. .......................... 444/1; 176/19; 35/13
[51] Int. Cl. ..... G06f 15/06; G06f 15/56; G06b 9/00
[58] Field of Search ........... 444/1; 235/184; 176/19, 176/24; 35/10, 13, 2

[56] References Cited
UNITED STATES PATENTS

| 3,061,945 | 1/1962 | Hawkins | 35/10 |
| 3,237,318 | 3/1966 | Schager | 35/10 |

OTHER PUBLICATIONS

Reactor Simulator Tuilizing A Vacuum; Harry Reese, Jr.; RCA Technical Notes, RCA TN. No.: 493, Sept. 1961.

Dynamic Simulation of a Fast Reactor; R. G. Olson, Nucleonics, May, 1957; pp. 76–79.

An Electronic Reactor Simulator; Ross Cameron & D. A. Austio; Nuclear Power; Apr., 1957; pp. 146–151.

PWR Training Simulator; J. P. Franz & W. H. Alliston; Nucleonics, May, 1957; pp. 80–83.

*Primary Examiner*—Malcolm A. Morrison
*Assistant Examiner*—Edward J. Wise
*Attorney, Agent, or Firm*—H. W. Patterson

[57] ABSTRACT

A method and system for simulating the dynamic real-time operation of a nuclear power plant wherein a plurality of remote control devices provide input data to a digital computer to calculate physical values corresponding to plant operation to operate indicating devices for monitoring the physical operation of the plant. The simulation includes the dynamic operation of the reactor coolant loops for normal, reverse, and natural coolant flow and corresponding heat transfer; also the simulation of the pressurizer in its solid, bubble, and transitional states together with its interaction with the reactor coolant loops.

28 Claims, 33 Drawing Figures

| FIG.92A<br>SICV,BACBZZ,<br>AUMNCS | FIG.92C<br>CHCV,AUMNCS,<br>BACBZZ | FIG.92E | FIG.92G | FIG.92I<br>AUMNCS | FIG.92K | FIG.92M<br>RCS1,2 |
|---|---|---|---|---|---|---|
| FIG.92B<br>SICV,BACBZZ,<br>BRCV,EXCV | FIG.92D<br>EXCV,BACBZZ,<br>DWCV,CHCV,SICV | FIG.92F<br>BACBZZ,DWCV,<br>CHCV | FIG.92H | FIG.92J<br>PTCV,RCCV1 | FIG.92L<br>RCCV1,EXCV,<br>RCS1,2,CHCV | |
| | | | | FIG.92N | | |

| | | | | | | | |
|---|---|---|---|---|---|---|---|
| | | | | | ROD CONTROL SYSTEM URGENT FAILURE | ROD CONTROL BANK'S LIMIT LOW | ROD CONTROL PART LENGTH ALERT |
| SOURCE RANGE LOSS OF DETECTOR VOLTAGE | INTERMEDIATE RANGE LOSS OF DETECTOR VOLTAGE | NIS POWER RANGE LOSS OF DETECTOR VOLTAGE | | PROC. PROT. RACKS CHANNEL TEST SEQUENCE VIOL. | ROD CONTROL SYSTEM NONURGENT FAILURE | ROD CONTROL RANK'S LIMIT LOW LOW | |
| SOURCE RANGE HIGH FLUX LEVEL AT SHUTDOWN | INTERMEDIATE RANGE NO.1 LOSS OF COMPENSATE VOLTAGE | NIS POWER RANGE FLUX LEVEL HIGH | | | ROD POSITION D.C. AUXILIARY POWER ON | OVERPOWER ΔT AUTO TURBINE RUNBACK BLOCK ROD WITHDRAWAL | BOP ANNUNCIATOR D.C. SUPPLY FAILURE |
| SOURCE RANGE HIGH FLUX SHUTDOWN FLUX ALARM BLOCKED | INTERMEDIATE RANGE NO.2 LOSS OF COMPENSATE VOLTAGE | | NIS POWER RANGE UPPER DETECTOR HIGH FLUX DEVIATION OR AUTO DEFEAT | PROC. PROT. RACKS >1 PROT. SET DOOR OPEN | ROD BOTTOM ROD DROP AUTO WITHDRAWAL STOP | BANK D ROD WITHDRAWAL LIMIT | FIELD CONTACT SUPPLY REDUNDANCY LOSS |
| NUCLEAR INSTR. SYSTEM TRIP BYPASS | INTERMEDIATE RANGE HIGH FLUX LEVEL ROD WITHDRAWAL STOP | NIS POWER RANGE OVERPOWER ROD WITHDRAWAL STOP | NIS POWER RANGE LOWER DETECTOR HIGH FLUX DEVIATION OR AUTO DEFEAT | ROD DROP TURBINE RUNBACK DEFEAT | | ROD CONTROL M-G SETS TRIPPED OR GROUNDED | |
| NUCLEAR INSTR. SYSTEM CHANNEL TEST | | NIS POWER RANGE CHANNEL DEVIATION | | OVERTEMP ΔT AUTO TURBINE RUNBACK BLOCK ROD WITHDRAWAL | | ROD POSITION SYSTEM IN TEST | |

FIG. 92N

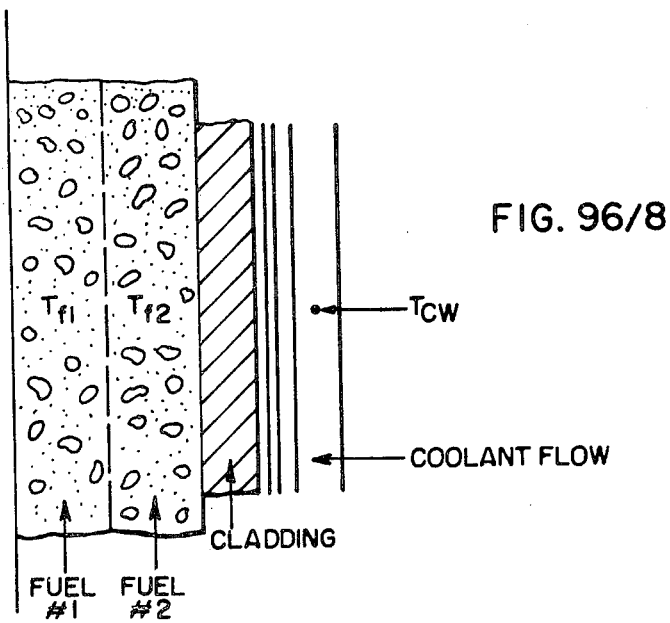
FIG. 96/8
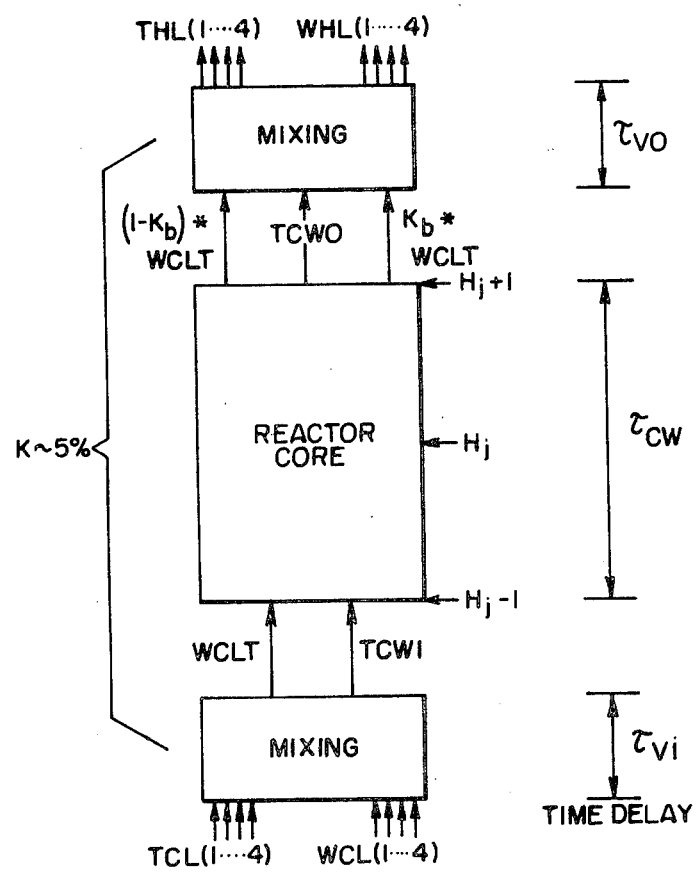
FIG. 96/7

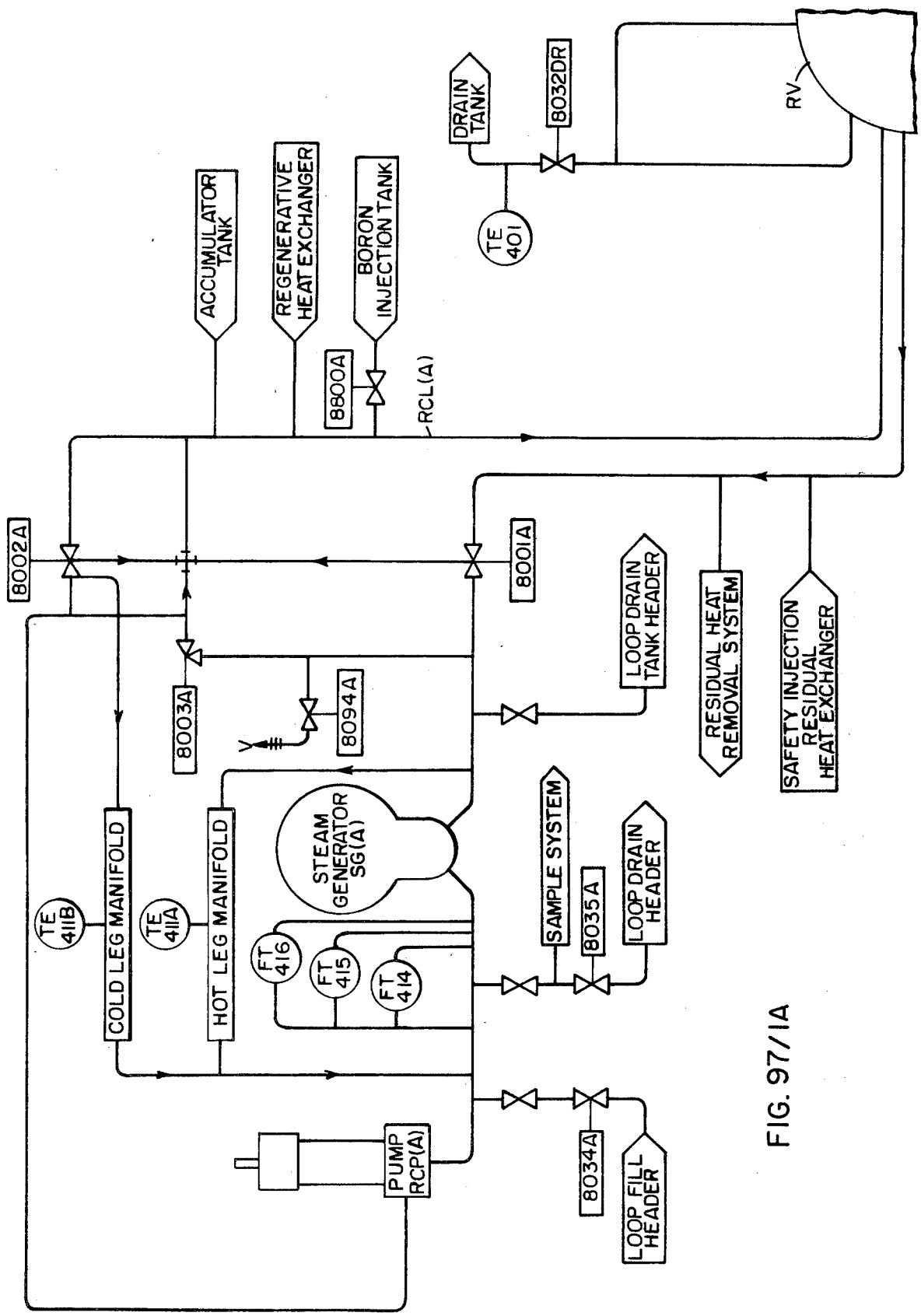
FIG. 97/1A

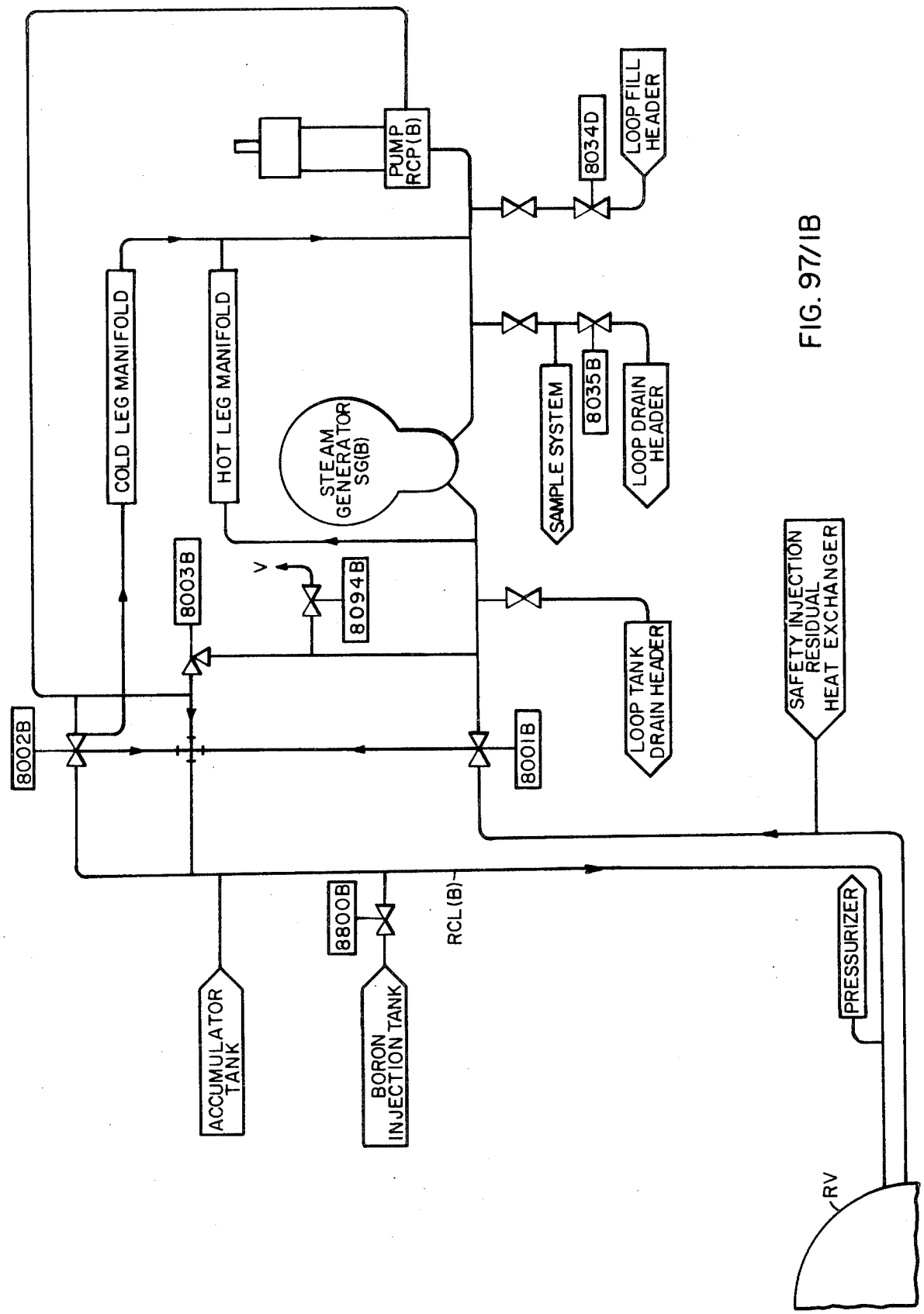
FIG. 97/1B

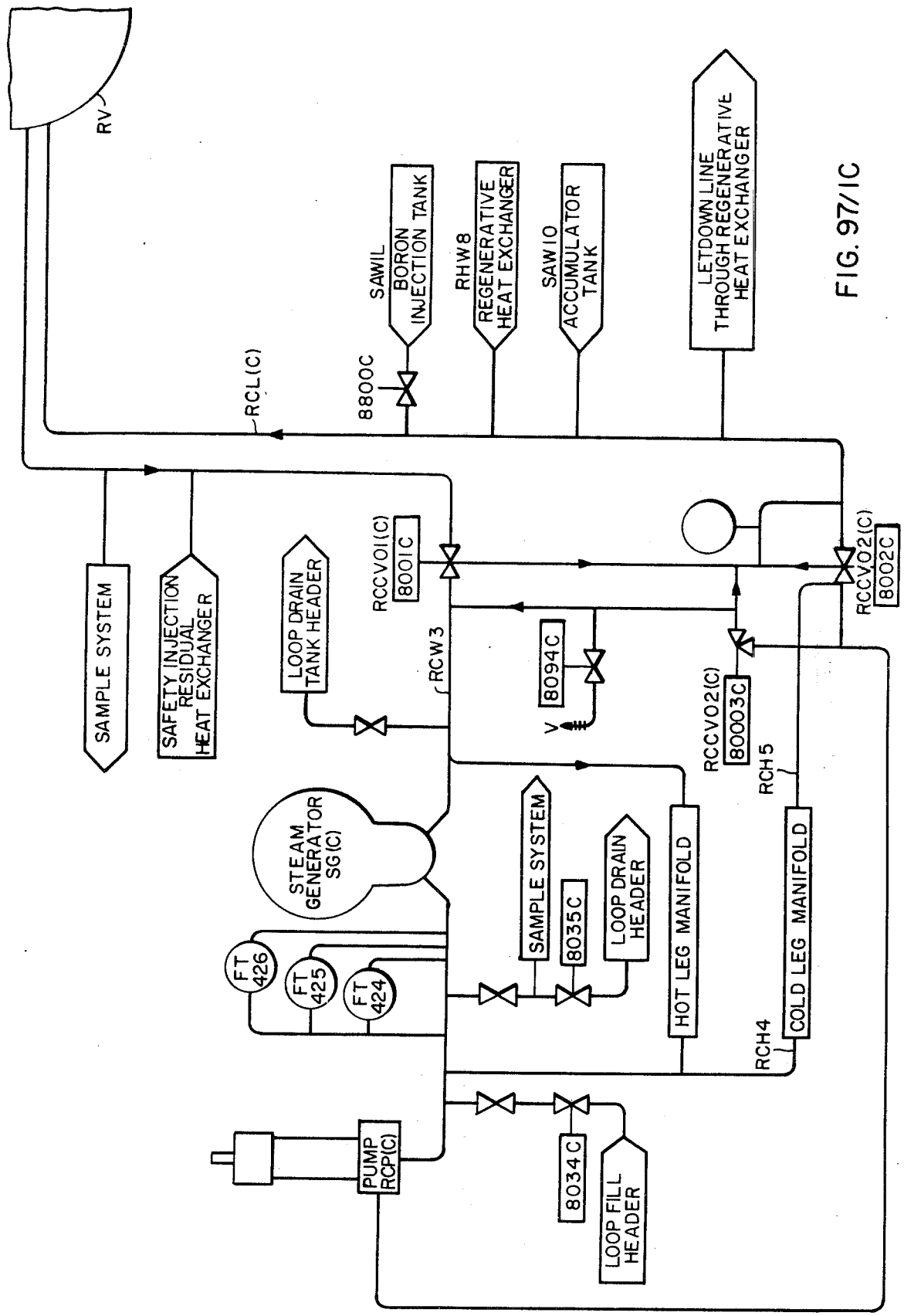
FIG. 97/IC

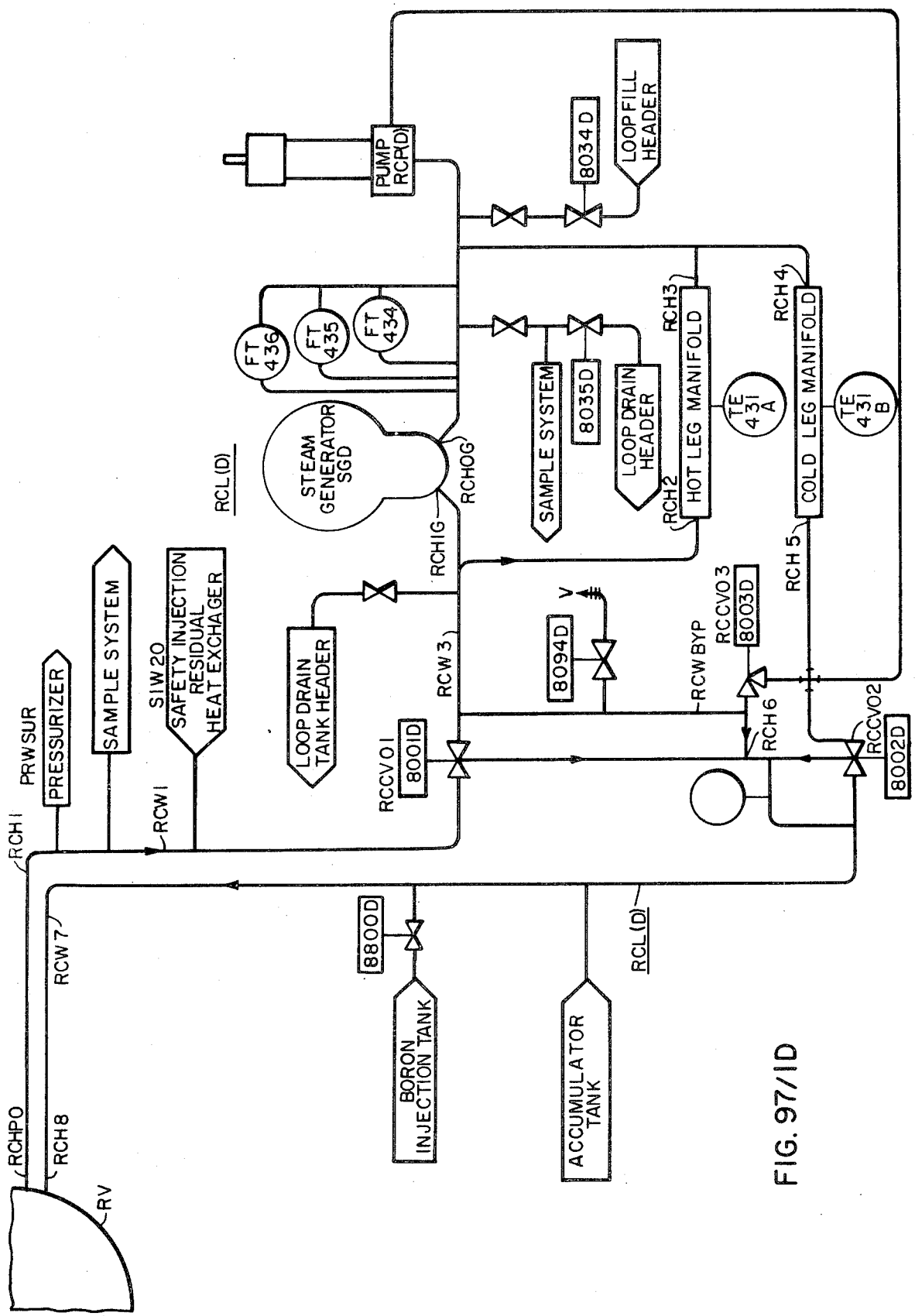
FIG. 97/1D

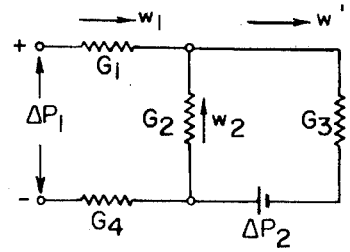
FIG. 97/2
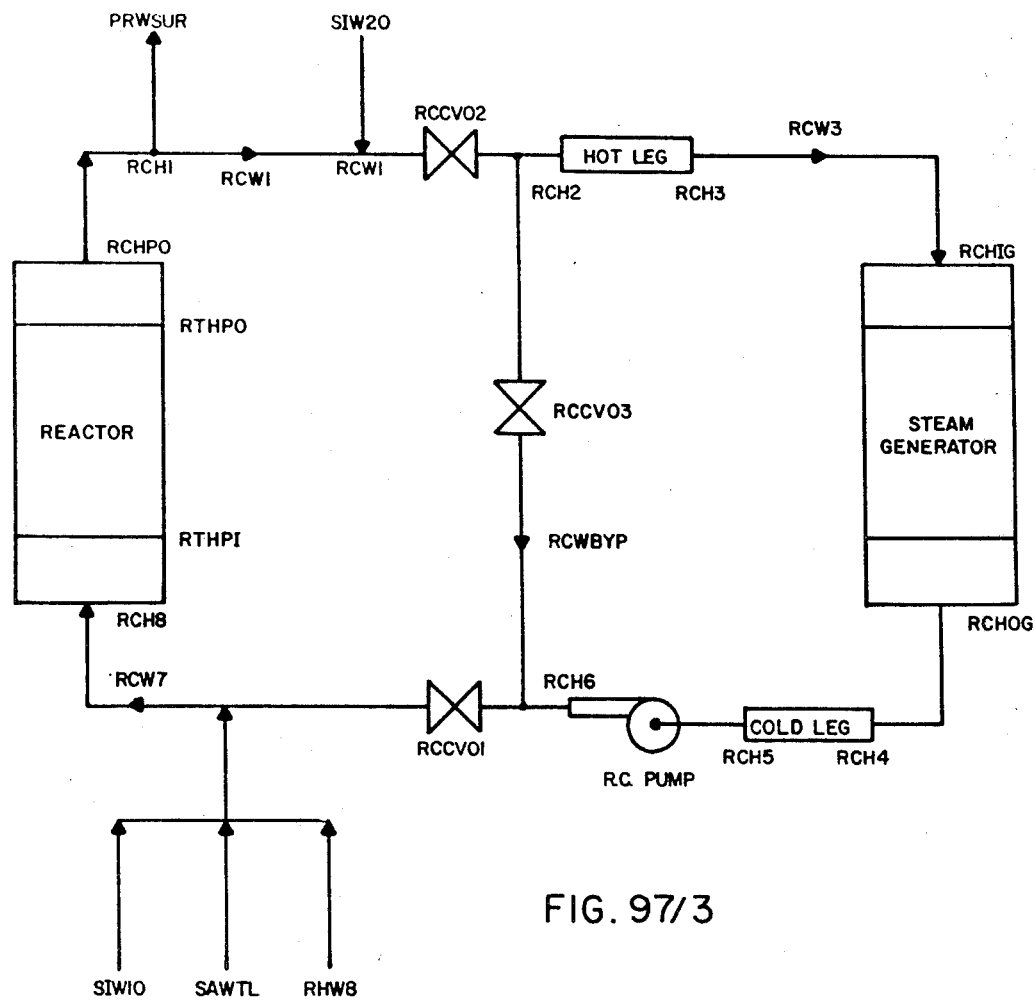
FIG. 97/3

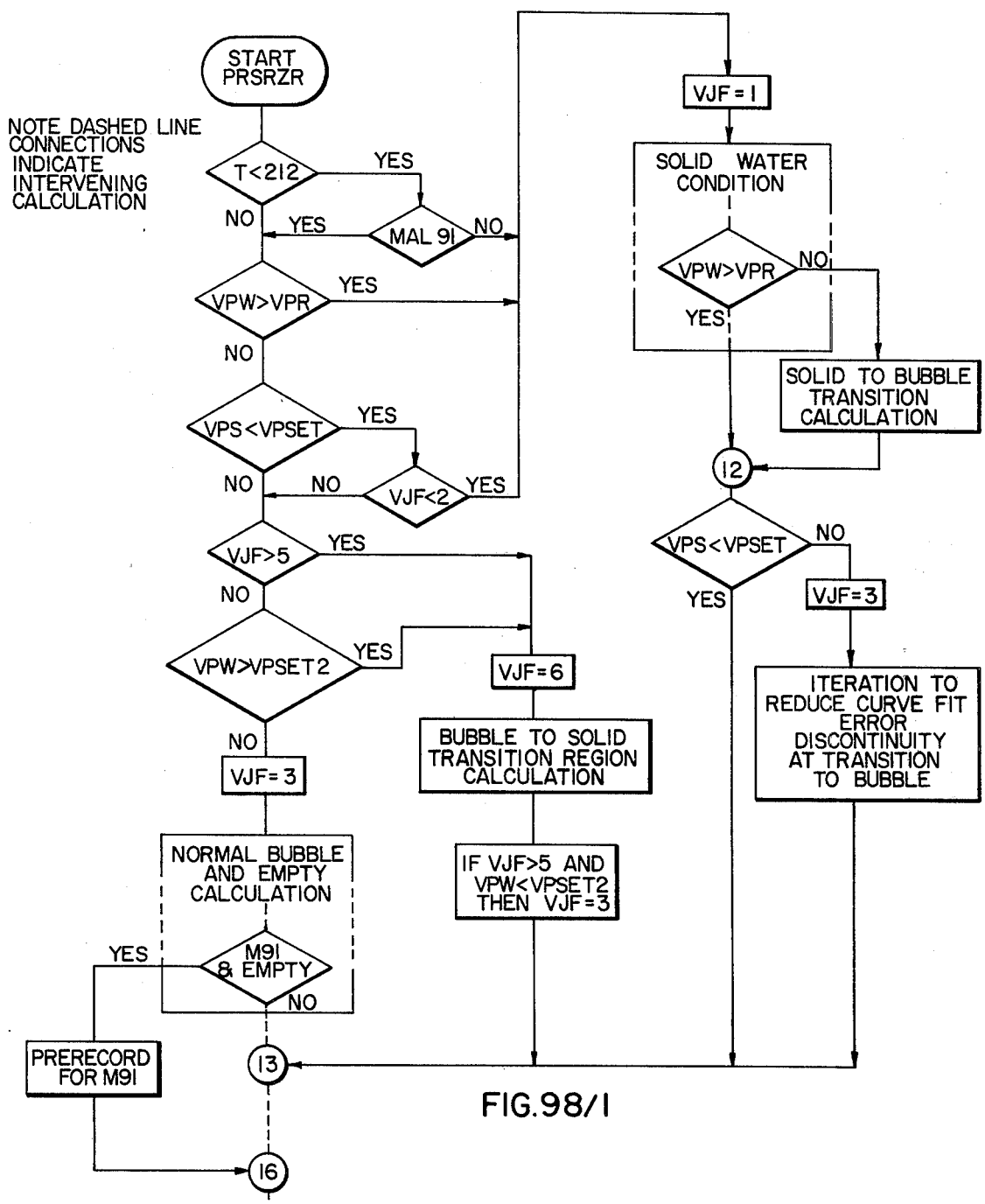
FIG.98/1
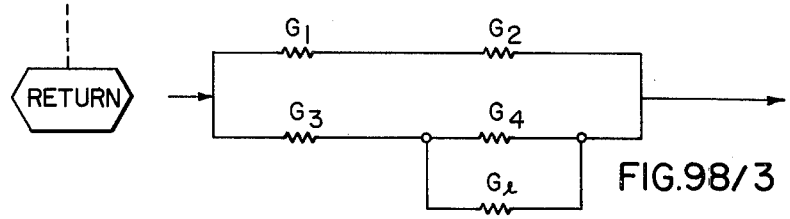
FIG.98/3

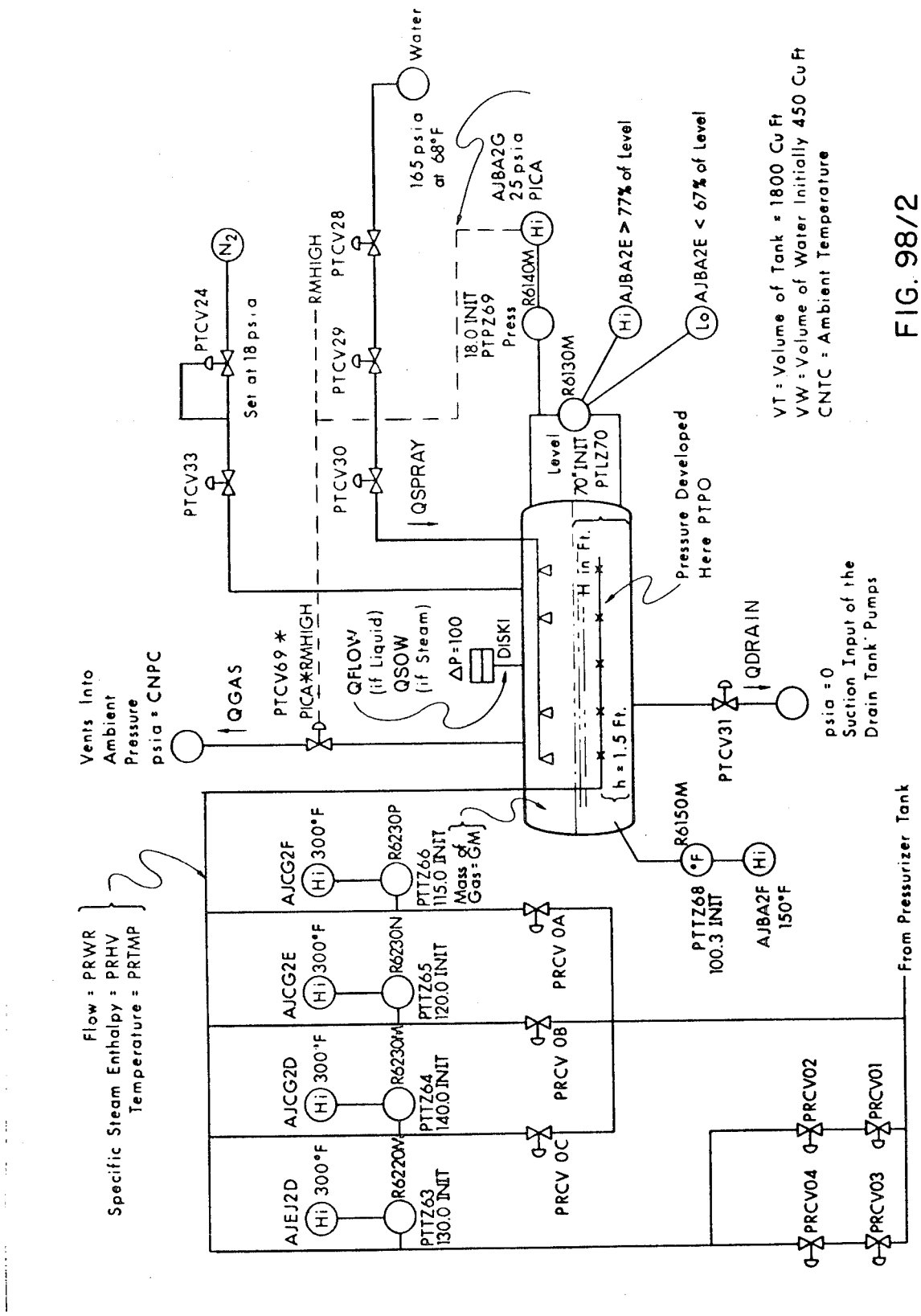
FIG. 98/2

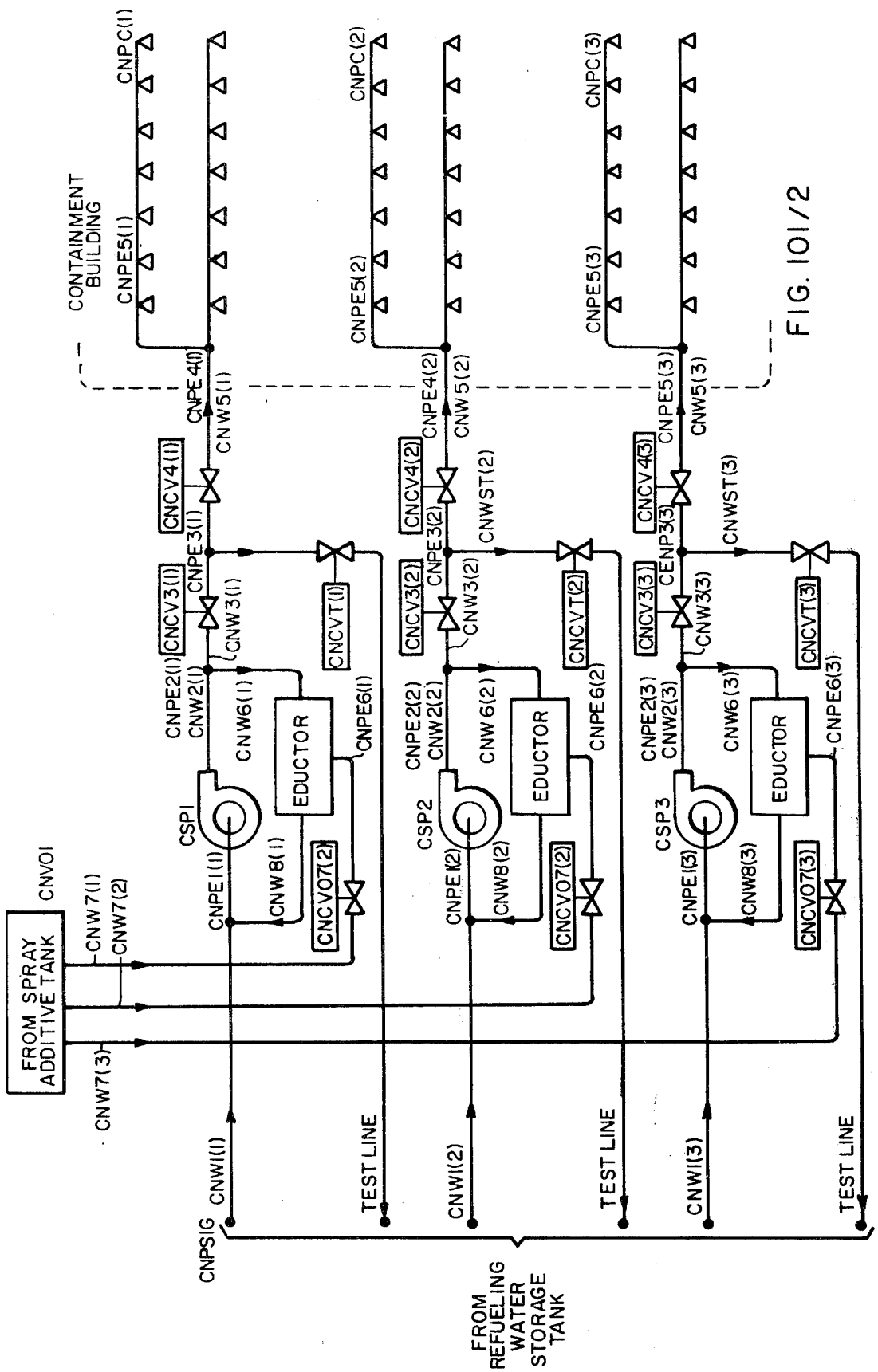
FIG. 101/2

TRAINING SIMULATOR FOR NUCLEAR POWER PLANT REACTOR COOLANT SYSTEM AND METHOD

CROSS-REFERENCE TO RELATED APPLICATIONS

Reference is made to the following concurrently filed and related patent applications which are assigned to the present assignee:

1. Ser. No. 333,901 entitled "Training Simulator For A Nuclear Power Plant" and filed by G. L. Gregg, R. E. Putman and J. W. Gomola on Feb. 23, 1973 in U.S. Patent Office.

2. Ser. No. 335,286 entitled "Nuclear Power Plant Training Simulator System And Method" and filed by R. W. Ferguson and R. E. Converse on Feb. 23, 1973 in U.S. Patent Office.

3. Ser. No. 335,295 entitled "Nuclear Power Plant Training Simulator Modeling Organization And Method" and filed by W. H. Alliston on Feb. 23, 1973 in U.S. Patent Office.

4. Ser. No. 335,181 entitled "Training Simulator For Nuclear Power Plant Reactor Monitoring" and filed by W. H. Alliston, F. R. Czerniejewski and B. A. Mutafelija on Feb. 23, 1973 in U.S. Patent Office.

5. Ser. No. 335,288 entitled "Training Simulator For Nuclear Power Plant Reactor Control Model and Method" and filed by F. R. Czerniejewski on Feb. 23, 1973 in U.S. Patent Office.

6. Ser. No. 335,285 entitled "Engineered Safeguards Systems And Method In Nuclear Power Plant Training Simulator" and filed by A. A. Desalu on Feb. 23, 1973 in U.S. Patent Office.

7. Ser. No. 335,391 entitled "Fluid Distribution Network And Steam Generators And Method For Nuclear Power Plant Training Simulator" and filed by W. H. Alliston, S. J. Johnson and B. A. Mutafelija on Feb. 23, 1973 in U.S. Patent Office.

8. Ser. No. 335,183 entitled "Training Simulator And Method For Nuclear Power Plant Heater And Non-Linear Modeling" and filed by B. A Mutafelija on Feb. 23, 1973 in U.S. Patent Office.

9. Ser. No. 335,293 entitled "Secondary System Modeling And Method For a Nuclear Power Plant Training Simulator" and filed by S. J. Johnson on Feb. 23, 1973 in U.S. Patent Office.

10. Ser. No. 335,184 entitled "Data Communication And Method For Real-Time Plural Computer Configuration" and filed by F. G. Willard, N. Slavin and L. S. Schmitz on Feb. 23, 1973 in U.S. Patent Office.

BACKGROUND OF INVENTION

The present invention relates to the full-scope real-time simulation of the dynamic operation of a nuclear powered electrical generating plant for training plant operators.

The increasing demand for well trained power plant operators together with the complexity of modern day power plants, has led to the realization that the simulator is the most effective tool for such training.

Also, with advancements in nuclear power plant technology, experienced operators from time-to-time need retraining in order to be competent. An actual nuclear plant cannot provide the operator with the required experience, such as starting up, changing load, and shutting down, for example, except after years of experience; and even then it is unlikely that he would observe the effect of important malfunctions and be able to take the best corrective procedures.

Although simulators have been used for many years, in power plant design, it is only recently that they have been used for power plant operator training. An article in the July 22, 1968 issue of Electrical World, entitled "Nuclear Training Center Using Digital Simulation" briefly describes the installation of a boiling water reactor plant simulator. An article in the same publication in the Oct. 6, 1969 issue entitled "Huge Simulator to Ready More Reactor Operators" discusses the proposed installation of a pressurized water reactor simulator. In Volume 10, No. 5 of the publication "Nuclear Safety" published during September and October 1969 is an article entitled "Training Nuclear Power Plant Operators With Computerized Simulators", and in the June 1972 issue of the publication "Power Engineering" there is an article entitled "Simulators" which describes a number of power plant operator training simulators presently in use or proposed.

Design simulators usually cover only a small part of the process, and may run slower or faster than real-time; while training simulators must operate and respond in a manner identical to the actual plant. A design simulator may involve only a narrow range of conditions, while a training simulator must simulate from "cold" shutdown to well beyond normal operating conditions. A design simulator usually involves only the major process, while a training simulator should cover every auxiliary system with which the plant is concerned.

Training simulators presently in use for operator training, which are more or less complete in their simulation utilize a digital computer that is connected to control consoles that are identical in operation and appearance to the plant being simulated. Also, an instructor's console is connected to control the simulator, introduce malfunctions, initialize the simulated plant at selected states of operation, and perform other functions useful for training purposes and control of the simulator.

Also, the simulation of the power plant must be of sufficient detail and accuracy that the operator cannot distinguish between the behavior of the simulator and that of the actual plant not only under all normal and abnormal operating conditions; but also, when portions of the plant are shut-down or cut-out, including the behavior of physical states of the fluids in non-operational sectors of particular systems.

In furtherance thereof, it is desirable that the reactor coolant loops, which transfer heat from the reactor to the steam generators, by means of reactor coolant pumps, be simulated so the operator can monitor the flow of the coolant and its effects in real time not only when a reactor coolant pump is pumping the pressurized water from the cold leg of a loop through the reactor into the hot leg of a loop and primary side of the steam generator in a forward manner, but also the natural circulation of coolant water when the reactor coolant pump is shut down for a particular loop, and further the reverse flow of coolant water in a loop which occurs when the stop and bypass valves of the various loops are in certain operated states.

It is further desirable that the modeling or simulation should be as simple as possible in keeping within the limits of steady state and transient accuracy with respect to the calculations of physical values relating to the flow, pressure, and heat of the coolant in all parts of the reactor coolant system, which would include, under conditions of reverse flow the correct behavior of thermal heat transfer in the primary side of the steam generator and the reactor model.

In keeping the reactor coolant flow simulation relatively simple and stable under all operating conditions, it is desirable to perform the calculations in accordance with an electrical network analogy wherein a value dependent on pressure drop between the inlet and outlet plenum of the reactor and the pressure developed by the reactor coolant pumps is the main potential source under all conditions of operation.

During conditions of natural circulation in the reactor coolant system; that is, when the reactor coolant pump is not running, it is desirable to utilize physical values relating to differential densities between the coolant water in the reactor core and the primary side of the steam generator in simulating the pressure and flows in the reactor coolant system.

During conditions of reverse flow, it is also necessary to simulate accurately the thermal heat transfer in the primary side of the steam generator and the reactor models. In keeping with the desire for simplicity, the calculations for the thermal characteristics of the reactor coolant loop can be combined so that they are dependent upon the simulated direction of coolant flow. For the reactor portion of the reactor coolant thermal simulation, it is desirable to utilize a thermal balance equation for both directions of flow; and for the primary side of the steam generator thermal simulator, it is desirable to eliminate the thermal calculations for the reverse direction of flow and utilize enthalpy calculations, for example.

The reactor coolant system for a pressurized water reactor power plant influences and is influenced by several auxiliary systems, such as the pressurizer of the coolant containment spray system, the residual heat removal system, charging system, letdown system and safety injection system. In order to be suitable for training purposes, the reactor coolant system should be simulated so that the effects of these systems are included therein.

The pressurizer for the reactor coolant system, which maintains the coolant pressure within predetermined limits, behaves in a different manner under various conditions of operation. For example, when the reactor coolant loop is being filled, the pressurizer contains both water and steam. Then when the loop is full, the pressurizer contains only coolant. When the amount of coolant in the loop is reduced, such as through the letdown system, for example, or a loss of coolant accident, steam immediately forms into the vacuum created until there is no water in the pressurizer. This difference in behavior, depending on whether the reactor coolant loop is being filled or emptied is known as the hysteresis effect. In a simulator used for training purposes, this hysteresis effect should be simulated. Also, the effects on the pressurizer of a differential volume change in different parts of the reactor coolant loops, which includes a volume surge of coolant water in and out of the pressurizer should be simulated.

In simulating the reactor-coolant loop pressurizer system, it is desirable to use a two phase pressurizer model until the water and steam in the pressurizer reaches a predetermined amount. Then a constant set of pressure conditions should be maintained until the volume of water fills the pressurizer, which provides for stability and a smooth transition to a solid water condition in a simplified manner. Then, a solid water condition simulation can be effected until the simulator is cooled to ambient temperature and pressure. To maintain stability and a smooth transition from the solid water to a steam or bubble condition, the solid water calculation should be used until the water volume in the pressurizer is at a predetermined amount, at which time a transition can be made to the twophase flow model, until the pressurizer is empty.

With respect to the simulation of volume surge into and out of the pressurizer due to differential volume changes in different parts of the pressurizer, it is desirable to calculate such differential volume change in accordance with a change in density or specific volume, which of course results from a change in temperature or thermal heat transfer at a plurality of locations in the reactor coolant loop. Thus, the simulated total volume changes can be converted to mass flow which may be added to the difference in charging and letdown flow as well as the residual heat removal and safety injector differential flow to obtain the simulation of the surge flow.

SUMMARY OF THE INVENTION

In accordance with the broad principles of the present invention, an improved method and system for simulating the real-time dynamic operation of a nuclear power plant is provided, which utilizes apparatus wherein a plurality of control devices and indication devices provide input data and respond to output data respectively to and from a computer that calculates physical values for the improved simplified simulation of a reactor coolant pressurizer system.

In one aspect the improved method and system for simulating the real-time operation of a reactor-coolant system is characterized by computer means that calculates physical values for simulating the forward, reverse, and natural circulation of coolant in a reactor coolant system.

In another aspect, the improved method and system for simulating the real-time operation of a reactor coolant system is characterized by computer means and method that calculates physical values for the correct behavior of thermal transfer under all operating conditions.

In still another aspect, the improved method and system for simulating the real-time operation of a reactor coolant system is characterized by computer means and method that calculates the physical values in accordance with an electrical network analogy utilizing reactor fluid pressure drop and reactor-coolant pump pressure as the potential source.

In still another aspect, the improved method and system is characterized by computer means and method that simulates the pressure in a reactor coolant system in accordance with differential densities between the coolant water in the simulator reactor core and the primary side of the simulated steam generator.

In yet another aspect the improved method and system is characterized by computer means and method that combines the thermal characteristics of the reactor-coolant loop such that the thermal calculations are dependent upon the direction of simulated flow.

In a still more specific aspect, the improved method and system is characterized by a computer means and method that calculates the thermal characteristics in the simulator reactor in the same manner for both directions of flow and the thermal characteristics in the primary side of the steam generator by a different method for each direction of flow.

In another broad aspect, the improved method and system for simulating the dynamic operation of a nuclear power plant is characterized by a computer means and method to calculate physical values for the dynamic operation of the pressurizer of the reactor-coolant system under all conditions of operation.

In a further specific aspect, the improved method and system for simulating the dynamic operation of a reactor-coolant system is characterized by a computer means and method to calculate the physical values for simulating a pressurizer reactor-coolant loop simulation that incorporates the hysteresis effect and the surge-in-flow and outflow.

In still another aspect the method and system for simulating the operation of the pressurizer is characterized by a computer means and method that calculates the physical values in accordance with a sub-cooled model during one phase of operation and a bulk modulus and enthalpy model during another phase of operation.

In yet another aspect, the method and system for simulating the operation of the reactor-coolant system is characterized by computer means and method of calculating losses to the containment building and includes the simulation of such containment.

BRIEF DESCRIPTION OF THE DRAWINGS

FIGS. 91E, 91F and 91G illustrate that portion of the console that relates to the containment spray system;

FIG. 96/7 is a schematic block diagram showing the reactor thermal-hydraulic calculations;

FIG. 96/8 is an enlarged sectional view of a fuel rod showing the fuel rod thermal calculations;

FIGS. 97/1A through 97/1D inclusive is a schematic block diagram of a typical reactor coolant system of the type being simulated in accordance with the present embodiment of the invention;

FIG. 97/2 is an analogous electrical network for one of the reactor coolant loops being simulated;

FIG. 97/3 is a block diagram illustrating the reactant coolant system thermal simulation;

FIG. 98/1 illustrates the flow chart for the pressurizer program PRSRZR of the simulation;

FIG. 98/2 is a schematic diagram of the pressurizer relief tank system of the type being simulated;

FIG. 98/3 represents an analogous electrical network for the calculation of combined admittances of the pressurizer control system simulation;

FIG. 101/2 is a schematic diagram of the containment spray system of the type being simulated.

GENERAL DESCRIPTION OF SIMULATED NUCLEAR POWER PLANT

Figure 1:
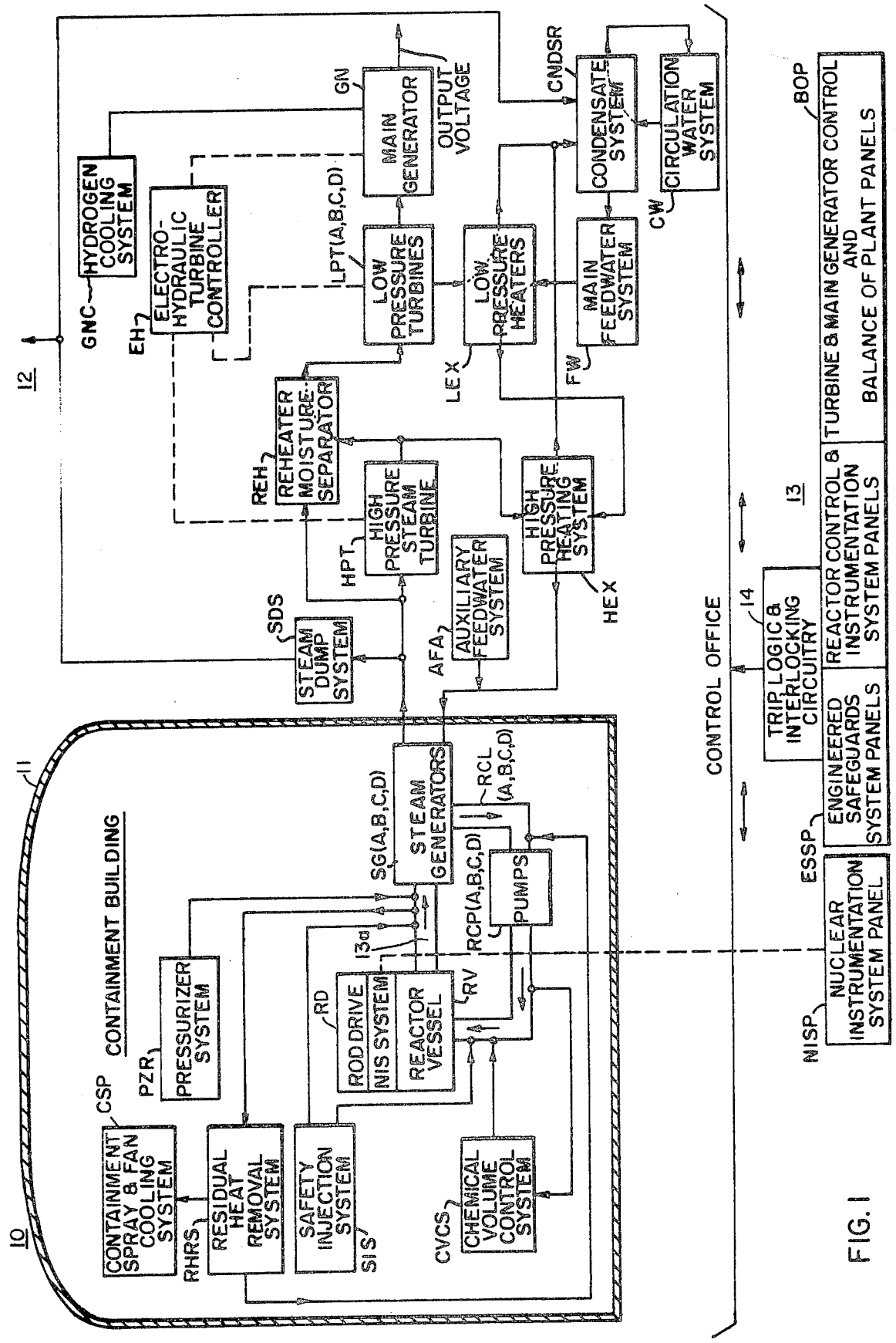
FIG. 1 shows a schematic block diagram of a nuclear powered electrical generating plant that is simulated in accordance with the present invention.

Referring to FIG. 1, the preferred embodiment of the invention is described in connection with the simulation of a nuclear power plant, in this case a four loop pressurized water reactor power plant. Such a plant includes a primary system generally referred to as 10 which is housed in a containment building 11, a secondary system, generally referred to as 12, and a control office that includes control and indication panels 13 for operating and monitoring the various elements in the power station. The plant itself is described herein in a general sense to an extent which will aid in understanding the invention. More detail on the plant is ascertainable from the more detailed invention description herein. Extensive background information on nuclear plants of various kinds is widely available in prior patents and publications. Certain invention features are applicable to nuclear plant types other than the pressurized water type.

The primary system includes a nuclear reactor housed in a reactor vessel RV and in this instance four closed reactor coolant loops RCL (A, B, C, and D), connected in parallel to reactor vessel RV. Each loop contains a reactor coolant pump RCP (A, B, C, and D) and a steam generator SG (A, B, C and D). The reactor vessel RV, reactor coolant loop piping RCL, pumps RCP, and primary side of steam generators SG, all form what is referred to as a reactor coolant system RCS. The primary system 10 also includes an electrically heated pressurizer system PZR and certain auxiliary systems hereinafter described.

High pressure water circulates through the reactor vessel RV to remove the heat generated by a nuclear chain reaction within a fuel arrangement disposed in the reactor. This heated water exits from the reactor vessel RV and passes via the coolant loop piping RCL to the steam generators SG. In the steam generators SG, the coolant water gives up its heat to the feedwater in the secondary side of the steam generator SG to generate steam for a turbine driven electrical generator GN. The reactor coolant cycle is completed when the coolant is pumped back to the reactor vessel RV for reheating in the nuclear reactor.

Rod drive system Rd is used to control reactor power level and consists of clusters or banks of movable cylindrical neutron absorber rods. The absorber rods move within guide tubes in certain fuel assemblies in the reactor fuel arrangement. The reactor coolant pumps RCP are vertical single stage mix flow pumps of the shaft seal type; and are designed so that adequate coolant flow is maintained to cool the reactor core adequately under all conceivable circumstances. The steam generators SG are vertical U-tube units that contain integrally therewith, in the secondary side, moisture separation equipment that reduces the moisture content of the steam to one-quarter percent or less. The electrically heated pressurizer PZR connected to one of the four reactor coolant loops RCL maintains the reactor coolant system RCS pressure during normal operation, limits the system coolant pressure variation during plant load transients, and keeps the system coolant pressure within design limits during abnormal conditions.

The reactor operating level is controlled inherently by a negative temperature coefficient of reactivity of the water; by control rod cluster positioning as already indicated; and by a soluble neutron absorber, such as boron in the form of boric acid. The boric acid is inserted into the coolant during cold shutdown, partially removed during startup, and adjusted in concentration during the life time of the fuel in the core to compensate for such effects as fuel consumption, and accumulation of fission products, which tend to slow the nuclear chain reaction.

The primary system includes engineered safeguard systems, ESS including chemical and volume control system CVCS, safety injection system SIS, residual heat removal system RHRS, containment spray and fan cooling system CSP, and an accumulator discharge system (not shown) which is described in detail in connection with the description of the individual models.

The chemical and volume control system CVCS performs a number of functions, such as filling the reactor coolant system RCS, providing a source of high pressure water for pressurizing the system RCS when cold, maintaining the water level in the pressurizer system PZR when the RCS system is hot, reducing the concentration of corrosion and fission products in the reactor coolant, adjusting the boric acid concentration of the reactor coolant, and providing high pressure seal water for the seals of the reactor coolant pumps RCP.

The residual heat removal system RHRS portion of the engineered safeguard systems ESS transfers heat energy from the reactor core and the system RCS during plant shutdown and refueling operations. Components in the residual heat removal system RHRS are also employed in conjunction with the safety injection system SIS.

The safety injection system SIS supplies borated water to the system RCS to limit the fuel rod cladding temperature in the unlikely event of a loss of coolant accident. Also, the system SIS functions to provide a means of introducing a spray of borated water into the containment 11 as an additional dynamic heat sink. The system SIS includes several independent subsystems characterized by equipment and flow path redundancy. This redundancy assures complete reliability of operation, and continued core cooling even in the event of a failure of any single component to respond actively as intended. For example, during the passive accumulator injection phase of the system operation which is described in connection with the individual models, accumulator tanks rapidly inject borated water into the reactor coolant system automatically when the depressurization of loops RCL causes a reversal of the pressure drop across the accumulator check valves. The accumulators provide rapid cooling of the reactor core for large breaks which would otherwise result in core uncovering and overheating before the electrically driven low head safety pumps of the SIS system are energized and delivering coolant. The low head system of safety injection provides for injection of borated water into the RCL loops for large breaks, which would result in rapid blowdown and depressurization. A high head system for injection into the loops RCL for small breaks is provided for those instances that would result in slow blowdown and depressurization. The low head system utilizes pumps of the residual heat removal system RHRS which takes water from a refueling water storage tank, and pumps borated water through one of the residual heat exhchangers, through an injection header and injection lines to each of the reactor coolant loops. The high head safety injection phase utilizes two subsystems which provide extremely rapid response to an SIS system actuation signal, utilizing a boron injection tank and a charging pump of the chemical and volume control system CVCS.

The containment building 11 completely encloses the entire primary system and insures that an acceptable upper limit for leakage of radioactive materials to the environment is not exceeded, even if gross failure of the elements contained therein were to occur. The containment spray system CSP is included in the primary system to limit the pressure in the containment atmosphere to below the containment design pressure, and remove sufficient iodine from the containment atmosphere to limit the radiation doses to safe value. This system delivers NaOH to the space within the containment building 11. The reactor containment fan cooling system portion of CSP which is also part of the containment building monitoring system removes heat from the containment building during normal operation, and during any loss of coolant accident. When a loss of coolant accident is sensed, the fan motors are automatically switched to low speed to provide circulation of the steam-air mixture in the containment building.

The steam generators SG (A, B, C, and D) deliver steam at appropriate pressure and temperature in the secondary system for conversion to mechanical and then to electrical energy in the turbines and the generators, respectively. The secondary steam is additionally used for various operational auxiliary services such as turbine shaft steam seals, turbine drives for main and auxiliary feedwater pumps and steam jet air ejectors.

Steam is admitted to a double flow high pressure turbine HPT that is controlled by governor valves with quick acting throttle or stop valves ahead of them for rapid isolation in an emergency. Four separate pipes convey steam from the governor valves to the turbine nozzle chambers. The steam passes through an impulse blading or control stage and a number of reaction stages of the high pressure turbine HPT; the impulse chamber steam pressur is measured and used as a load measurement for use in reactor control.

On leaving the last row of high pressure blades, the steam has a moisture content of approximately 10%. Thus, the steam is then passed through a moisture separator and reheater REH to improve the turbine efficiency and reduce the low pressure turbine exhaust moisture. The exhaust steam from the high pressure turbine when first passed through the moisture separator portion REH removes approximately 10% of the flow which is extracted as moisture. The remaining 90% flows through steam heated reheater portion of REH where it receives approximately 100°F superheat. The moisture is removed and drained to a heater drain tank (not shown); and the steam which rises above the moisture separator passes over the reheater and is reheated by live steam.

The hot reheated steam is conveyed to the double flow low pressure turbines LPT (A, B, C) the number of which in use can depend on the electrical output required. The low pressure turbine exhaust directs the steam to a condenser CNDSR that has cooling water passing through tubes which condense the steam to water where it is collected in a chamber, called a hot well. The condenser cooling water is controlled by circulating water system CW. The condensate system CNDSR and the feedwater system FW return the condensed steam from the turbine condenser, and the drains of the regenerative feed heating cycle, to the steam generators SG (A, B, C, and D) while maintaining the proper water inventories throughout the cycle.

The feedwater system FW conveys the feedwater through low pressure heaters LEX and then through high pressure heaters HEX to the generators SG. The auxiliary feedwater system AFA is used when the main system is inoperative. These systems automatically maintain the water level of the steam generators SG during both steady-state and transient operation.

The turbine HPT is equipped with an electrohydraulic control system EH comprising a solid state electronic controller and a high pressure fluid supply. The electronic controller computes a control signal based on measured turbine speed, measured first stage steam pressure, and speed and loss reference values established by the dispatcher or initiated at the operator's control panel 13. The control signal is transmitted to the electrohydraulic actuator of each main steam throttle and/or governoring value to produce the value positioning need to meet the reference load. During turbine startup, the throttle values are position controlled to accelerate the turbine from turning gear or higher speed up to synchronous speed. The high pressure hydraulic fluid system provides the power for all turbine steam control valves, electrohydraulic actuators, and positions the governor values in response to the electric control signals from the electronic controller. The interceptor valves are also operated by the hydraulic fluid, and they may be position controlled or simply controlled to be either open or closed.

The electrohydraulic control system provides turbine control during all phases of operation by varying the turbine valve openings. Hydraulic cylinders move the valves to the required opening with electrically operated servo-valves controlling the cylinder's position.

The main generator GN operated by the turbine is a hydrogen inner cooled synchronous generator with a water cooled stator and an output voltage of approximately 22 to 25 kV at 60 cycles. The excitation is provided by a shaft driven air cooled brushless exciter. Cooling for the generator is provided by system GNC which circulates hydrogen at a pressure of about 75 psig through the generator GN by fans attached to the generator shaft.

Various plant parameters including reactor parameters, coolant and steam pressures, temperature, and flows and liquid levels in the various systems, as well as the speed of the turbines and electrical output of the generator are sensed and displayed through meters, alarms, and annunciators on the central office panel 13. Among the reactor parameters the position of the rods of the reactor and the state of all operable components are displayed to inform the operator of the condition or state of operation of the nuclear power plant.

The state of operation of the various components of the plant and certain fluid pressures, temperatures, and levels are connected through interlocking and logic circuitry 14 to prevent unsafe operation of selected system components and to trip or shut down the plant under abnormal conditions.

Nuclear instrumentation panel NISP is provided with various recorders, indicators, meters, and selector switches to display the neutron flux values in various sectors of the reactor, both in an axial and radial direction, which function is termed in-core flux mapping.

Also, a portion of the panel NISP displays through meters the flux in various sectors of the reactor vessel RV to inform the operator of the various ranges of nuclear flux, such as source, range, intermediate range, and power range of the reactor during start-up and shutdown, which operation is termed ex-core radiation detection. Further, the temperature of individual fuel rods of the reactor, and the radiation in various parts of the plant are monitored and displayed on the panels NISP. Finally, the auxiliary power to the plant is controlled by a portion of the panel NISP.

GENERAL DESCRIPTION OF SIMULATOR CONFIGURATION

The nuclear power plant simulator according to one embodiment of the invention comprise digital computation apparatus and peripheral equipment operatively connected to control and indication panels which are identical in appearance and wiring to the actual control and indication panels of the four loop pressurized water reactor power plant that is simulated. The general function, structure, and operation of digital computers is set forth in a publication entitled "Electronic Digital Systems" by Mr. R. K. Richards, which was published in 1966 by John Wiley and Sons, Inc. and bears the Library of Congress card catalog number 66-17618, to which reference is made for a detailed description thereof in order to aid in an understanding of the apparatus and methods in carrying out the invention.

Figure 2:
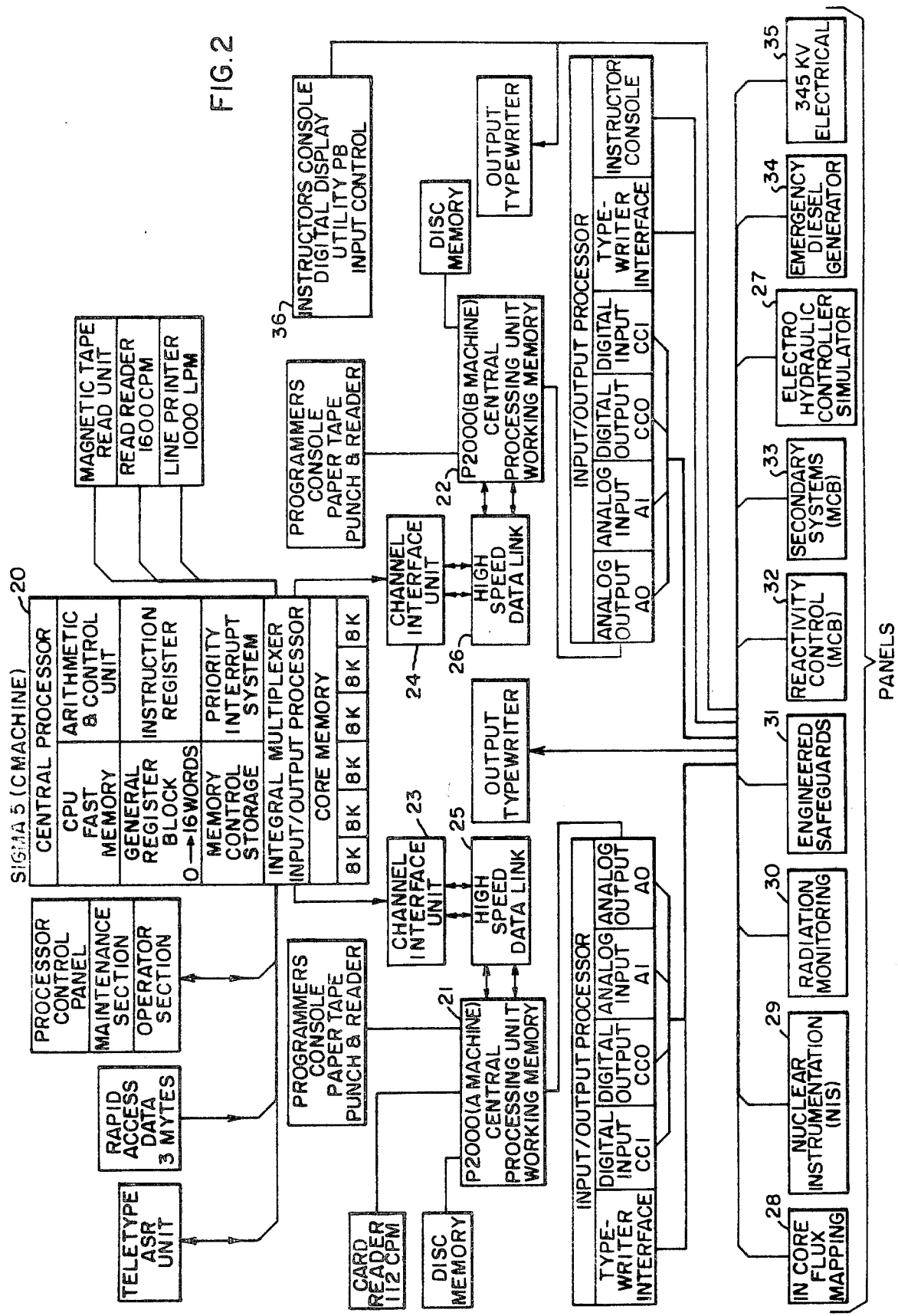
FIG. 2 shows a schematic block diagram of the apparatus used in simulating the operation of the plant shown in FIG. 1.
Figure 9I:
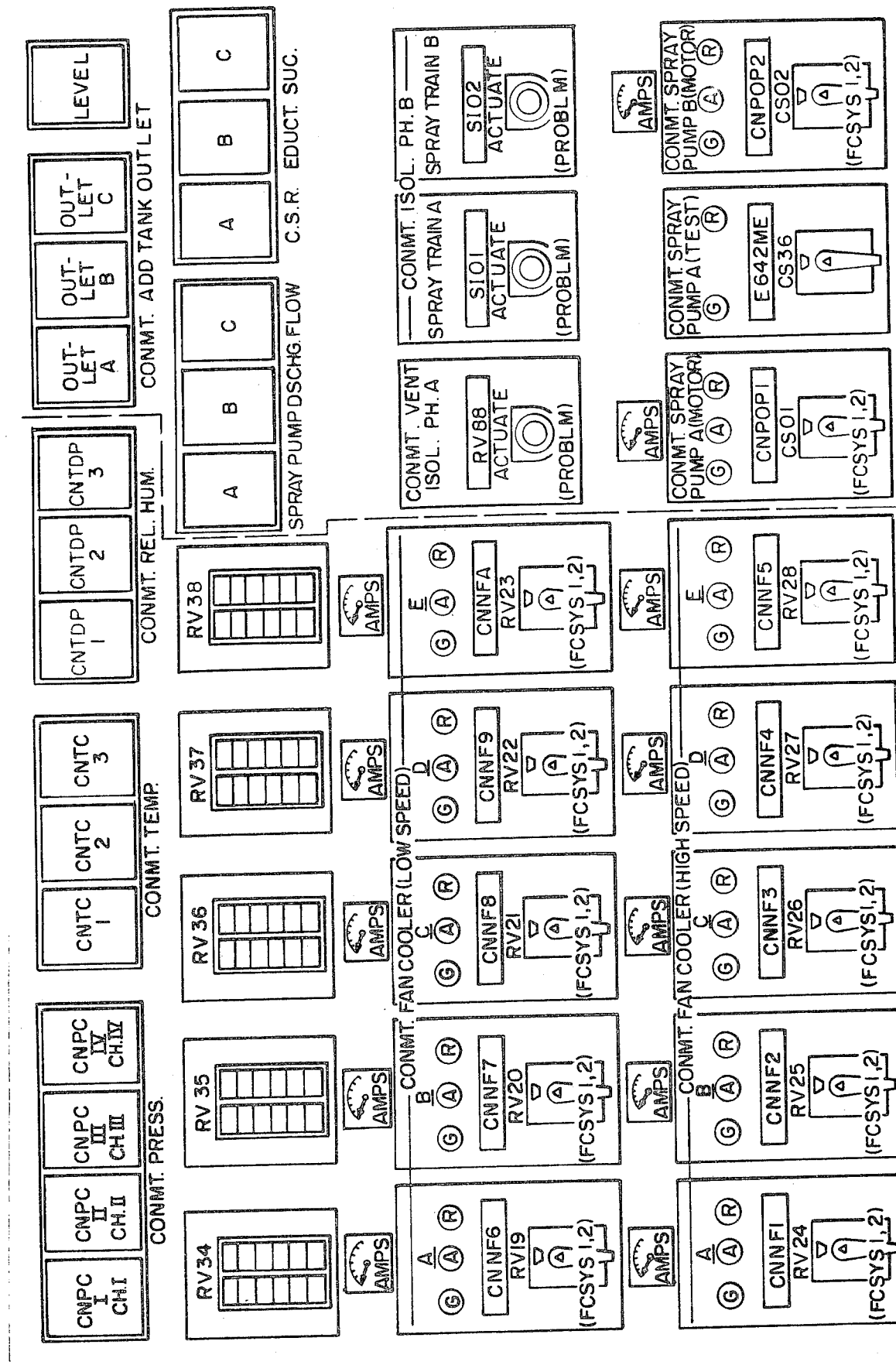
Figure 9I:
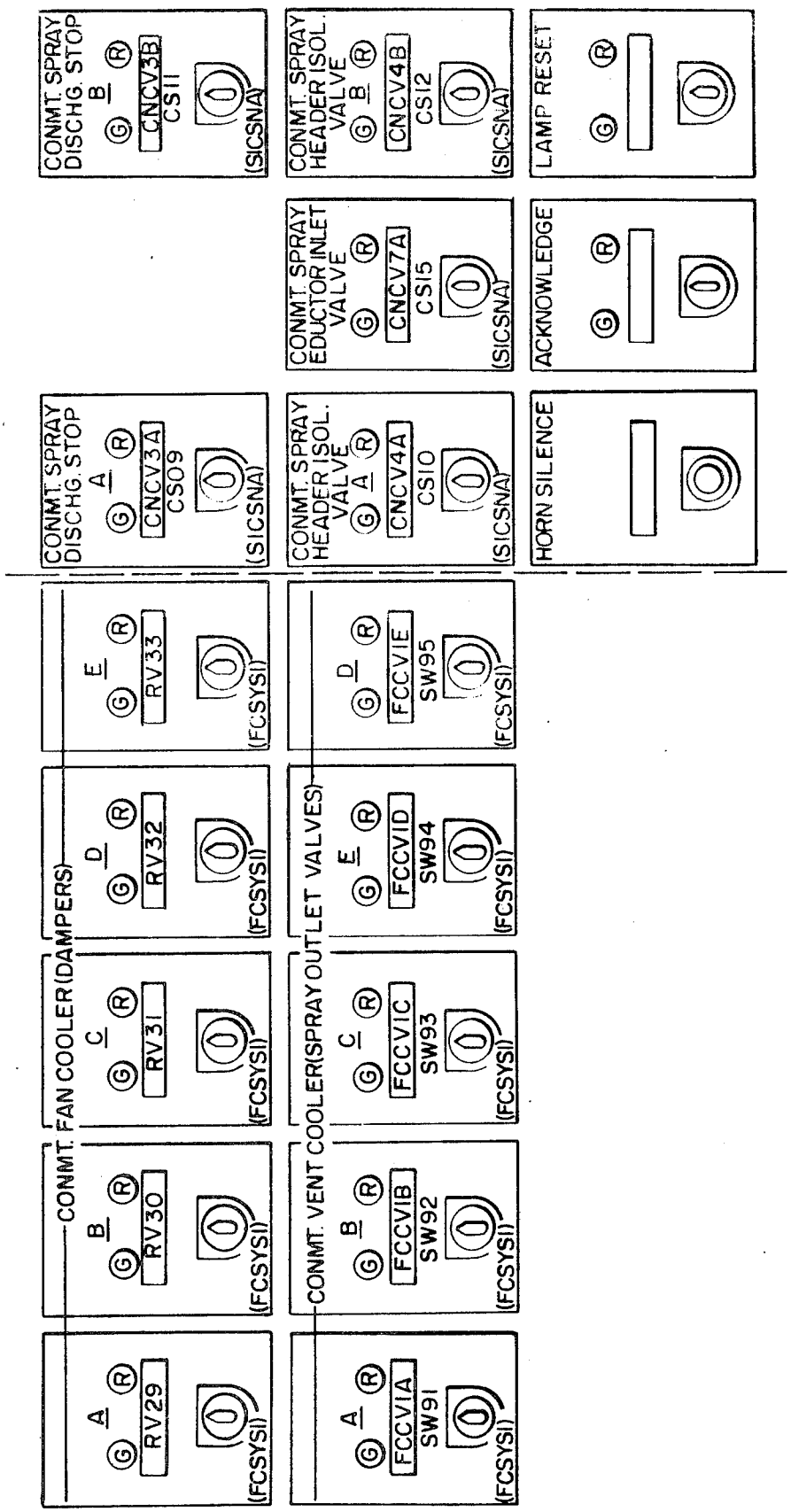
Figure 9I:
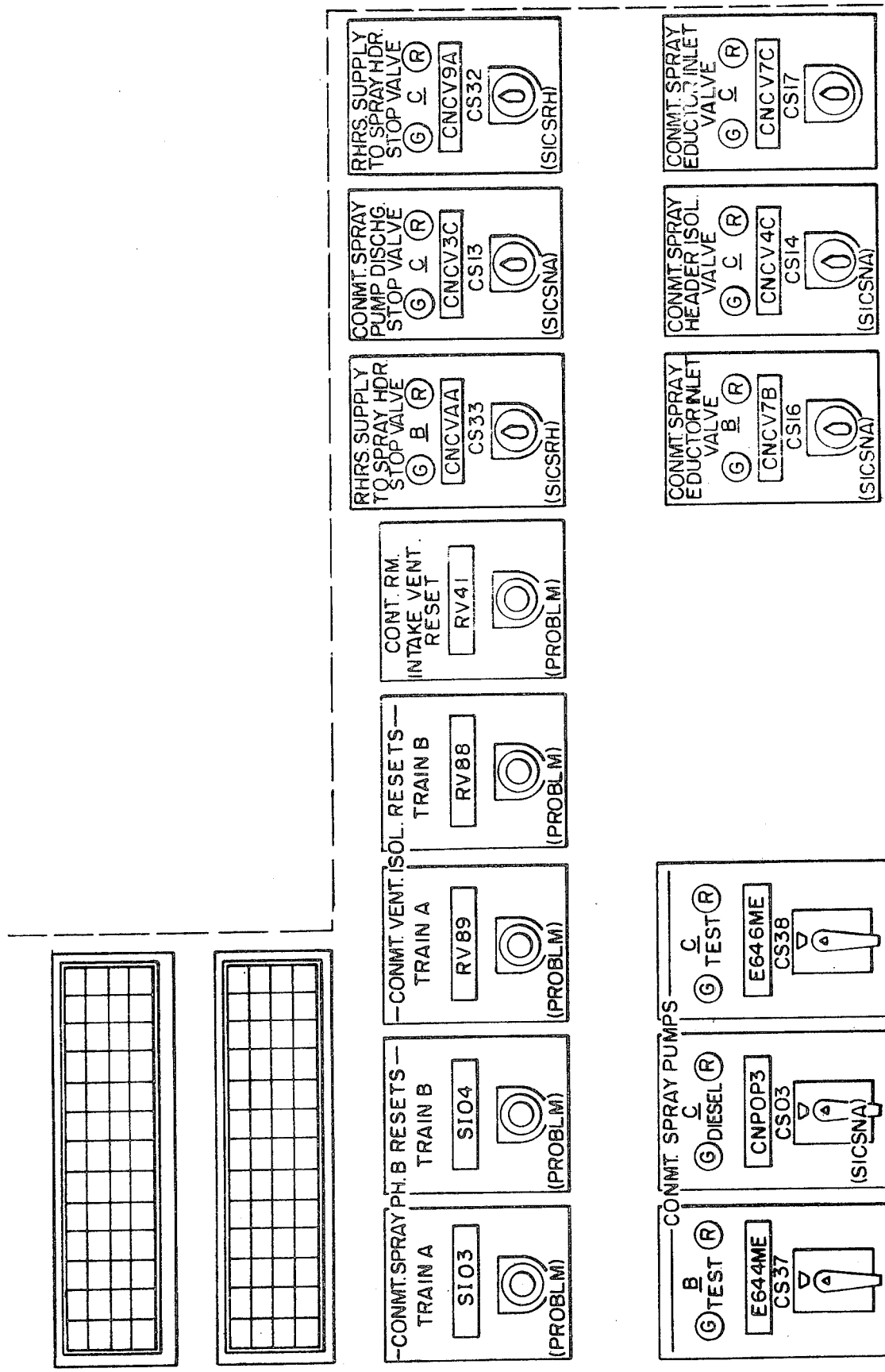

Specifically, and referring to FIG. 2, the simulation system includes a Sigma 5 digital computer 20 referred to at times in this specification also as the C machine and associated peripheral equipment. The Sigma 5 computer system is manufactured and sold by Xerox Data Systems, Inc. and has been in general use for over one year prior to the filing date of this application. For more information on the Sigma 5 computer system reference is made to the appendix.

The simulator also includes digital computers 21 and 22 referred to at times hereinafter also as the A machine and B machine, respectively and associated peripheral equipment of the type manufactured and sold by Westinghouse Electric Corporation, and which is known as model P2000, and which computers have been in general use for over one year prior to the filing date of this application. The P2000 digital computers 21 and 22 are described in a publication entitled "Prodac 2000 Computer Systems Reference Manual" copyrighted in 1970 by Westinghouse Electric Corporation and bears copyright Registration No. A244775, to which reference is made to aid in an understanding thereof.

The Sigma 5 computer, or C machine provides an extensive arithmetic capability for the power plant simulator. The computers 21 and 22, act as process input/output controllers for the C machine. In practicing many features of the invention, a single computer or other multiple computer arrangements may be employed.

Communication between the A, B, and C machines is provided by a combination of the Xerox Data Systems Model 7650 channel interface units 23 and 24, and high speed data link devices 25 and 26 respectively, described more fully hereinafter. The C machine provides the software control and synchronization for the multiple computer configuration involving the A machine, B machine, and C machine; and the A and B machines in addition to providing the process input/output capability for the C machine also provide a capability for instantaneous simulator responses through their external interrupt system, the processing of all interlock and protection system logic, and the processing of several employed in the simulator models, such as a reactor control rods program. The signficiant hardware features associated with each of the A and B machines as shown in FIG. 2 included in the appendix. The major C machine hardware subsystems illustrated in FIG. 2 and utilized in the present embodiment of the invention are also included in the appendix to this specification.

The simulation of the electrohydraulic control system EH as depicted in FIG. 1 and represented by a simulator panel portion 27 of FIG. 2 is accomplished in part by the actual analog electrohydraulic controller manufactured and sold by Westinghouse Electric Corporation, which has been in use for more than a year prior to the filing date of this application. The panels 27 through 35 in FIg. 2 provide the same outward appearance and operation as panels in an actual plant and are connected directly through appropriate computer system equipment to the A machine and the B machine.

Instructor's console 36, which provides the control facility to start, stop and manipulate the simulator is connected to software in the B machine.

A basic real time batch monitor (hereinafter referred to as RMB) software system of the C machine is a two partition system designed for normally running simultaneously foreground and background programs. The foreground programs include the system software extension programs which are made up of a sublevel processor, data link handler, and disc handler. Such foreground programs also include data conversion routines, and various dynamic models for the simulated system, which include reactor models, primary system models, secondary system models, a valve handler routine, a pump handler routine, and a controller handler routine. In order to permit an economy in core memory requirements, in the present embodiment of the invention the foreground programs and the background programs are not run at the same time.

CONTROL PANELS

In controlling an actual nuclear power plant of the type being simulated, the individual control devices such as selector switches, levers, and pushbuttons close contacts to select certain components for operation, to energize motor operated valves, solenoids, and relays; and through a protective system of logic to select, or change the position or condition of various components for starting up, varying operation, shutting down, providing emergency measures in the event of malfunction, and testing components in subsystems of the plant. In addition, certain plant components or subsystems function in automatic control loops to which there are typically applied one or more monitored plant variables as feedback signals.

In monitoring the operation of an actual plant, temperature, pressure, flow, level, flux, and other physical measurements are detected by appropriate sensing devices which transmit such information to the control panels for operating meters, recorders, and indicators.

As already indicated certain monitored variables are also used for control.

In realistically and accurately simulating the control and monitoring of a nuclear power plant in accordance with the present embodiment of the invention, such control panels together with the control and monitoring devices are an exact replica physically and operatively, of the plant being simulated. However, in simulating the system in accordance with the present embodiment, the control and monitoring devices of the control panels are wired to each other, and to turbine EH controller; and also to contact input and contact output terminals, respectively, on the A or B machines. The panel interface logic and the plant protective logic are contained in both the A and B machines as hereinbefore mentioned. The control consoles permit the student operator to control and monitor the operation of the plant in the same manner as the operator of an actual plant. For example, he can start up, increase the power, shut the plant down, and restart. At any time the instructor can change physical values or malfunction the models as previously described. Then the operator can change the operation of the plant to correct the malfunction or introduce emergency measures as required. The student is able to see realistically in real-time the consequences of any action that could be taken in the real plant.

In detailed drawings of the control panels, descriptive legends are associated with appropriate control and monitoring devices in a manner similar to an actual installation; and in addition thereto, software symbols in many instances are used to identify specific control panel devices with the same software symbol being used to identify the component being operated by such devices in the schematic diagrams of the actual system being simulated. In other instances, the actual valve number is used to the schematic diagram and the control panel where it will aid in understanding the simulation of the system.

Figure 92A:
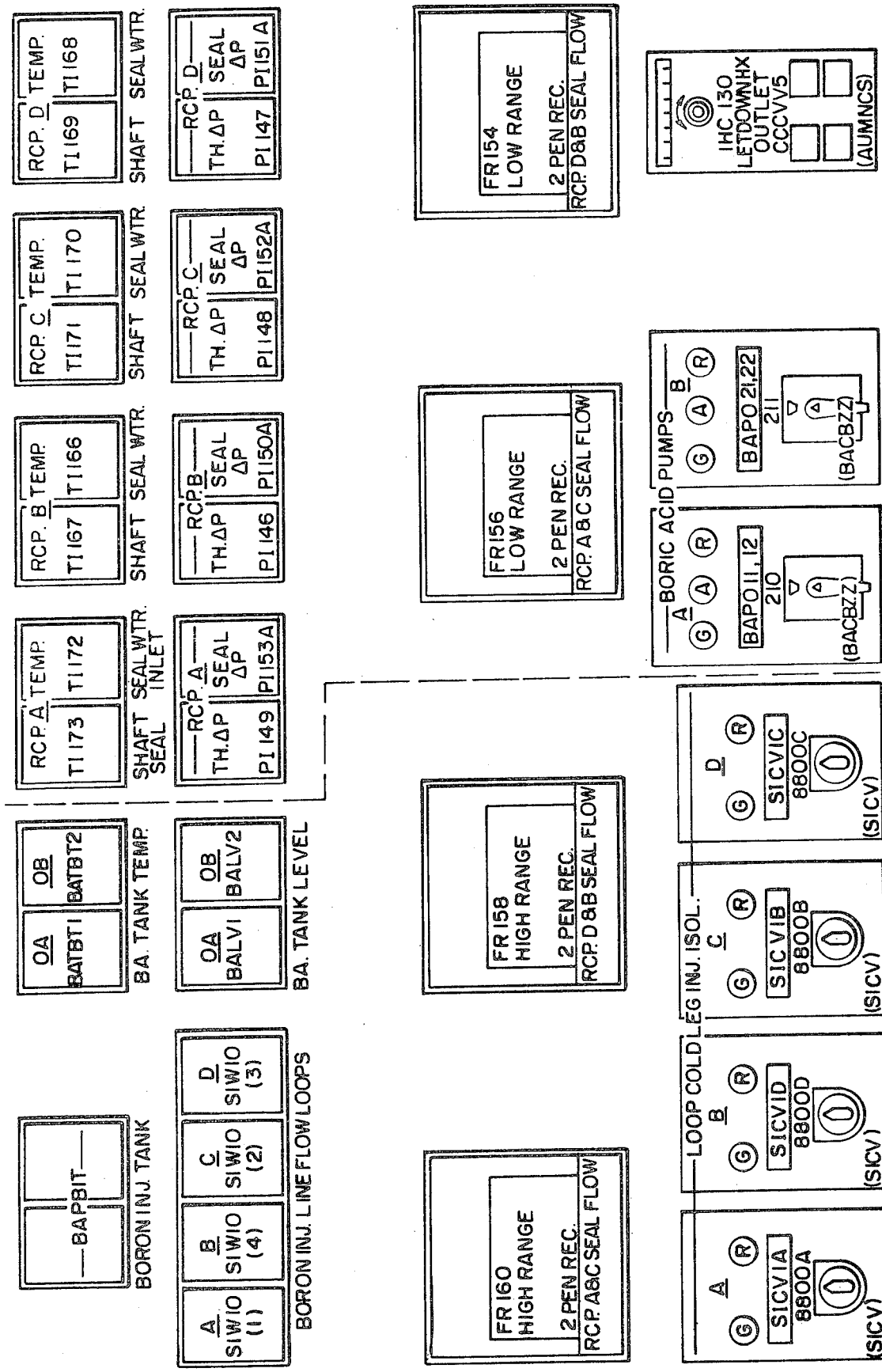
FIGS. 92A through 92N inclusive illustrates the reactor coolant system portion of the control panels of the simulator.
Figure 92B:
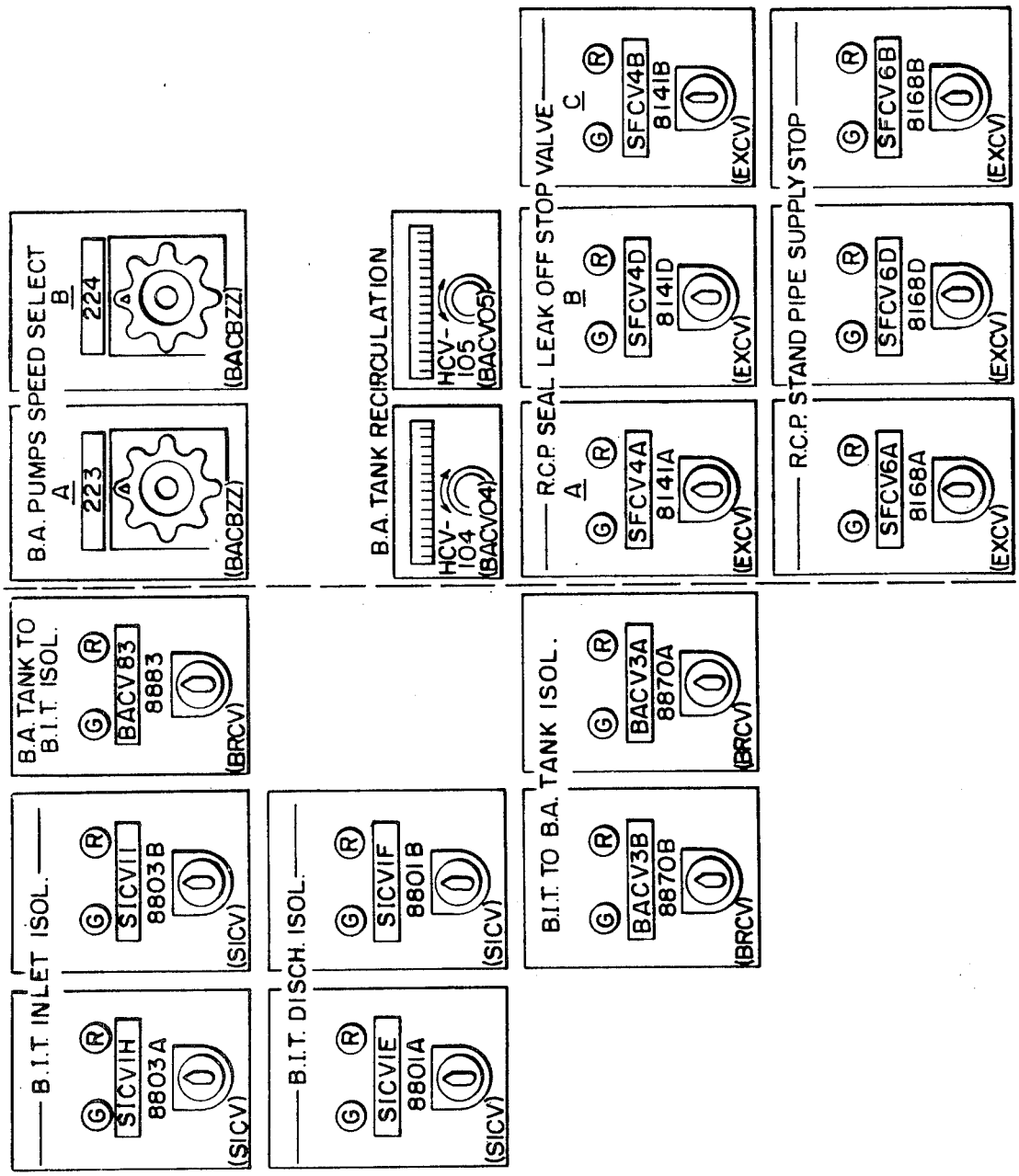
FIG. 92 is the arrangement of FIGS. 92A through 92N.
Figure 92C:
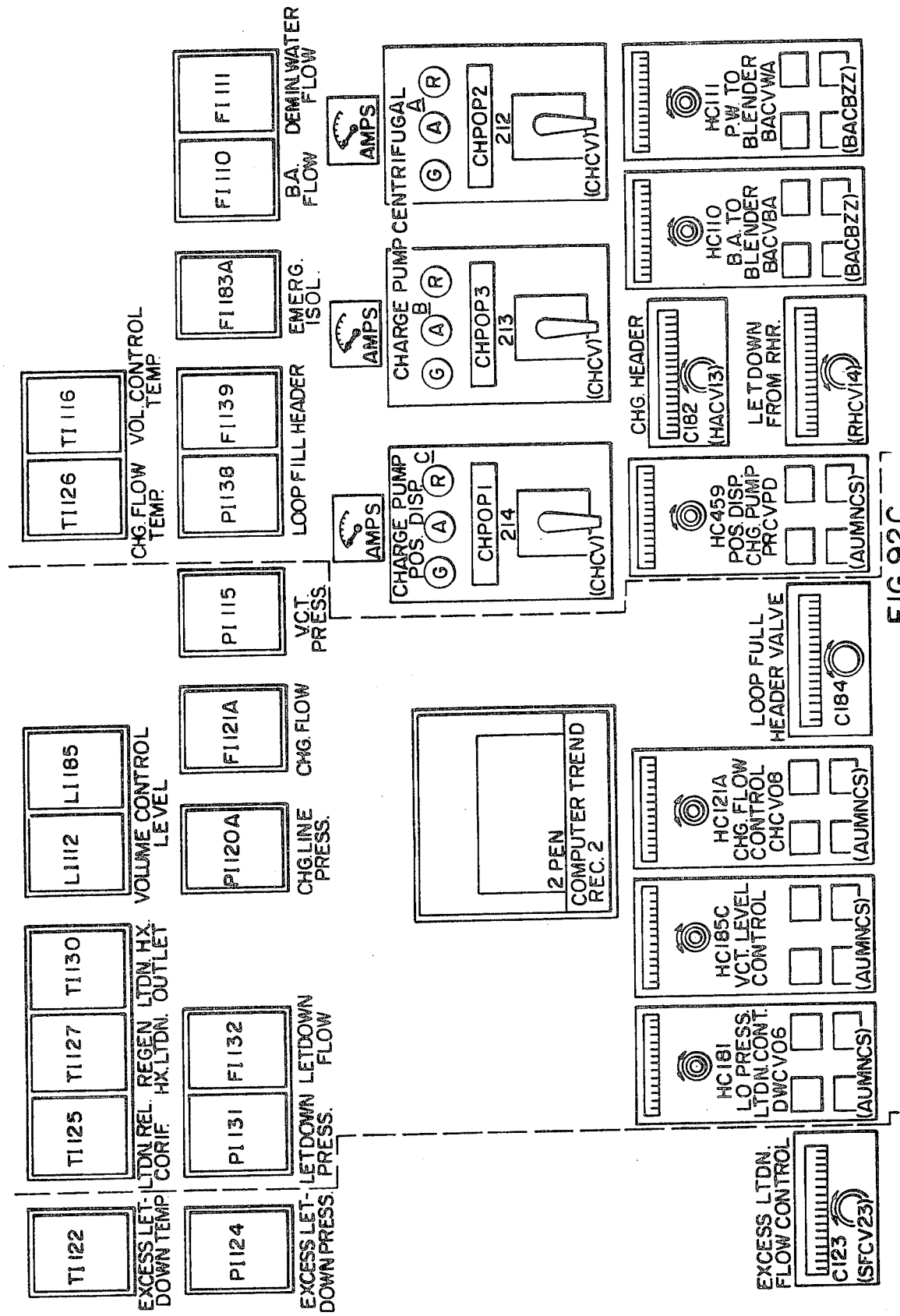
Figure 92D:
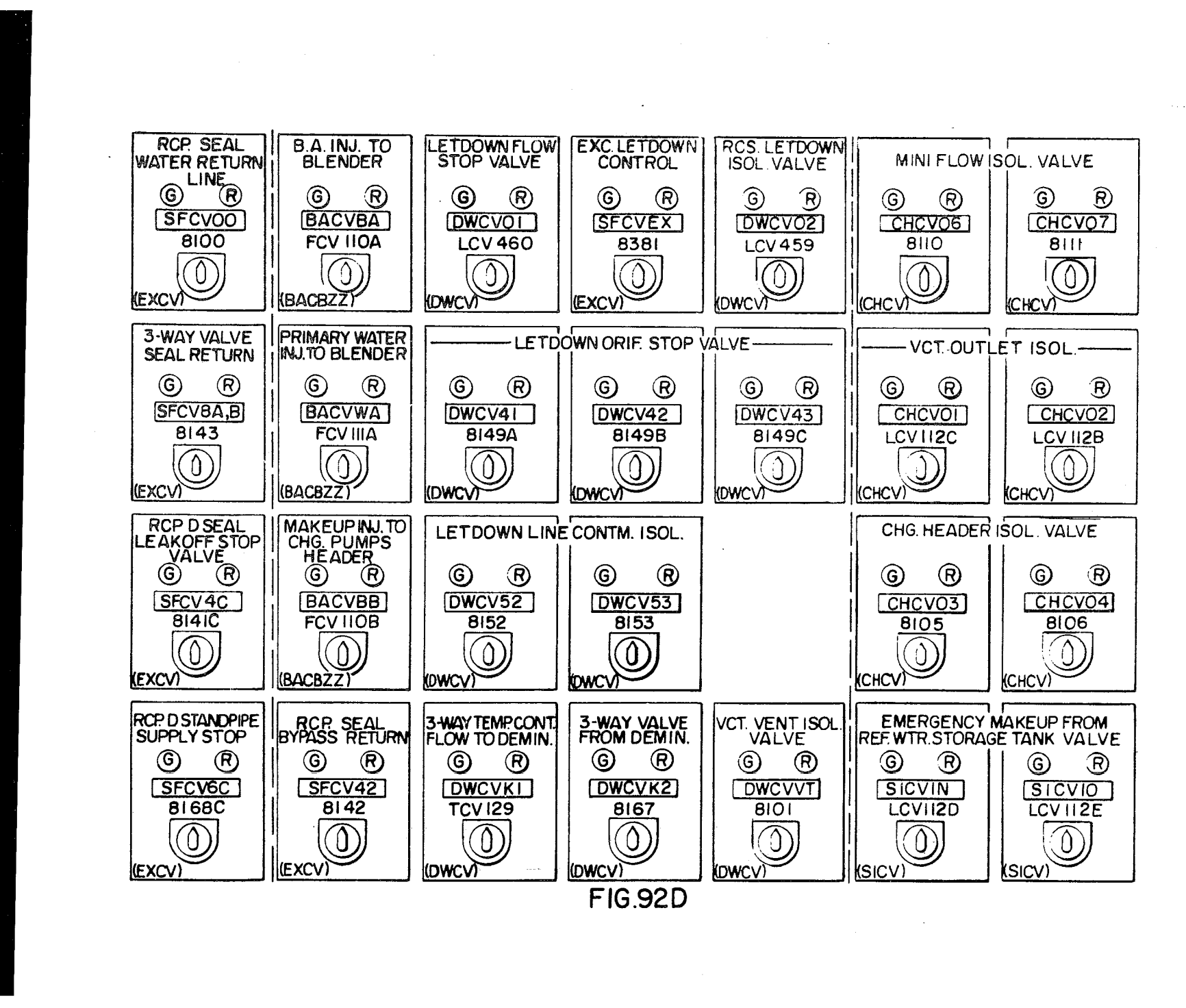
Figure 92E:
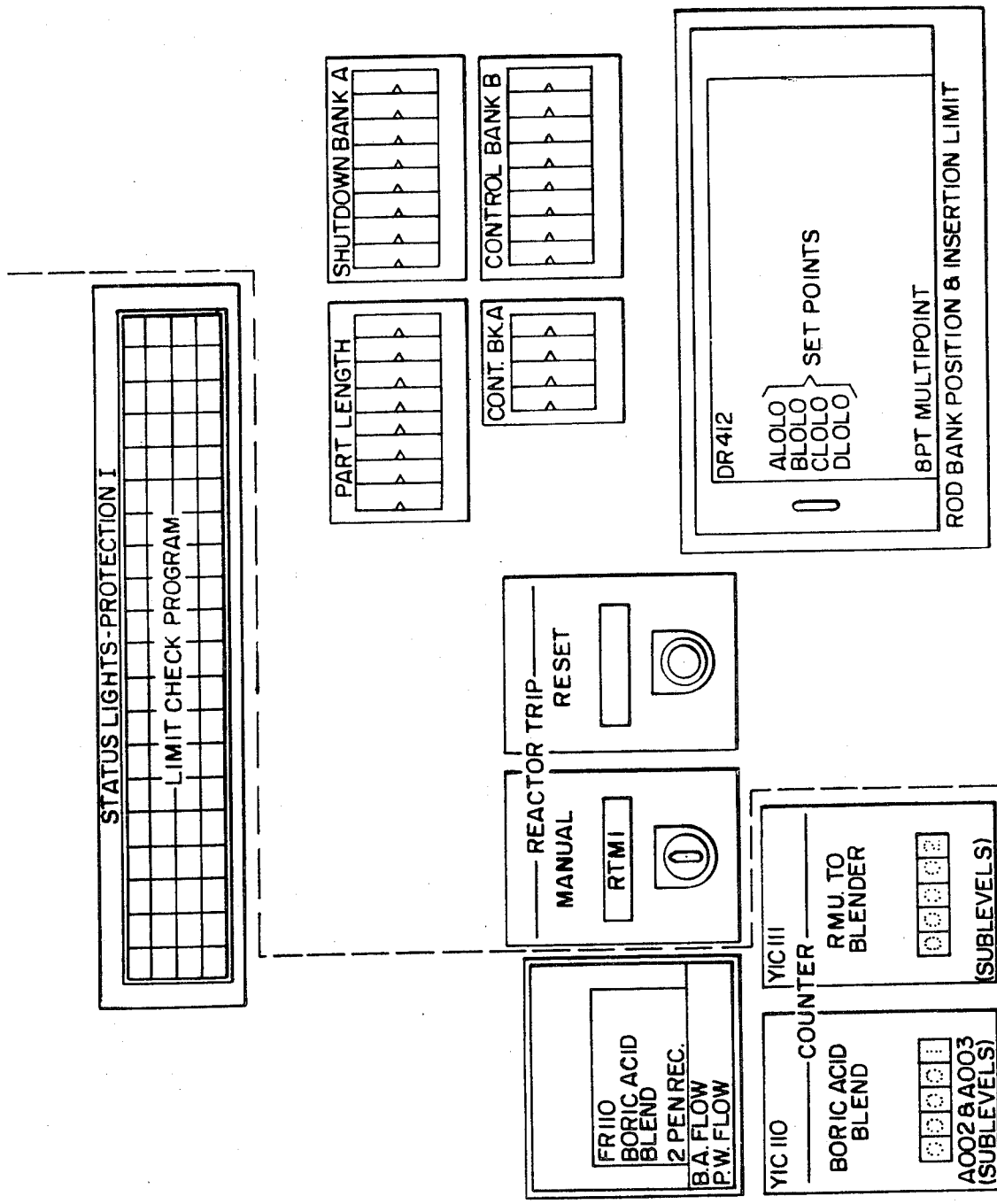
Figure 92F:
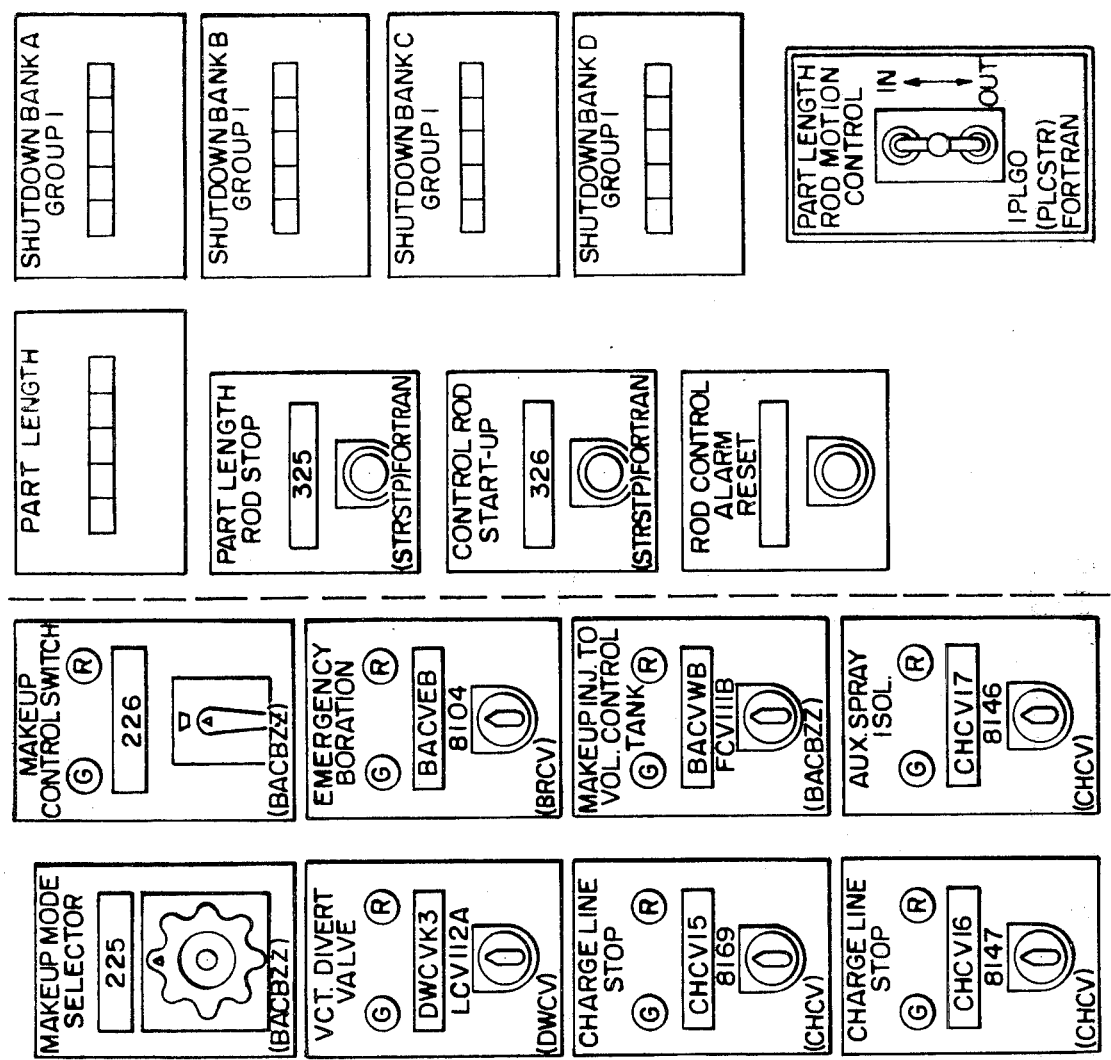
Figure 92G:
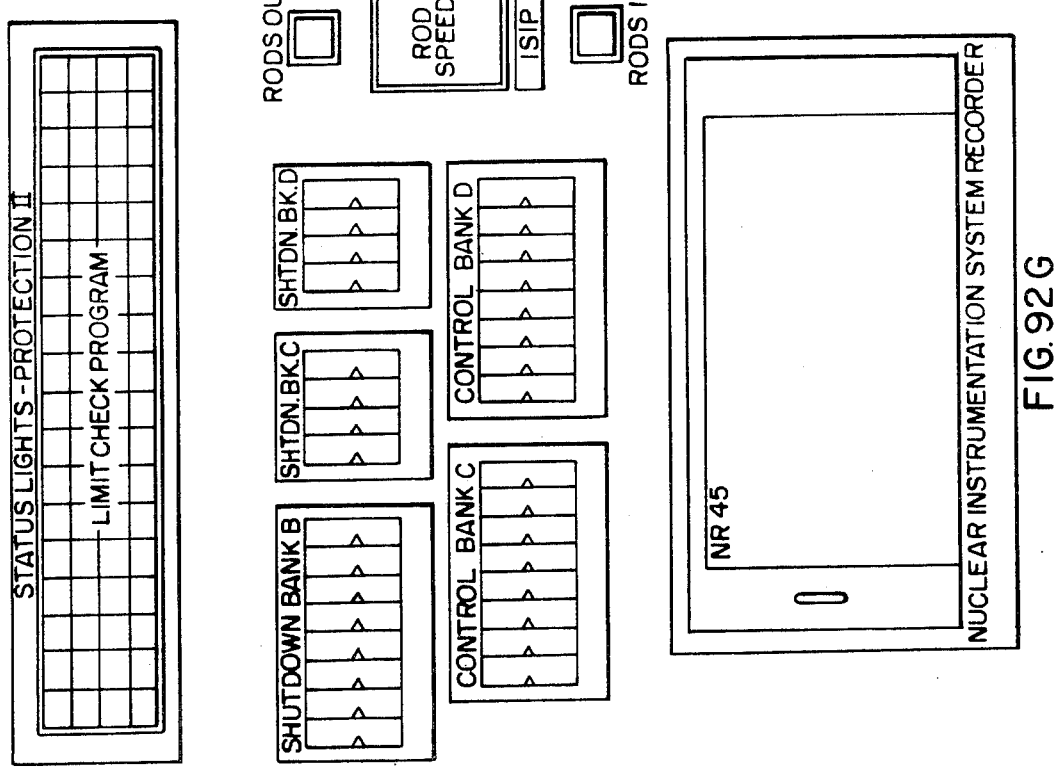
Figure 92H:
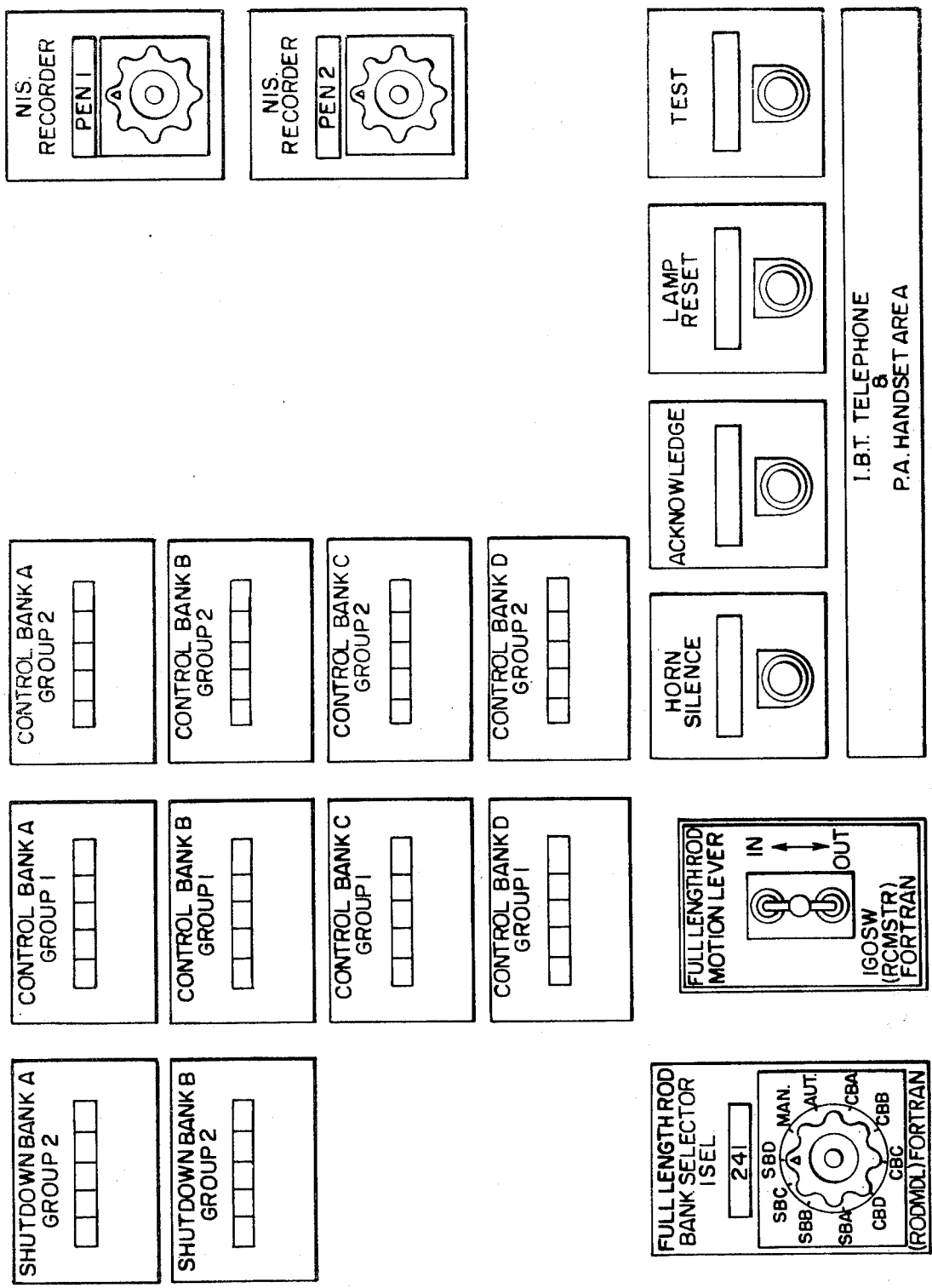
Figure 921:
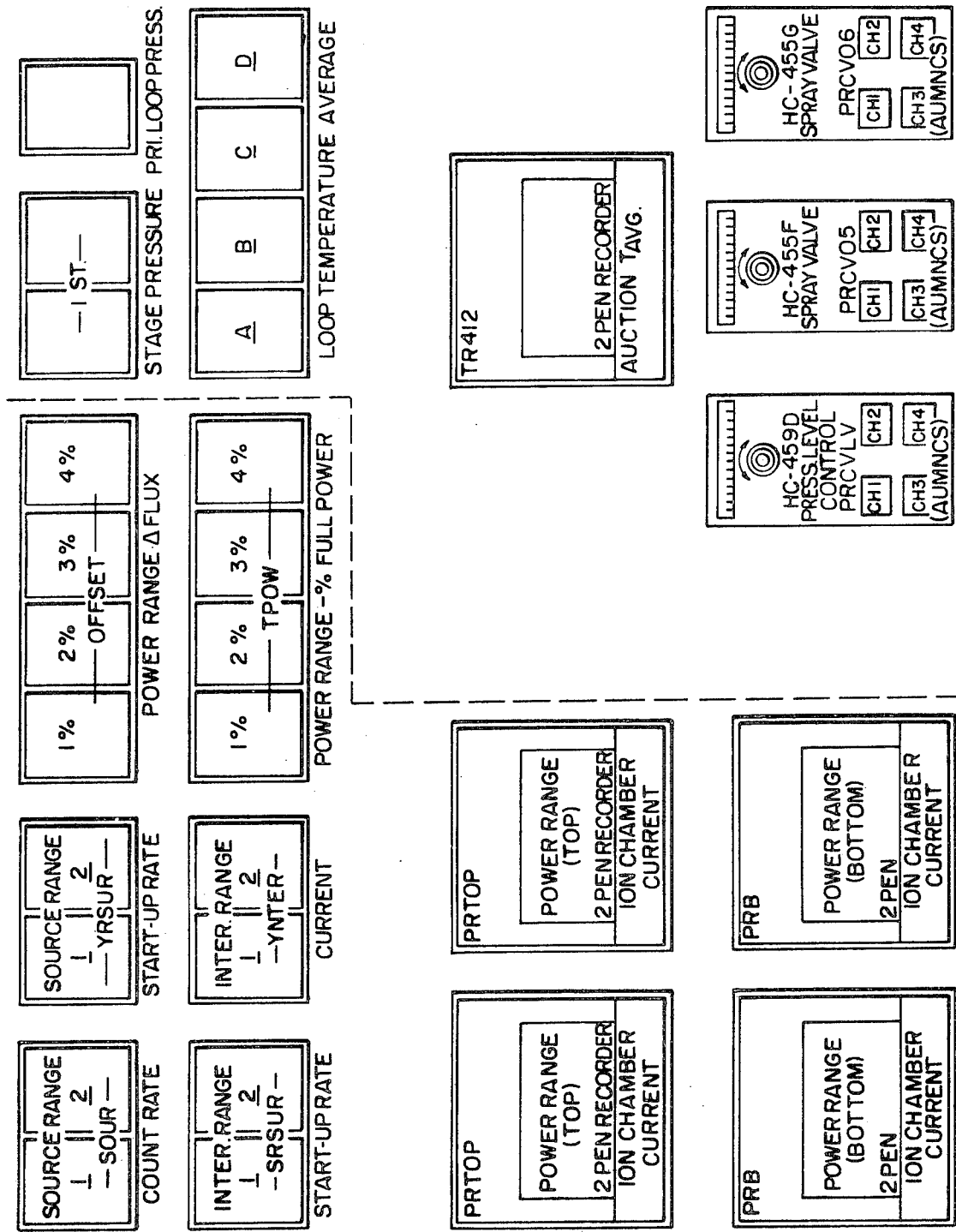

The reactor coolant system panel is represented by the arrangement illustrated in FIG. 92 and in more detail in FIGS. 92A through 92N inclusive. The boron injection system is included in FIGS. 92A and 92B. The reactor coolant pump seal system is included in FIGS. 92A, 92B, 92C, and 92D. The excess letdown system and the letdown system are included in FIGS. 92C and 92D. The makeup water system is included in 92C, 92D, 92E, and 92F. The nuclear instrumentation system and rod control for the reactor is included in FIGS. 92E through 92J inclusive. The pressurizer system is included in the panels 92I through 92L inclusive, and the reactor coolant loop control is included in FIGS. 92K, 92L, and 92M.

REACTOR COOLANT SYSTEM

The reactor coolant system RCS, which transports heat from the nuclear reactor to the primary side of the steam generators SG, is shown diagrammatically in FIGS. 97/1A through 97/1D inclusive. The system in this case comprises four identical heat transfer loops RCL(A), RCL(B), RCL(C), and RCL(D) connected in parallel to the reactor vessel RV. Each loop RCL contains a reactor coolant pump RCP(A), RCP(B), RCP(C), and RCP(D), and a respective steam generator SG(A), SG(B), SG(C), and SG(D). Each loop also includes a respective hot leg stop valve RCCV01(1), RCVV01(2), RCVV01(3) and RCCV01(4). In the cold leg of each loop there is also a respective stop valve RCCV02(1), RCCV02(2), RCCV02(3) and RCCV02(4). A bypass valve RCCV03(1), (2), (3), (4) is provided for each of the coolant loops RCL.

Figure 92J:
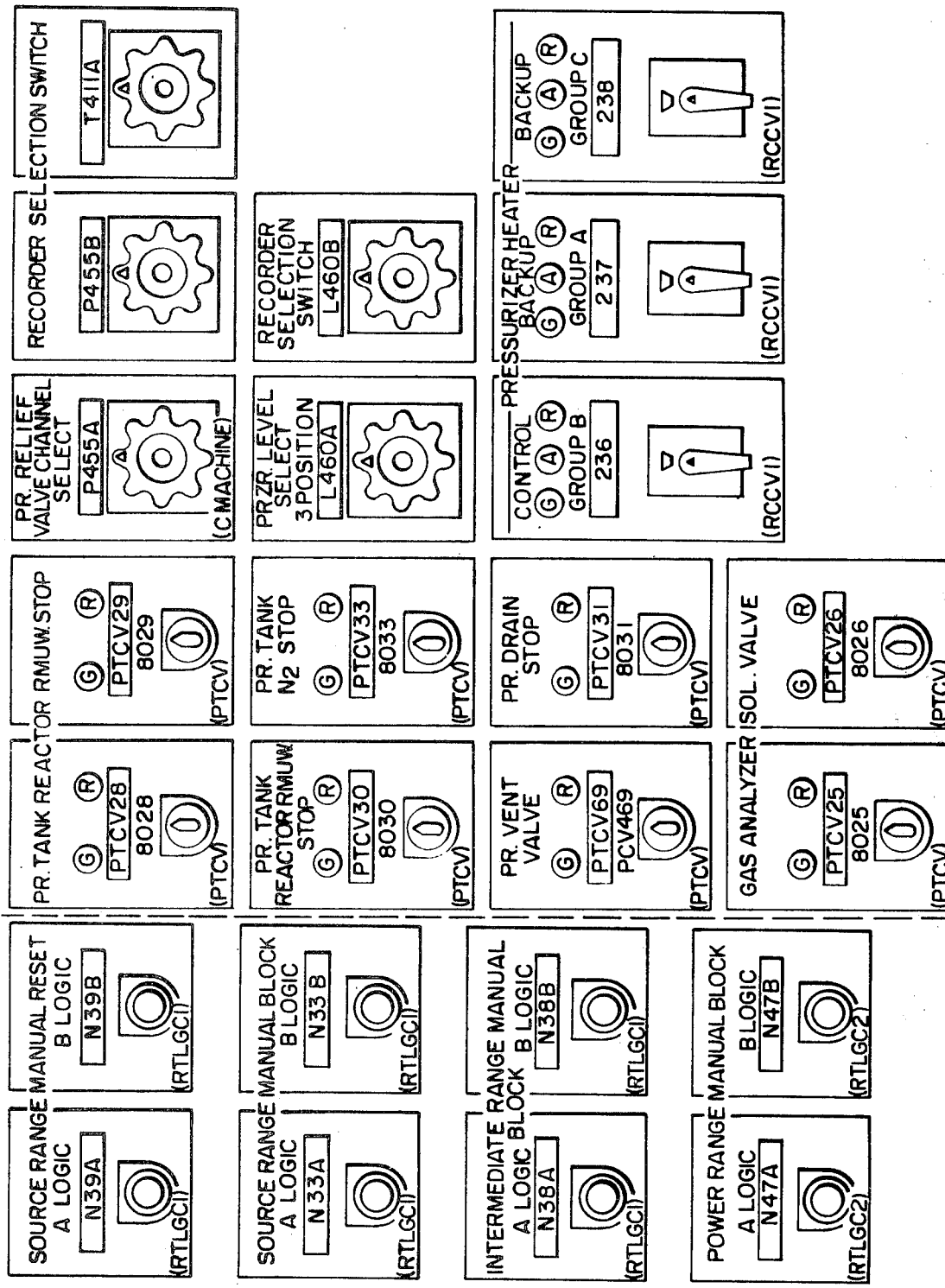
Figure 92K:
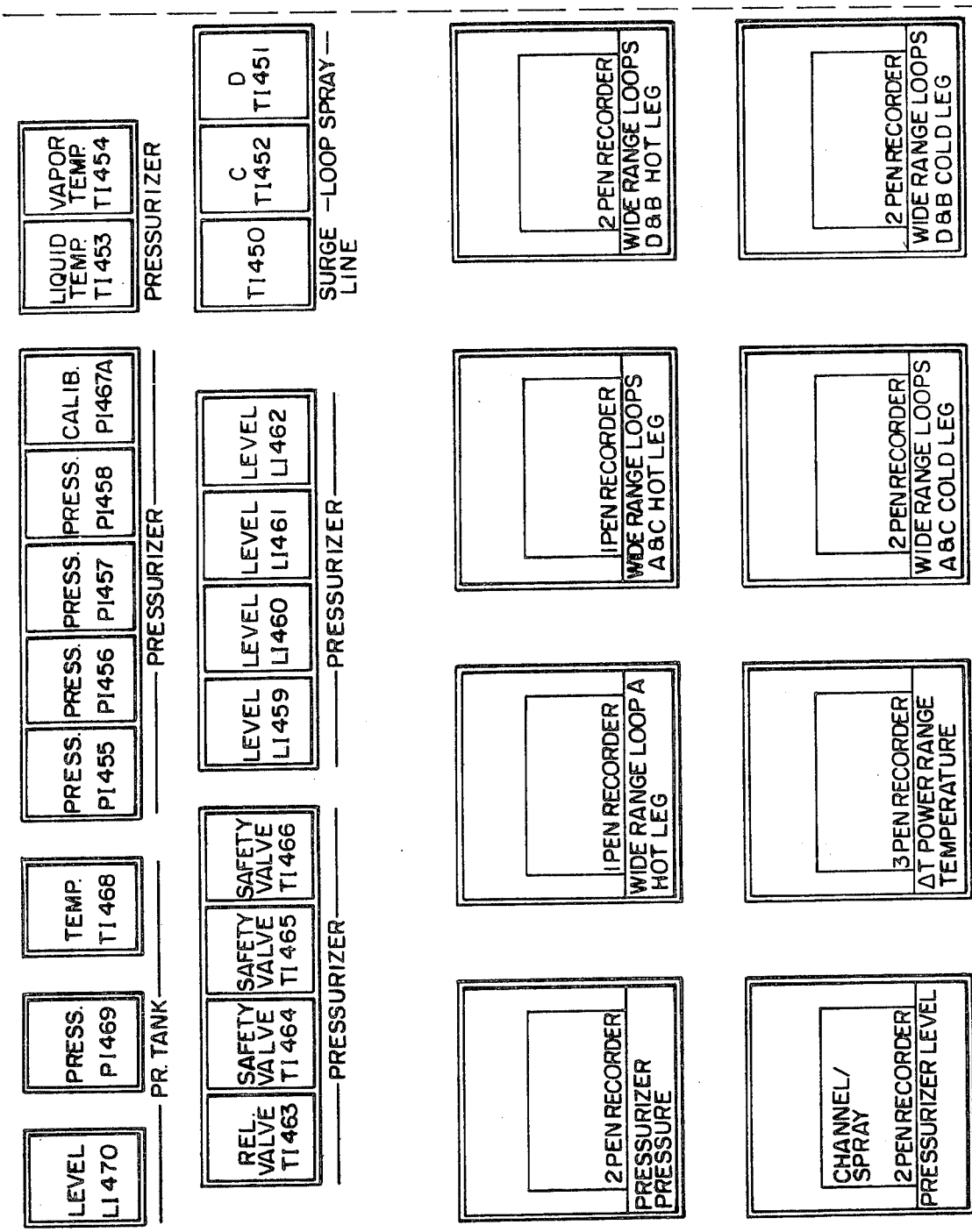
Figure 92L:
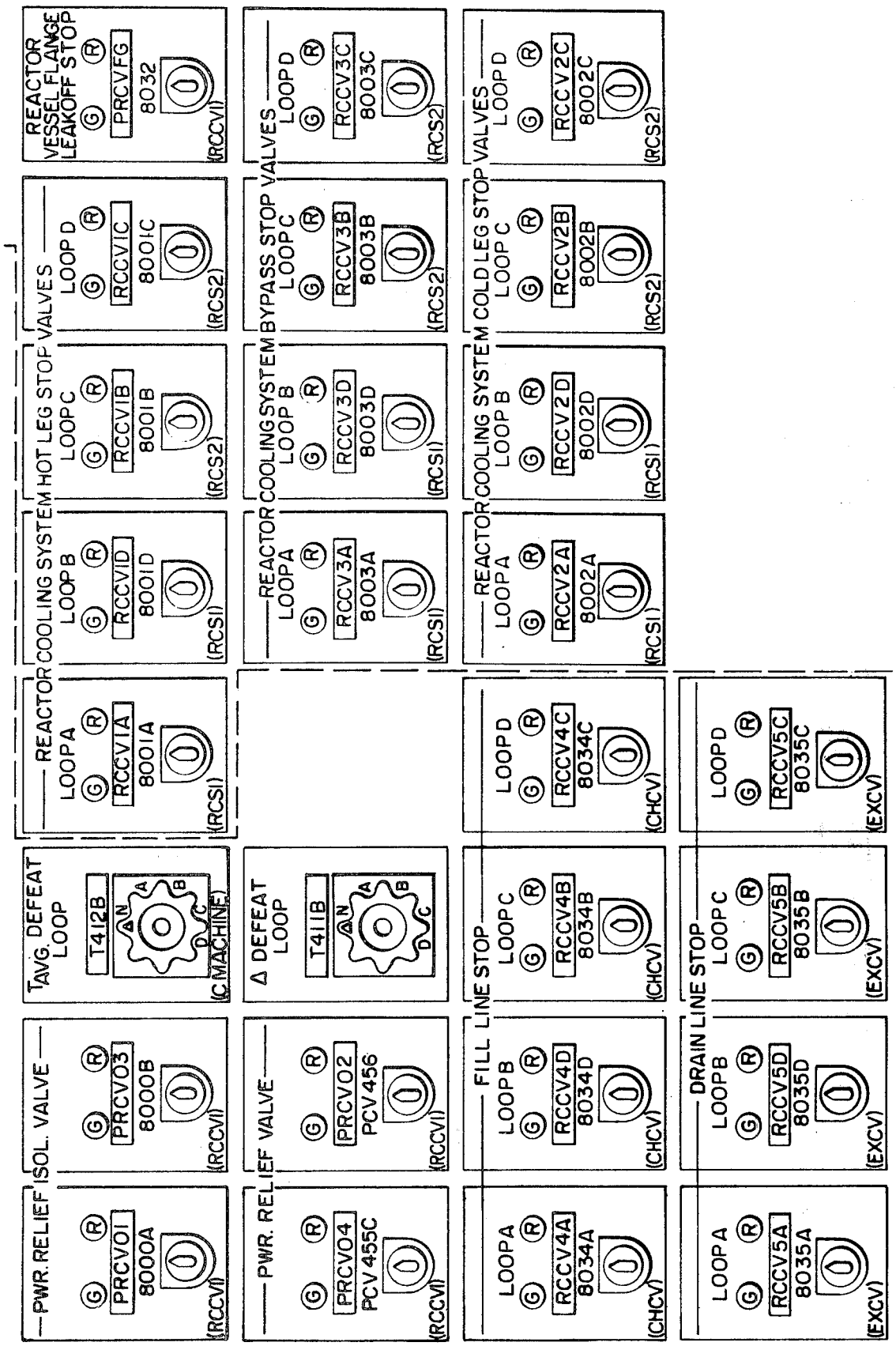
Figure 92M:
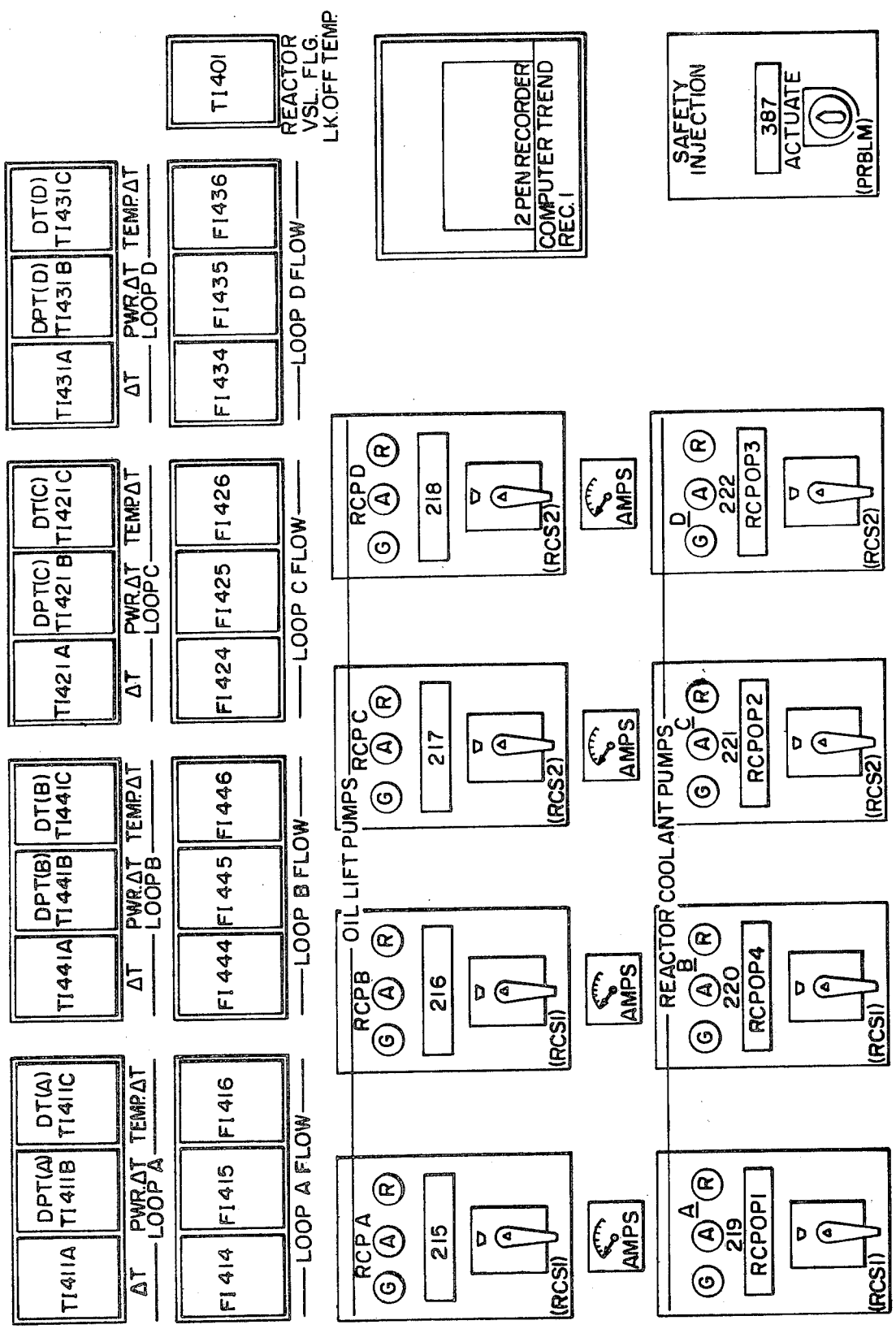

The reactor coolant pumps RCP(A)-RCPA(D), the stop valves RCCVOL and RCCV02, and the bypass valves RCCV03 as well as other valves in the reactor coolant system RCS are controlled remotely from the central control office by the switch mechanisms illustrated in FIGS. 92L and 92M. The instrumentation providing the required signals for reliable and efficient operation and control of the system are transmitted by suitable temperature, flow and pressure elements to pen recorders and meters and annunciators shown in FIGS. 92K and 92M of the drawings.

During chain reaction operation, the reactor coolant pumps RCP(A), (B), (C), and (D) circulate pressurized water at approximately 2,235 pounds per sq. inch through the reactor vessel RV and the four coolant loops RCL(A), (B), (C), and (D). The coolant water, which also serves as a neutron moderator and as a solvent for the boric acid is heated from 530°F at the inlet of the reactor vessel RV to 594°F at the outlet of the reactor vessel RV. For example in loop RCRCL(A), the water flows through the stop valve RCCV01(1) and through the steam generator SG(A) to the suction side of the pump RCP(A). The water is pumped around the loop RCL(A) through the stop valve RCCV02(1) and back into the reactor vessel RV.

For each reactor coolant loop RCL, there is a hot leg manifold HTD and a cold leg manifold CTD in order that individual temperature signals may be developed for use in the Reactor Control and Protection System. In each manifold of the reactor coolant loops RCL there are located resistance temperature detectors to provide $\Delta T/T_{avg}$ signals for the Reactor Control and Protection System. It is noted that in FIGS. 97/1A through 97/1D resistance temperature elements 411A, 421A, 431A, and 441A are located in respective hot leg manifolds HTD of associated loops. Also temperature detectors 411B, 421B, 431B, and 441B are located in each cold leg manifolds CTD of respective loops. The $\Delta T$ and $T_{avg}$ for each loop is indicated on the main control board as shown in FIG. 4A34 by meters which carry an appropriate label. Temperature detectors 413A, 423A, 433A, and 443A, located in the thermal well of the hot leg piping of each respective loop and the cold leg temperature detectors 413B, 423B, 433B, and 443B located in the thermal wells in the cold leg piping of each loop, supply signals to wide range temperature recorders TR413A, TR413B, TR433A and TR433B (FIG. 92K). This information is used by the operator to control coolant temperature during startup and shutdown.

Pressure transmitting element 403 on loop A provides a recorder TR-403 (FIG. 92K) with indication of reactor coolant pressure on the hot leg piping of loop A. This is a wide range transmitter which provides pressure indication over the full operating range. The indicator serves as a guide to the operator for manual pressurizer heater and spray control, and letdown to the Chemical and Volume Control System during plant startup and shutdown.

In each reactor coolant loop, flow is monitored by three differential pressure measurements. The flow elements for loop A are labeled FT416, FT415, and FT414. The flow elements for loop B are labeled FT446, FT445, and FT444. The flow elements for loop C are labeled FT426, FT425, and FT424. For loop D, such flow elements are labeled FT436, FT435, and FT434. The loop flow in each of the four loops is indicated by meters in FIG. 92M which are labeled with numerical suffixes corresponding to the flow elements. Throughout the entire steam plant there are similar pressure, flow, and temperature sensors, but only those associated with the reactor cooling system are shown on the system diagram.

REACTOR COOLANT SYSTEM FLOW MODEL (RCSLP2)

The reactor coolant system RCS flow model T25 (RCSLP2) calculates the flow and pressure distribution around the reactor coolant loops RCL(A), (B), (C) and (D) based on the RCP pump status and valve position, thermal expansion during natural circulation, and curve fit for loss of coolant accident. It provides for simulating the normal flow, reverse flow, natural circulation, and the flows in isolated loops when the main stop valves RCCV01(1) or RCCV02(1) for loop RCL(A), for example, are closed.

The reactor and the coolant flows are calculated as a non-linear flow network. This method utilizes the fact that the flow through each element in the flow network is able to be factored to a squared law relationship with pressure and density; that is, $$W^2 = G(\Delta T . p)$$

where $W$ = flow rate, $G$ = admittance of the element $\Delta P$ = pressure drop across the element $p$ = density of the fluid.

The above equation assumes square law pressure drop is used for valves and piping in the reactor coolant loops. This equation is applied to the hot leg and cold leg piping and the primary side of the steam generators SG. The reactor coolant pumps RCP are simulated by the equation:

$$\Delta P = K_1 N^2 - K_2 W^2$$

where $N$ = pump speed, $K_1$, $K_2$ = pump coefficients $\Delta P$ = pressure head developed, $W$ = flows.

This equation can then be broken into two portions:
1. Pressure source $\Delta P_s = K_1 N^2$
2. Squared law relation $\Delta P_s.p = K_3 W^2$ or $W^2 = G_x(\Delta P_s p)$ The latter portion of the equation can be included with other pressure drops in the flow network. To describe the basic relationships, reference is made to a network for one of the reactor coolant loops RCL shown in FIG. 97/2. Referring to the diagram of FIG. 97/2

$$G_1 = \frac{1}{C_{vht}^2}$$

where $C_{vht}$ = the valve coefficient for the hot leg stop valve 8001A $$G_2 = \frac{1}{C_{vbp}}$$

where $C_{vbp}$ = the valve coefficient for the bypass valve 8003A $$G_4 = \frac{1}{C_{vcl}^2}$$

where
$C_{vcl}^2$ = the valve coefficient for the cold leg stop valve RCCV03(1)
$G_3$ = the equivalent admittance for the hot and cold leg piping, steam generator tubes, and the reactor coolant pump loss coefficient;
$W_1$ = the square of the flow through the hot leg valve RCCV01(1);
$W_2$ = the square of the flow through the bypass valve RCCV03(1);
$W^1$ = the square of the flow through the steam generator SG(A) and the hot and cold leg piping volume.
$\Delta P_1 = \Delta P_r \phi p_1$;
where $\Delta P_r$ = the pressure drop across the reactor and $p_1$ = the density of the flow through the reactor.
$\Delta P_2 = \Delta P_s \phi p_2$;
where $\Delta P_s = K_1 N_2$; $p_2$ = the density of the liquid in the cold leg of the loop.

In solving the network of FIG. 97/2, the method involves:
1. Summing the flow of the reactor coolant at the junction $W^1$, and:
$W^1 = W_1 + W_2 + 2(W_1+W_2)^{1/2}$ ;
2. Then in solving the flow loops:

$$\Delta P_1 = \frac{W_1}{G_4} - \Delta P_2 + \frac{W^1}{G_3} + \frac{W_1}{G_1}$$

(3) and: $\Delta P_2 = \frac{W^1}{G_3} + \frac{W_2}{G_2}$, by substituting (1) above into (2) and (3) yields (4) $\Delta P_1 + \Delta P_2 = \frac{2(W_1+W_2)^{1/2}}{G_3} = W_1 \left[ \frac{1}{G_1} + \frac{1}{G_4} + \frac{1}{G_3} \right] + \frac{W_2}{G_3}$ (5) $\Delta P_2 - \frac{2(W_1+W_2)^{1/2}}{G_3} = \frac{W_1+W_2}{G_3} + \frac{W_2}{G_2}$ When equations (4) and (5) are solved simultaneously the square of the flow through the hot leg valve RCCV01(1)

(6) $W_1 = \frac{G_1 G_4 G_3 A_1 + B_2 - A_2 + G_2}{B_1 + B_2 - G_1 G_2 G_4}$ and the square of the flow through the bypass valve RCCV03(1)

(7) $W_2 = \frac{A_1 G_1 G_2 G_3 G_4 - A_2 G_2 G_3 B_1}{(G_1 G_2 G_4 - B_2 B_1)}$ where: $A_1 = \Delta P_1 + \Delta P_2 - \frac{2(W_1+W_2)^{1/2}}{G_3}$ $A_2 = \Delta P_2 - \frac{2(W_1+W_2)^{1/2}}{G_3}$ $B_1 = G_1 g_3 + G_1 G_4 + G_4 G_3$
$B_2 = G_2 + G_3$ The above expressions provide the values for the general case. The equations reduce to specific cases as follows for the various combinations of the stop valves RCCV01(1) RCCV02(1) and bypass valve RCCV03(1):

Normal situation: when bypass valve RCCV03(1) is closed the result is $$W_1 = \frac{G_1 G_3 G_4 + (\Delta P_1 + \Delta P_2)}{B_1}$$

$W_2 = O$

When loop A is isolated with the cold leg stop stop RCCV01(1) or the hot leg stop valve RCCV01(1) closed:
$W_1 = O$ $$W_2 = \frac{G_2 G_3 \Delta P_2}{G_2 + G_3}$$

When both hot and cold leg valves RCCV01(1) and RCCV02(1) are closed and bypass valve RCCV03(1) closed
$W_1 = 0$
$W_2 = 0$ The positive or negative sign of $(\Delta P_1 + \Delta P_2)$ is checked to determine flow direction. If the sign of the sum is positive a forward or normal flow exists; and if the sign of the sum is negative a reverse flow condition exists in the reactor coolant loop RCL. Under conditions of natural circulation $\Delta P_2$ in the above calculation is replaced by $\Delta P_N$ where $\Delta P_N$ is the term for the thermal driving head calculated as follows $$\Delta P_N = H_i + \frac{1}{V_{ce}} - \frac{1}{V_{co}}$$

where $V_{ce}$ and $V_{co}$ are cold and hot leg specific volumes, respectively. The elevation difference $H_i$ is an assigned constant based on the reactor thermal center being at the center height of the core and the steam generator SG(A) thermal center assumed to be a small distance above the tube sheet. The reactor vessel outlet to cold leg density difference is based on enthalpies from the heat balance.

The miniflow around the cold leg stop valve RCCV02(1) is based on pressure drop across this cold leg valve by the equation $$RCWMBP(I) = RCKEFF \frac{RCP6(I) - RCP8}{RCSPV}$$

When a loop is isolated with both the hot leg valve RCCV01(1) and cold leg stop valve RCCV02(2) closed, the pressure in the loop RCL(A) is based on a bulk modulus calculation from net volume change due to thermal expansion and net flow (i.e., seal flow to loop, plus fill header flow, less equalizing miniflow and drain header flow) to the isolated loop RCL(A). From this pressure at the reactor vessel outlet, inlet pressure is calculated by using the solution of the equation in the inlet pressure to the reactor $$RCPR8 = RCPR1 + \frac{(RTWC)^2 \, RCSPV}{(RTKCOF)^2}$$

For a loss-of-coolant accident such as a cold leg pipe break, for example, the reactor vessel inlet pressure is obtained from this break admittance while the outlet pressure is obtained from this pressure drop across the vessel hereafter described.

A first order differential equation is used to describe a startup and coast-down of the reactor coolant RCP(A) pump, where the speed is calculated from this expression; and the motor current is obtained as a linear fit. Next, the conditions required for this basic case are checked. The test is made for valve position, and the admittances are calculated. Next, the coefficients $B_1$ and $B_2$ described above are calculated. The head developed by the RCP is given as:

$$RCPD2 = RCK1 * RCNP1(I)^2 \; \frac{1}{(RCSPV)^{2*}}$$

where RCK1 is a constant obtained from the pump characteristics. In the case of the loss of coolant accident and when the pressurizer is empty, RCK1 is slowly ramped down to simulate pump cavitation effects.

Minibypass flow is calculated from the above equation, when $\Delta P$ is greater than 0. In the case of the isolated loop, the minibypass flow is the function of the change of mass in the isolated loop as well as the net flow.

The cases outlined above are calculated as follows. Each case is treated separately, with provision for natural coolant circulation.

In the normal case, the bypass valve RCCV03(1) is closed. The calculation follows expressions described in connection with the normal case above. When the driving head is negative, a reverse flow calculation is established:

$$RCW3(I) = - RCW3(I)$$

Two conditions can be distinguished where: anyone or more of the four RCP pumps are running or RHR flow exists, and natural circulation. In the first instance, the pressures are calculated starting from the reactor vessel pressure and using pressure drop equations of the form:

$$P_2 = P_1 + W^2 * \frac{V_{s1}}{G}$$

where:
- $P_1, P_2$ are inlet and outlet pressures in the loop segment, respectively;
- $W$ is the flow in the segment;
- $V_{s1}$ is the specific volume of liquid, based on the average enthalpy of the segment; and
- $G$ is the admittance of the segment In the case of natural circulation equation (9) previously set forth is used. The flow calculation has the same form as in the case with the pumps running but with elevation during head replacing pump$\Delta P$.

In the case when the bypass valve is not completely closed the heretofore described equations (7) and (8) are used. Again, the two cases mentioned above follows essentially the same equations, but the bypass flow is obtained from the pressure difference RCP6(I)-RCP-2(I) and the bypass admittance. This in turn affects the flows RCW1(I) and RCW7(I) through flow continuity.

For an isolated loop where the cold or hot leg main stop valves are closed the bypass flow is calculated in accordance with the description of cold or hot leg step valves closed above. The flow RCW3(I) is calculated now as a sum of bypass and minibypass flows. The pressure RCP6(I) is obtained by using equation (1).

In the case when both stop valves are closed, the loop is isolated. Here, two cases are distinguished: RCP6(I)<RCP8(I) in which case RCP6(I) by bulk modulus is a function of the change in volume due to thermal expansion and net inflow less outflow; and RCP6(I) $\geq$ RCP8(I) in which there is minibypass flow and therefore RCP6(I) is this function of RCP8 and pressure drop. These cases describe the action of the check valve in the equalizing miniflow line.

Because of the open bypass valve, pressure RCP2(I) is a function of RCP6 and the pressure drop on the valve.

The calculation for an isolated loop with all valves closed is as follows:
RCWS(I)=RCW7(I) + RCWMBP(I)
and
RCW1(I)=RCW8(I)

To obtain flow through the RTD bypass it is assumed that 1% of the loop flow goes through the RTD piping. RC pump suction pressure is obtained from the pump characteristics and the discharge pressure by using the expression:

$$RCP5(I)=RCP6(I)- \frac{RCK1* [RCNPi(I)]^2}{RCSPV} - \frac{[RCW3(I)]^2 * RCSPV}{RCK2}$$

the loop flow RCWF(I) is then the sum:

$$RCWF(I) = RCW3(I) + RCWLK1(I) + RCWLK2(I)$$

total flow to the reactor core is:

$$RTWC = \sum_{i=1}^{4} RCW8_i + RHWF20 + RHWF21$$

For the major loss of coolant accident, prerecorded design transmits are used. Transient responses in the reactor flow, leak flow through the break and pressurizer pressure are curve fitted for four different break sizes: double ended break, 4.5 ft$^2$, 3 ft$^2$, 0.5 ft$^2$. The curve fits are piece wise fits with true portions of the curves approximated by combinations of linear and second order polynomials. The normal flow calculation is followed until the pressurizer empties with the break flow superimposed on the normal flow. When the pressurizer empties, the reactor flow is fitted, and superimposed on the existing flow. In both cases the magnitude of flows is checked against the Safety Injection flow. In a case, when the prerecorded break flow becomes smaller than the Safety Injection flow, it is assumed that the Safety Injection flow then determines the flow being delivered to the containment building.

REACTOR COOLANT LOOP THERMAL MODEL (RCSLOP)

The simulation of the RCS thermodynamics, which is contained in subroutine RCSLOP, is closely tied into the calculations in RCSLP2 hereinbefore described. The thermal calculations involve reactor coolant loop enthalpy distribution based on the flow direction (forward or reverse) and average temperature in the reactor and steam generator and volume surge or thermal expansion. The volume surge calculation serves as an input to the pressurizer simulation. This model represents major connections between the reactor and secondary system. Both forward and reverse flows are simulated as well as isolated and non-isolated loops.

The RCS thermal calculations generate coolant enthalpies at various points in the coolant loops including the reactor inlet, temperatures at the steam generator primaries, and at the resistance temperature detector manifold instrument taps, and the surge for the pressurizer.

With reference to FIG. 97/1D, the reactor coolant loop RCL(D) includes symbols at the various points in the system for the thermal calculations. Although a single loop RCL(D) of the four loops is illustrated and described with the symbols, in practice, the equations are repeated for all four loops by means of subscripted variables and FORTRAN DO loops.

Also, with reference to FIG. 97/3, the required input to the reactor coolant loop thermal calculations are reactor coolant flows through all possible paths, the reactor outlet enthalpy, steam generator net heat fluxes (SGO) (I), coolant pump heat generation for startup and all of the flows and enthalpies for the various reactor coolant loop tap points, such as charging flow, letdown flow, pump seals, safety injection, surge line, residual heat removal and fill and drain headers. Also required is the ambient temperature of the containment (CNTC) which is used in calculating conductive heat losses.

When there is a simultaneous rapid lowering of the other temperatures in the reactor coolant loop RCL, the upper dome of the reactor is the hottest point in the loop. This condition results from the long time constant of the upper dome, which receives only about 0.5% of the total coolant flow from the inlet side of the reactor into a volume of over 700 cubic feet.

The heat balance for the reactor upper dome is represented by the equation:

$$\frac{RTVUP}{RCSPOL} \frac{d}{dt}(RTTUP) = RTWUP * (RCTPT - RTTUP)$$

where the flow to the dome RTWUP is equal to the 0.5% of the reactor flow. The result of this equation is then compared with the reactor outlet plenum temperature and a maximum taken for the saturation pressure calculation.

The energy balance of the reactor outlet dome or plenum is calculated based on the first order differential equation for the reactor vessel outlet enthalpy RTHPO as follows:

$$\frac{RTVOP}{RCSPOL} \frac{d}{dt}(RCHPO) = (1 - RTKON) * RTHPO + RTKON * RTHBP$$

$$* RTWC \cdot RTZHL + RTWBY - RTHPI - RCQWAL$$

where the variable values in the above equation are defined in the nomenclature list included in the appendices hereinafter. The reactor core outlet enthalpy RTHPO, is obtained from the reactor thermal calculations, as well as the core bypass enthalpy RTHBP, which corresponds to the reactor core inlet enthalpy. The term RTZHL is the total energy delivered to the reactor coolant water in accordance with the following equation:

$$RTZHL = \sum_{i=1}^{4} RCW1(i) * RCH1(i) + RHWF1 * RCHPO + RTQLST$$

It should be noted that if the flow reverses in one or more of the loops, the concerned RCW1(i) becomes an inlet stream to the reactor plenum and subsequent branches of the program will then determine the corresponding enthalpy from the reverse flow loop simulation rather than the plenum heat balance.

In the two previous equations, RTQLST represents the reactor and adjacent piping heat losses to ambient and RCQWAL represents the total primary plant heat flow due to metal storage. Both values are lumped at the outlet plenum of the reactor. The loss term is calculated as $$RTQLST = 0.9476(RCTPO - CNTC)$$

and the metal storage as RCQWAL equals 1800.(RCTPO-RCTWAL)
where $$\frac{d}{dt} RCTWAL = \frac{1}{180.}(RCTPO - RCTWAL)$$

The flow of the reactor cooling water through the loop is subjected to delays in the piping caused by friction and by lags caused by mixing such as in the reactor and the steam generator. These transport delays and the mixing lags are represented as first-order lags. Each reactor coolant loop is divided into transport and mixing sections as shown in FIG. 97/3. Where appropriate, additional heat transfer terms such as pump heat generation, are added in these sections of the loop.

As previously discussed the requirement to handle flow reversal in the reactor coolant loops occurs from shutdown of a coolant pump RCP without closing its associated stop valve. Pumps in opposite loops are then subjected to reverse flow through the shutdown loop. Reverse flow with all pumps off can also result from injected flows such as from the residual heat removal system or the safety injection system. The procedure for effecting the simulation of such flow reversals is as follows: First, a separate branch of the calculation is followed when flow reverses. Then, the new branch, in effect, processes the transport legs in reverse order, interchanging inlets and outlets. At the time of flow reversal, the lag integral at the section outlet is reinitialized to the former value of the inlet. Since the previous enthalpy distribution in the loop is preserved, but transport is initiated in the opposite direction the same procedure is utilized to obtain a re-reversal of the transport direction upon returning to forward flow.

The mixing of fluid streams, for example, where safety injection or residual heat removal flows are added, is handled generally by algebraic mixing equations as follows:

$$h_m = \frac{\sum_{j=1}^{n} w_j h_j}{\sum_{j=1}^{n} w_j}$$

where $W_j$ are flows into the mixing node. Test branches are provided to prevent division by zero in the event that the denominator approaches zero. In addition, when individual flows are reversed which is represented by a change in sign, the reversed flows and ethalpies are removed from the summation, inasmuch as they then represent outflow rather than inflow for the nodal junction point.

The dynamic properties of the control volume; that is, the volume which is used in the calculation section are described by the differential equation as follows:

$$m\, dho = W_T(h_i - h_o) + Q$$

where $Q$ is the energy running in or out of the control volume section with the proper sign and $m$ is the mass of water in the control volume section. The mass is calculated from the ratio of the total volume and specific volume based on the last average enthalpy, $$h_{avg} = \frac{h_i + h_o}{2},$$

or $m$ equals $$\frac{V}{v}$$

where $V$ is the volume, and $v$ is the specific volume of water obtained from this function, $v = f(h_{avg})$. The enthalpies obtained from the dynamic equations are further used, after conversion into temperature where necessary for control and display purposes. The conversion is accomplished by using the function TWATER(h) described elsewhere herein.

The reactor core inlet enthalpy is calculated by the same method as above described by utilizing the reactor inlet plenum as the control volume. In this situation, the fluid mixing of the separate streams coming from the four coolant loops is taken into consideration.

The procedure in utilizing the previously described equations is as follows. A DOLOOP routine is used to facilitate the use of the four reactor coolant loops. Any malfunction attached to the reactor coolant loops are checked together with the forward or reverse flow condition.

The hot leg control volume includes the hot leg piping together with the associated inflows and outflows. In this instance, inflow is given by the reactor coolant flow, RCW1(I), pressurizer surge flow PRWSUR, by-pass flow, RCWBYP and safety injection flow, SIW2-0(I). (See FIGS. 97/1D and 97/3) The mixing equation (1) described heretofore gives the inlet enthalpy to this control volume, RCH2(I). The corresponding temperature RCT2(I), which is also used elsewhere is generated using the steam and water property routine.

In the case of a malfunction referred to as M20, which represents a faulty RTD, the temperature is modified by the instructor and properly displayed on the control board by RCTT2(I).

Outlet enthalpy, RCH3(I), is calculated by using equations (2) and (3). The average enthalpy of the control volume, RCHAVH(I) is obtained by averaging inlet and outlet enthalpies. The average enthalpy of the control volume is utilized in the surge calculation in determining the average specific volume of the hot leg RCSAVH, by using two second order polynomial curve fits. The change in the hot leg mass RCVSAA is calculated based on the difference of water densities at two consecutive time steps, RCSAVH, and RCSAHL(I). This mass change is then utilized in the pressurizer surge calculation, and the calculation of the related loop pressure if both the hot leg and the cold leg stop valves 8001A and 8002A are closed.

A flag RCZXXQ(I) is checked at the end of this calculation in order to initialize the integration of the steam generator control volume when the flow reverses, setting the steam generator outlet enthalpy to be equal to RCH3. In the usual calculation the integration of the steam generator control volume is set to one, and during the reverse flow to three. These two statements are therefore executed only once on the first path through the calculation after a change of flow direction.

At this stage in the program, reverse flow calculations for the cold leg are inserted. Such calculations comprise initialization of the enthalpies and the calculation of the steam generator inlet enthalpy based on the reactor inlet enthalpy (reverse flow). As described above for the hot leg mass, the change in the cold leg mass is calculated for use in the pressurizer surge calculation and for the isolated loop calculations.

The steam generator primary control volume is caluated in an indentical manner regardless of the direction of flow. It is necessary only to reinitialize enthalpies properly at the time of flow reversal and establish the proper inlet and outlet terminations. This is accomplished in accordance with the following equations:

$$(1) \quad \frac{V_{sgp}}{v} \frac{d}{dt} \bar{h}_{sgp} = W_3 (h_{isg} - h_{osg}) - Q_{SG}$$

$$(2) \quad h_{sgp} = \frac{h_{isg} + h_{osg}}{2}$$

where $V_{sgp}$ = RCVH = Steam generator primary tube liquid volume $v$ = RCSAHL(I) = Steam generator primary liquid specific volume $\bar{h}_{sgp}$ = SGHAV(I) = Steam generator primary water average enthalpy $h_{isg}$ = RCHIG(I) = Steam generator primary inlet water enthalpy $Q_{SG}$ = SGQ(I) = Steam generator total heat flux The above equations (1) and (2) are not used as is shown, but instead, the equation (2) is differentiated and substituted in equation (1) and the result is solved for $d/dt\, h_{osg}$.

$$\frac{d}{dt} h_{osg} = \frac{2V}{V_{SGP}} W_3 (h_{isg} - h_{osg}) - Q_{SG} - \frac{d}{dt} h_{isg}$$

The above equation is represented in FORTRAN as $$\frac{d}{dt} SGHROG = RCBORI$$

where

RCBORI = (RCWSG(I) * (RCHIG(I) − SGHROG(I) − SGQ(I)) * RCKSGP − RCHRHL (I)

where $$RCKSGP = 2 \frac{v}{V_{SGP}}$$

and $$RCHRHL\ (I) = \frac{d}{dt} h_{in0}$$

In the Fortran representation, RCWSG(I) is the absolute value of loop flow (i.e., remains positive for flow reversal). RCHRHL(I) is obtained from the preceding transport section. In case flow reverses, the integral resulting from the above equation is reinitialized with the previous inlet enthalpy and inlet and outlet are interchanged, including the inlet derivative term, RCHRHL.

A modification to the above described energy equations is accomplished for situations where very low flow exists, such as is the case when all the reactor coolant pumps are off. In this situation, it becomes difficult to avoid overshoots in outlet enthalpy from the so-called "seesaw" affect of the preceding central averaging section, since the frequency response capability of the section reduces as flow decreases. To avoid this effect, the section is reduced to a backward-differenced section in accordance with the following:

RCHOG(I) = B1 + SGHRO(t(I)) + 1.=B1) * SGHAV(I)

where $$B1 = (0.3 - \frac{RCW3(I)}{9375.} * \frac{RCW3(I)}{93.75.}$$
$$(0.15)^2$$

The above approximation introduces transport-time error into the steam generator calculations, but this is normally unimportant under the particular conditions where the backward-differenced section equation is applied. For these low-flow conditions most heat transfer will take place near the inlet end of the steam generator tubes and the average point, as well as the true outlet point, will come very nearly to correspond to the secondary temperature. This approximation is preferable to the alternative of added computation load for a full LMTD description. At high flow, the preceding quickly reverts to the former central-average equation since B1 is greater than 1.

The cold leg of the reactor coolant loop is calculated in a manner similar to the hot leg. The simulation employs a large IO loop containing forward and reverse flow calculations in the case of the malfunction where the steam generator water box baffle leaks, referred to as malfunction number M34. The outlet enthalpy of the steam generator is calculated from the mixing of flows, that is, 90% going through the steam generator tubes and 10% of the flow going through the baffle. This mass change in the steam generator tubes is calculated to be used in the same manner as heretofore described. The cold leg side of the reactor coolant loops includes several transport sections joined together. In the first transport section, steam generator outlet enthalpy RCH5(I), is calculated by using equation (2). The central volume also uses equation (2) with the exception that Q contains losses, RCQLST(I), calculated as RCQLST(I) = 1.036*(SGTAV)(I) − CNTC(and pump heat input RCQPPP(I)) is added at the same point. Heat input is assumed to be proportional to pump speed.

With respect to the reactor vessel inlet plenum, incoming flows are assumed to be mixed. These flows include reactor coolant flows RCW7(I), RCWMBP(I), safety injection flows SIW10(I), SAWTL(I) and the residual heat removal flow RHWS(I). The mixing of these flows yield reactor vessel inlet enthalpy. Branching is provided in the above described mixing equation to avoid division by zero in the event all flows should go to zero.

At this stage of the program, a test switch RCLTST, is provided which, for test purposes, permits the reactor vessel inlet enthalpy to be set independently of the reactor coolant loops. The test value is set by the variable HSETMP. A lag equation is then used to represent the inlet plenum time constant.

In all of the preceding heat balance and transport sections of the reactor coolant loop, the change in average mass is calculated as an input to the pressurizer surge tank. However, in the event a coolant loop is isolated, its mass change, along with other inflows and outflows, is used to determine pressure in the isolated loops from solid water compression, that is, bulk modulus. The compression calculation is performed in the flow model RCSLOP2 and is described elsewhere. It should be noted that no further provision is needed in the thermal calculation for the isolated loop, because the appropriate flows going to zero when the loop isolates will accomplish the thermal isolation in the previous equation.

Surge line temperature PRTSUR is calculated from enthalpy. Depending on surge direction, either the hot leg or pressurizer water enthalpy is used, and a first order lag function is applied to represent the transport effects.

Indicated temperatures for the loop RTD are calculated from enthalpies. In the event of a major loss-of-coolant accident hereinafter discussed, the indicated temperatures are limited to a maximum of saturation temperature, represented by a temporary variable RCAXX. It is assumed that on deep pressurization flashing occurs causing all temperatures to go to saturation, regardless of enthalpy.

The effect of loop flow reversal on the RTD bypass system is also simulated. When the flow reverses the hot RTD bypass will receive the cold leg flow rather than the hot leg flow. The resulting change in temperature is handled in the program by a switchover, based on the fact that the temperature change passes the RTD as an unmixed front.

The major loss-of-coolant accident is simulated by means of pre-recorded transients for four different break sizes. Pre-recorded variables include break outflows and system pressure. In the reactor coolant loop thermal simulation, introducing this malfunction causes the normal simulation to be bypassed. Prerecorded pressure then determines saturation temperature as previously described, which limits all reactor coolant loop temperatures to a maximum. The steam generator primary temperatures are similarly limited, which in effect reduces the steam generator heat source. After the initially-stored mass and energy has been discharged into the containment structure, conditions are subsequently determined, in accordance with the containment program hereinafter described, from reactor decay heat and safety injection; and loop pressure minimum is set by the containment pressure.

The reactor vessel flange leak off temperature (RCTFLG) is calculated by setting it equal to containment temperature. However, if a flange leak occurs, the temperature is ramped gradually upward to a maximum equal to the reactor outlet temperature.

PRESSURIZER, PRESSURIZER RELIEF TANK, AND PRESSURIZER CONTROL SYSTEM

Figure 98:
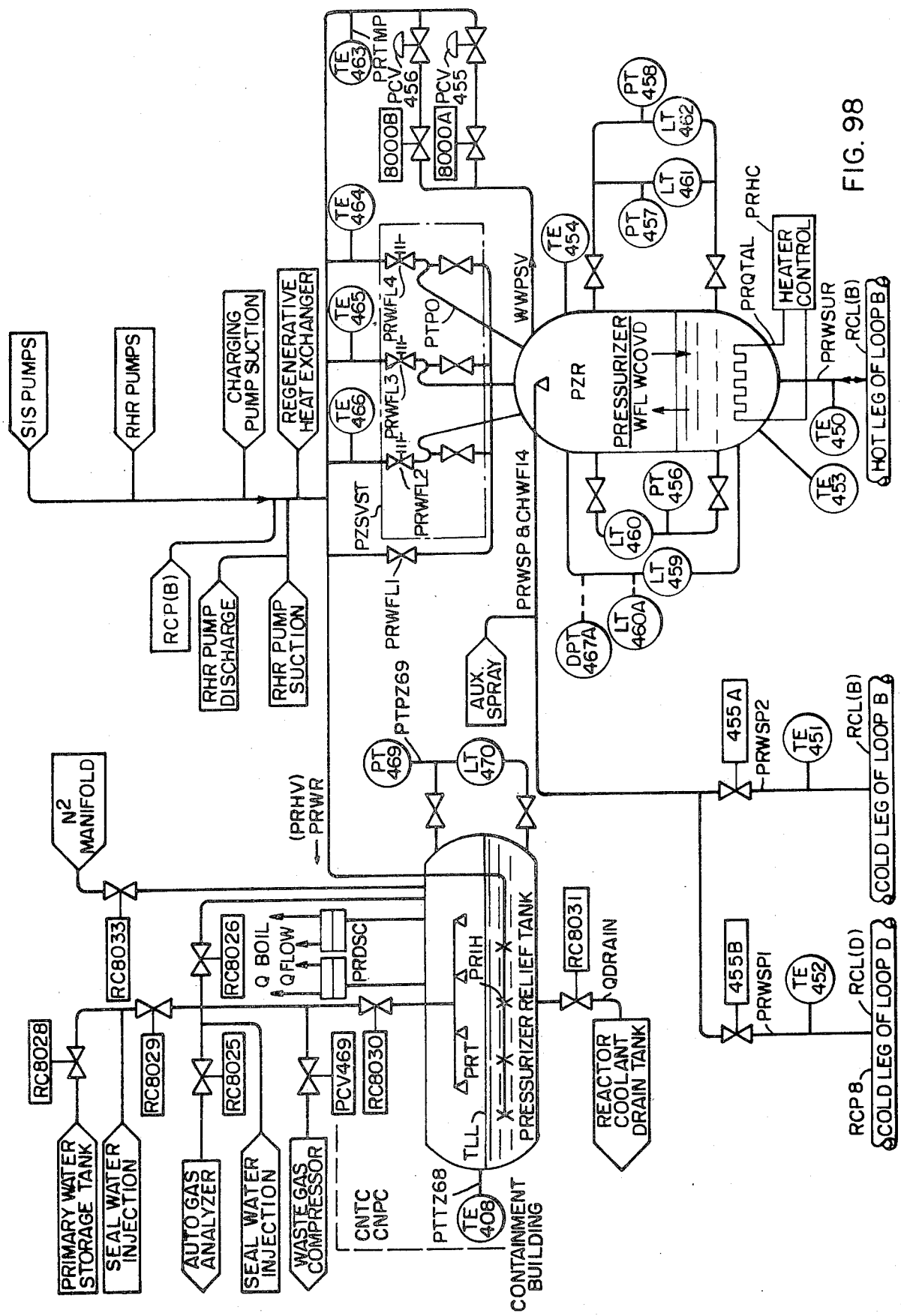
FIG. 98 is a schematic diagram of the pressurizer and the pressurizer relief tank system of the type being simulated in accordance with the present invention.

Referring to the control consoles shown in FIGS. 92J, 92K and 92L and the block diagram of FIG. 98, the pressurizer PZR maintains the coolant pressure of the RCS system during steady state operation and limits coolant pressure changes during transients.

During steady state operating conditions, approximately 60% of the pressurizer PZR volume is occupied by water and 40% by steam. The pressurizer PZR includes immersion heaters located in its lower section to keep the water at saturation temperature and maintain a constant system operating pressure.

A reduction in plant electrical load causes a temporary increase in the average reactor coolant temperature $T_{avg}$ with an attendant increase in coolant volume. The expansion of the reactor coolant raises the water level in the pressurizer PZR. This increase in water level compresses the steam, raising the pressure and actuating valves in the spray line. Reactor coolant from the cold legs of the coolant loops RCL(D) and RCL(B) sprays into the steam space and condenses a portion of the steam. This quenching action reduces pressure and limits the pressure increases.

An increase in plant electrical load results in a temporary decrease in average coolant temperature $T_{avg}$ and a contraction of coolant volume. Coolant then flows from the pressurizer PZR into the hot leg of loop RCL(B), thus reducing the pressurizer level and pressure. Water in the pressurizer flashes to steam to limit the pressure reduction. This reduction in pressure activates the heater in the pressurizer, heating the remaining water to further limit pressure reduction.

Reductions in plant electrical load with resultant pressure increases beyond the pressure limiting capability of the pressurizer spray system causes release valves 8000A, 8000B, and valve PCV455 and PCV456 to open. These valves can also be manuallly operated from the control console (FIG. 92L). If system pressure continues to rise, self-actuating safety valve PZCVST will open. Steam from the release valve PCV455 and PCV456 is piped to a pressurizer release tank PRT which contains sufficient water to condense the steam. Cold water can be sprayed into the tank PRT from the primary water storage tank through valves 8028 and 8030 to increase the heat sink capacity. Rupture disks PRDSC vents the tank PRT to atmosphere if design pressure is exceeded.

The pressurizer system is modeled in three separate basic models T20, T28 and T29, i.e. the pressurizer simulation covering the dynamics of the pressure vessel PZR itself (PRSRZR), simulation of the pressurizer relief tank TRT (PRSRFT), and the pressurizer control system PREZCON.

PRESSURIZER SIMULATION (PRSRZR)

Pressurizer simulation PRSRZR is divided into four major branches as follows: (1) normal condition, that is, with the steam bubble above the liquid in the vessel PZR, (2) solid water condition, that is, when the vessel PZR is full, (3) the empty condition of the vessel PZR, and (4) special conditions, some of which are prerecorded, for major loss of coolant accidents.

In some instances, additional calculations are used during transitions from one branch to another to avoid possible discontinuities; such calculations are described hereinafter.

The first branch involves computation of the normal operation with the "steam bubble" and it is based on a "two volume" description. The two volume which may be termed "two phase" provides for a steam space and a liquid space, with separate mass and energy balances calculated for each space. Mass and energy exchange between the phases is described by a "flashing and condensation" model.

The procedure for the normal operation is as follows:

1. Mass and energy rates for the water and steam are first integrated to determine net mass and specific enthalpy for each space.

2. The state properties are evaluated for mass and energy rates by means of curve fits to determine the steam and liquid saturated specific volumes. From such volumes and net masses, steam and liquid volumes are obtained.

3. The sum of the preceding liquid and steam volumes is then compared with total pressurizer volume. Any resulting difference is assumed to be taken up in compression or expansion of the steam space. Such comparison is accomplished by calculating a new steam specific volume and then, by inverse function curve-fits, new steam and liquid enthalpies leading to a new value for $h_{fg}$ (HPRSFG).

On subsequent time steps, the fed back quantities change the flashing or condensation rate and hence steam and liquid energy and mass rates to restore a new equilibrium condition.

Pressure is then calculated as a function of the new steam specific volume from calculated in accordance with the penultimate.

This procedure, while not permitting a true departure from saturation as in an isotropic compression description, the procedure does permit differences, on a temporal basis, between the steam and liquid saturation conditions to provide an accurate approximation of these effects.

Water mass balance is calculated as follows:

$$\frac{d}{dt} XMPW = WCOND + PRWSUR + PRWSP + CHWF14 = WFL - WWPSV$$

With respect to the water energy balance, the total exchange SUMW due to flow times enthalpy is first calculated as follows:

$$\begin{aligned}
SUMW &= PRWSP*(HCLT) \\
&+ WCOND*(HPRSFG + HPRSW) \\
&+ PRWSUR*(HHLT) \\
&+ CHWF14*(CHHAXS) \\
&- WFL*(HPRSS) \\
&- WWPSV*(HPRSW)
\end{aligned}$$

The heaters and heat losses PRSHT are calculated as follows:

$$PRSHT = \frac{1}{3600.}\left[3413.(PRQTAL) - \frac{PRQLSS}{552.}(PRTEMP-CNTC)\right]$$

where PRQLSS/552 is the nominal condition loss-to-temperature difference ratio. For the empty condition, the heater and heat losses PRSHT is set to zero.

Liquid enthalpy HPRSWW is calculated as follows:

$$\frac{d}{dt}HPRSWW = \frac{1}{XMPW}\left[SUMW+PRSHT + VPW\frac{144.}{J}\frac{d}{dt}PRPRS - HPRSW\frac{d}{dt}XMPW\right]$$

where $J$ is the work equivalent of thermal energy; that is, $J = 778$ foot pounds per BTU, thus $144/J = 0.185094$.

In the calculation steam mass balance, the following equation is used:

$$\frac{d}{dt}XMPS = WFL + SURFLS - PRWR - WCOND$$

It should be noted that PRWR and WSPSV are equal. To calculate the steam energy balance HPRSS, the following equation is utilized:

$$\frac{d}{dt}HPRSS = \frac{1}{XMPS}\left[SUMS + VPS\frac{144.}{J}\frac{d}{dt}PRPRS - HPRSS\frac{d}{dt}XMPS\right]$$

Branching is provided to prevent division by zero in case the steam mass balance approaches zero which would be the case when the pressurizer is in its solid condition.

The net energy exchange SUMS due to flow is calculated as follows:

$$SUMS = HPRSS*WFL - WSPSV) - WCOND*(HPRSWW + HPRSFG)$$

The condensation and flashing model provides initially for the calculation of condensation flow rate WC$\phi$ND as follows:

$$WC\phi ND = SC\phi NST*(PRWSP + CHWF14)$$

where SC$\phi$NST is limited to positive values and $$SCONST = \frac{HPRSW - HCLT}{HPRSFG}$$

The above equation assumes condensation driven by spray only.

The flashing flow rate WFL is calculated as follows:

$$WFL = XMEVAP\frac{1}{TAUFL}\frac{VPW}{VPR}$$

where branching is provided to prevent division by zero in case VPW approaches the zero or empty condition. XMEVAP is limited to positive values and is calculated as follows:

$$XMEVAP = (XMPW + \delta)\frac{HPRSWW-HPRSW}{HPRSFG}$$

where HPRSWW−HPRSW is the difference between enthalpies calculated by energy balance and compression. Thus, as previously mentioned, it feedbacks the correction for subsequent time steps delta. For this calculation, $$= DELTA*(WC\phi ND+PRWSUR + PRWSP - WWPSV)$$

With respect to total volume and compression, the water and steam specific volumes VPRSW and VPRSS respectively are calculated from saturation function curve fits as follows:

VPRSW $= f_{(vf)}$[HPRSW]
VPRSS $= f_{(vg)}$ [HPRSS]

Then a new total volume V$\phi$LNEW is calculated as follows:

V$\phi$LNEW $=$ XMPW*(VPRSW) + XMPS*(VPRSS)

This new total volume is then compared with available pressurizer volume VPR as follows to obtain the difference DELV$\phi$L DELV$\phi$L $=$ VPR $-$ V$\phi$LNEW A new compressed or expanded steam specific volume VPRSS, as the case may be, is then calculated as follows:

$$VPRSS_{(NEW)} = \frac{VPS - DELVOL}{XMPS}$$

Branching is provided to prevent division by zero. The pressure PRPRS is calculated from the new specific volume VPRSS$_{(NEW)}$ by the curve fit as follows:

$$PRPRS = f_{(Psat)} [VPRSS_{(NEW)}]$$

Finally, new values for enthalpies are calculated by curve fits to feed back to the prior calculations providing the changes for subsequent time steps in accordance with the following:

HPRSS$_{(NEW)}$ = $f_{(hg)}$ [PRPRS]
HPRSW$_{(NEW)}$ = $f_{(hf)}$ [PRPRS]
HPRSFG$_{(NEW)}$ = HPRSS$_{(NEW)}$ − HPRSW$_{(NEW)}$

In general, the solid water calculation in the subroutine PRSRZR performs a water mass and energy balance with zero flashing and condensation. The steam calculations are omitted. The water volume is determined and compared with pressurizer volume, and any excess is assumed to be taken up in solid water compression. In calculating solid water compression, the total plant volume is added to the pressurizer volume at the point where pressure is calculated, since the water in the plant is compressed as well as the water in the pressurizer. The system pressure is computed using an effective liquid bulk modulus that reflects some "stretch" in the plant structural metal, hence is less than that for water alone. The bulk modulus actually has been selected to give proper pressure response, which has been observed by experienced plant operators during system tests.

For transitions to and from the solid condition, termed as "drawing the bubble" or "collapsing the bubble", separate branching is provided to obtain a switchover "hysteresis". On going to the solid condition, the normal model is terminated at 1800 cubic feet of liquid, with the pressure being held constant between 1800 and 1830 cubic feet. The pressurizer is "solid" when water volume is 1830 cubic feet. The 30 cubic feet in the surge line is included in the net pressurizer volume. For a transition from the solid condition to the normal "bubble" operation, the calculation is made at 250 cubic feet of steam volume with pressure at lesser steam volumes calculated from saturation pressure for the existing water enthalpy.

In the solid pressure calculation, water, heat and mass balances correspond to those previously described. After the water volume is computed, a check is made to determine if such volume exceeds the available volume. If the volume does exceed the available, a change is volume is calculated utilizing a temporary variable BCX for this change in the program. This change in volume is calculated as follows:

$$BCX = [XMPW - XMPW_{(OLD)}]VPRSW$$
$$+ \left[VPR \left(\frac{1}{VPRSW_{(OLD)}} - \frac{1}{VPRSW}\right)\right]VPRSW$$

where the initial bracket accounts for the volume change due to flow in and flow out, hence, mass change, and the second bracket accounts for volume change due to density changes of liquid already in the pressurizer PZR.

A pressure change is then calculated and added to the previous pressure value as follows:

$$PRPRS = PRPRS + M_B \frac{BCX}{VPR + RCVTAL}$$

where $M_B$ is the bulk modulus, given a value 1.0007 × 10$^5$ psi.

If in the above check, VPW is less than VPR, a "dummy" steam volume is calculated as:

$$VPS = VPR - VPW$$

then the former volume change becomes BCX = VPW − VPW$_{(OLD)}$.

The same bulk modulus equation is then used to calculate pressure, but is now in the so-called "negative modulus" region. Next, pressure is calculated from saturation pressure. If the saturation pressure becomes larger than the bulk modulus pressure, saturation pressure replaces bulk modulus pressure. A subsequent set of program statements sets up the normal "bubble" calculation in preparation for switchover to the normal bubble condition. When VPS exceeds 250 cubic feet; that is, exceeds VPSET, switchover to the normal bubble model takes place. At this point, a small "iterative" loop has been inserted to make adjustment for errors between curve-fits in order to obtain a smooth transition. Two iterations have been found to be sufficient in this instance. The iterations that are calculated twice are as follows:

$$PRPRS = f_{(Psat)} [VPRSS]$$

$$VPRSS = VPRSS* \left(\frac{PRPRS}{PRPRS_{(OLD)}}\right)$$

The result of the above equation is used to calculate an adjusted steam mass XMPS to start the normal bubble calculation.

At this point, a flag VJF, is set to permit entry into the normal bubble calculation on the next pass, provided the other required conditions are met.

Other checks are made during the preceding calculations to insure that PRPRS does not go below atmospheric pressure, or below containment pressure CNPC for loss-of-coolant incidences. In the transition from the bubble condition to the solid condition of the pressurizer; and during the small interval between 1800 cubic feet (VPSET2) and the full condition which is 1830 cubic feet, the pressure is held constant. This is to avoid operating the normal steam bubble calculation with a steam volume approaching zero.

To hold the pressure constant, the water energy, the steam energy, and the steam mass calculations are bypassed; thus, they do not change from their former values. The water mass balance continues to be calculated with the flashing set to zero, this calculation continues until the pressurizer is completely full, then the branch is made to the solid water calculation.

In the event the water volume should enter the 1800 to 1830 cubic feet range and then subsequently decreases below 1800 cubic feet, the calculation sets a flag to branch back to the normal bubble calculation. Because these calculations have been held constant, except the water mass, the return transition will be made at nearly identical conditions at which the original branch into the "over 1800 cubic feet region" was made.

For the empty condition of the pressurizer, the branch from the normal bubble calculation is made at 71 cubic feet to avoid operating this computation with water volume approaching zero. This is below the "on-scale" indication of the pressurizer level instrument (see FIG. 92M). From this point, the steam mass and energy balances continue to be calculated, but the water enthalpy is reduced to be equal to the reactor outlet enthalpy as follows:

HPRSWW = HPRWSS [1.0 − PRZRBT ($\Delta t$)]

The bracketed quantity is slightly less than 1, thus HPRSWW is gradually reduced. Its minimum value is then set at the value of the reactor outlet enthalpy. Pressure will then decrease as a result. Elsewhere, the pressure of the RCS system is determined as the maximum of pressure from the pressurizer, saturation pressure for hot leg temperature, or saturation pressure for the upper dome temperature. The saturation for the upper dome temperature would be the maximum in the event of a steam break.

The pressurizer water mass balance is also continued even into the "negative mass" region. After the pressurizer is empty, it is assumed that a bubble is formed in the reactor coolant system RCS, and the continued water mass balance is utilized to determine the liquid inflow, from the safety injection system SIS, for example, which must be supplied before the pressurizer begins to refill.

Since the reactor coolant system flow model is not a two-phase flow model, the pressurization which results from a major non-isolatable loss of coolant accident, such as malfunction M91, for example, is partly based on pre-recorded data determined from other detailed analysis programs.

Referring to the flow chart of FIG. 98/1, (see statement 40 and subsequent), the pressurizer pressure transient is curve fitted by using piecewise linear functions of six segments. When the malfunction is actuated, the time relative to the start of the malfunction, PRSTDM is recorded, but the calculation still follows the normal path. When the pressurizer level drops below 71 cubic feet, then the calculation is switched to the pre-recorded transients. The transient, in accordance with a given break size is chosen by the instructor through the variable V3(91). The general expression for the curve fit is as follows: PRPRS = ARR0(I,2) + ARR1(I,2)*PRSTDM where I denotes the proper segment and J is the function of V3(91). Two arrays ARR0 and ARR1 contain necessary data for the slopes and break points.

To avoid such jumps in the meters when the normal calculation is bypassed, enthalpy of the water is driven downward using an exponential fit. When the fitted pressure becomes smaller than the containment pressure, CNPC, it is held equal to the pressure CNPC.

The pressurizer program PRSRZR provides that several conditions must be handled; that is, normal bubble, solid, empty, and special pre-recorded cases. In addition, transitions between modes may require additional calculations. The program branches used are shown in FIG. 98/1 and are as follows:

1. A branch control flag VJF is set to various values within the different computation branches. It is used at subsequent time steps to determine later branch direction. This is convenient, for example, when single-pass calculations must be performed such as at a transition between modes.

2. At program entry, the following branch checks are made:

a. go to solid calculation if the temperature is less than 212°F (that is, boiling under vacuum conditions is not considered); however, as illustrated on the flow chart 25A if malfunction M91 is in effect the program will continue.

b. go to the solid calculation if the calculated water volume VPW exceeds the pressurizer available volume VPR.

c. go to the solid calculation is the steam volume VPS is less than 250 cubic feet (VPSET) and if VJF is less than 2.

For the preceding to happen, the preceding pass must have been through the "solid" calculation (VJF = 1.0) and the model is in the solid to bubble transition. A later branch within the solid routine (see FIG. 98/1) will calculate pressure from saturation and from bulk modulus, and then compare the two and use the larger.

d. if VJF is greater than 5 or if the water volume is greater than 1800 cubic feet (VPSET2), go to the bubble-to-solid transition (see statement 30 in FIG. 98/1). For this branching to the statement 30, either the water volume must currently be in the 1800 to 1830 cubic feet transition region by test, or the last pass must have gone through that branch where VJF is set to 6.

If none of the above branches are made, VJF is set equal to 3 and the program proceeds with the normal system bubble calculation. It should be noted that, subsequently, branches are provided within the normal bubble calculation to handle the case of the empty pressurizer condition. These branches are made at a water volume of 71 cubic feet. In addition, if the pressurizer is empty and malfunction M91 is in effect, a branch is made out of the bubble calculation to the pre-recorded pressure transient starting at statement 40 in FIG. 98/1.

In the solid water calculation, VJF is first set to 1. Then, as previously described, a branch is made to the "negative bulk modulus" calculation (see statement 11 FIG. 98/1) if the water volume is less than the pressurizer volume.

If the branch is not made, the program proceeds through the solid water calculation. In either case, saturation pressure sets the minimum value that the bulk modulus pressure can obtain. Subsequently, a test is made to determine if the steam volume has exceeded 250 cubic feet (VPSET). At that point in the program, the previously described iteration is performed to minimize difference between function curve fits to assure a smooth transition to the normal bubble calculation. VJF is set equal to 3.0 to assure that the normal bubble calculation will be used on the next pass. Thus the iterative connection is used only once, at the transition to the normal steam bubble calculation.

Within the bubble-to-solid transition (see statement 30 FIG. 98/1), a check is made to determine if VJF is greater than 5 and whether the water volume VPW is less than 1800 cubic feet (VPSET2). For this situation to occur, the water volume must have previously entered the transition region, then subsequently have decreased below the transition point. When this occurs, VJF is set equal to 3.0 so that on the next pass the calculation returns to the normal steam bubble calculation.

For malfunction M90, the major loss of coolant accident, a mechanism is used that employs a partly pre-recorded transient during a portion of the initial post break blowdown. The mechanism involves program statements in several areas, including the models for the pressurizer, RCS thermal and RCS flow, previously described.

In simulating the major loss of coolant accident, a pre-recorded break outflow and enthalpy is applied (one for each of the four break sizes) for the initial blowdown. The pre-recorded data is generated from curve fits. Then after the pressurizer has emptied, a pre-recorded pressure is superimposed to determine pressure in the reactor coolant system. The maximum value of all RCS temperature is limited to saturation temperature on the assumption that flashing occurs at saturation conditions in the RCS. Saturation temperature is calculated as a function of pressure. After the initial blowdown of the contents of the RCS and pressurizer has completed, use of pre-recorded data is terminated. From this point, safety injection flow is assumed to enter the RCS where it collects the decay heat from the core (the reactor is assumed previously shutdown by the protection system action), then the flow goes into the containment building via the break.

The heat transfer is not actually simulated. Instead, the flow and decay heat energy are input directly to the containment model mass and energy balances. Subsequently, RCS temperatures and pressures are determined from those of the containment. The containment values are simulated by the containment dynamic model, C$\phi$NPRS.

This procedure avoids the use of a complex two-phase RCS blowdown model. Its limitation is that the malfunction must be initiated at or near normal operating temperature and pressure to obtain valid results. Prerecorded transients are used only during the initial blowdown of the RCS contents, and thereafter the simulation returns calculating mass and energy balances.

PRESSURIZER RELIEF TANK SIMULATION (PRSRFT)

Referring to FIGS. 98 and 98/2, the simulation model for the pressurizer relief tank calculates the level and temperature of water in the pressurizer relief tank PRT, the pressure of the gas ($N_2$) in the tank PRT, the pressure pressurizer PZR experiences through the pressurizer relief lines PTPO, and the temperatures PRTMP in the pressurizer relief lines.

The inputs to the simulation PRSRFT from the pressurizer model or simulation PRSRZR are as follows:
1. The flow of steam or liquid PRWR from the pressurizer PZR to the pressurizer relief tank PRT;
2. The specific enthalpy PRHV of PRWR;
3. The temperature PRTMP of PRWR;

The inputs to the simulation PRSRFT from the containment vessel or building C$\phi$NPRS are the temperature in the containment building CNTC and the pressure in the containment building CNPC.

The output from the simulation PRSRFT to the pressurizer simulation PRSRZR is the pressure PTPO in the pressurizer relief line. The outputs to the containment vessel or building C$\phi$NPRS are (1) the flow of liquid QFLOW from the pressurizer relief tank PRT to the containment vessel, the flow of steam QBOIL from the pressurizer relief tank PRT to the containment vessel, and the enthalpy in the tank PTHF of either QFLOW or QBOIL.

For small energy releases to the tank PRT where the subcooled condition persists, that is, where there is no pressurizer relief or safety valve actuation, it is assumed that the energy is absorbed in heating the water in the tank PRT and the conditions are calculated from a water heat and mass balance equation.

For larger energy releases, that is when the pressurizer relief or safety valve actuation occurs, the tank PRT will be brought to a saturation boiling condition and cause closing of the PRT vent valve (not shown) in the neighborhood of 10 pounds per square inch. In this situation, the simulation represents the tank PRT as a closed tank with gross mass and energy balance based on saturation conditions, except if the pressure is modified by the partial pressure of any gas ($N_2$) trapped at the time of closing of the PRT vent valve.

The rupture disks PRDSC will break at approximately 100 pounds per square inch; and when these disks PRDSC break, fluid is released to the containment vessel or building. The simulation represents the discharge steam as being at the steam enthalpy of the PRT. However if the PRT should become filled with liquid when the disks PRDSC rupture, the subsequent discharge through the disks will be at liquid enthalpy of the tank PRT. This continues until the liquid mass in the tank PRT becomes less than that which would correspond to the level of the submerged inlet header PRIH, at which point the flow, if steam, is considered to pass through the tank PRT and out of the ruptured disks PRDSC. During the transient, the effective incoming water spray into the tank through valve RC8000 is factored into the PRT heat and mass balances at all times.

The purging of the nitrogen gas $N_2$ is included in the PRT tank simulation. Under normal vented operation, the dynamic effect of the nitrogen gas is neglected; however, with the vent closed, gas pressurization of the tank PRT is represented.

For normal operation, the temperature indicators TE463 through TE466 on the pressurizer relief lines are assumed to approach ambient temperature plus a small increment, which increment represents a percentage of pressurizer PZR temperature above ambient to account for conduction. When the relief lines open, the temperature on the active relief line will approach pressurizer discharge temperature, while the indicators on the inactive lines will rise by an increment, which is a fixed percentage of the difference between ambient temperature and pressurizer discharge temperature, to represent back leakage in the lines to the sensors TE on the inactive or closed lines. The increments are chosen in accordance with operational data.

In order to calculate the height of the water level TLL in the tank PRT, the volume VW of the water and the total volume of the tank VT are needed. The equation to be evaluated is:

$$TLL = R \cos \phi/2$$

where $R$ is the radius (4.75') and $\phi$ the central angle. Since $\phi$ is not known the equation was evaluated and a 3rd order curve-fit was formed. If the volume of the water in the tank (VW) is divided by the total volume (VT), the height of the water level TLL is then calculated by $T = VW/VT$
$TLL = T(T(6T-9) + 5)R$ If $TLL$ is within the range of the level indicator LT470, it is displayed as PTLV70. If $TLL$ is outside the range, a zero for a lower level, or 8.92 for a higher level is displayed. If $TLL$ is less than 1/2 foot, then the hole in the header pipe PRIH from the pressurizer PZR is not covered, and any steam entering is directly discharged into the tank environment. In this event, there is also no water head on the pipes and the pressure becomes that of the gas or steam pressure in the tank PRT. The appropriate logic variables for a high level or low level alarm is set at this time.

To obtain the mass and energy balance, the enthalpy is calculated by using the following:

$$H_{n+1} = H_n + (\Sigma Q_n h_n - UA(T_n - T_a))\Delta T$$

or the enthalpy change $$\frac{dH}{dT} = \Sigma Qh - UA(T_n - T_a)$$

where:
 $UA$ is the heat transfer coefficient (BTU/sec/°F) for heat losses to ambient,
 $T_n$ is the temperature in the tank (=PTTZ68) and
 $T_a$ is the ambient temperature in the containment building and the temperature
 $T_{n+1} \alpha H_{n+1}$ All inflows to the tank PRT have their own flow rate and specific enthalpy. The inputs are obtained from the pressurizer PZR or the relief or safety valve, expressed as PRWR in pounds per second at an enthalpy PRHS in BTU's per pound, and water spray, QSPRAY in pounds per second at an assumed enthalpy of 68 BTU's per pound. Also, there is water mass WM in the tank expressed in pounds at an enthalpy PTHS in BTU's per pound.

In the event the temperature PTTZ68 and the pressure PTPZ69 in the tank PRT reach a point where boiling should start, the specific enthalpy of evaporation TR04 is calculated as follows: TR04 = PTHF2 − PTHF3*PTPZ69 where PTHF2 equals 980.927041, and PTHF3 equals 722.928. This calculation is required in order to determine how much water has to be boiled away to keep the boiling temperature TEMP at the calculated value. If the ruptured disks PRDSC are not blown, the amount of steam in the tank PRT is added to the gas in the tank and the pressure PTPZ69 rises accordingly. This rise will cause the ruptured disks PRDSC to blow if the difference between the internal pressure of the tank PRT and the external pressure equals or exceeds 100 pounds per square inch.

All the outflows from the tank PRT have the appropriate specific enthalpy except in the instance where the ruptured disks PRDSC are blown and all the water has boiled away. In this event, the steam coming from the pressurizer PZR is not mixed but emitted directly to the containment building.

The outflows comprise drainage flow QDRAIN in pounds per second at an enthalpy PTHF in BTU's per pound; the possible flow of water QFLOW into the containment building through the ruptured disks PRDSC in pounds per second at an enthalpy PTHF in BTU's per pound for the water-filled condition; and the possible flow of steam QBOIL through the ruptured disks PRDSC because of boiling in pounds per second at a specific enthalpy of steam PTHF in BTU's per pound.

If the ruptured disks PRDSC are broken and the water level in the tank TLL is larger than 9½ feet, then the case of liquid overflow occurs. The overflowing water is dumped into the containment building; and this information is transferred to the program which simulates the containment environment, together with the enthalpy and flow rate of the water being dumped.

As previously mentioned, the inputs and outputs of the gas $N_2$, in the tank PRT, are very small and are not considered dynamically during the venting operation. However, the gas pressure must be considered after closing of the vent valve, either manually, or automatically at about 10 pounds per square inch, and especially in the case of boiling in the tank when the ruptured disks PRDSC are still in position and have not broken.

The pressure in the tank is calculated as follows:

$$PV = \Theta RT$$

where
 $P$ = pressure in psia
 $V$ = volume in $f^3$
 $T$ = temperature in °R
 $R$ = the gas constant
 $\Theta$ = the number of moles of trapped gas In order to avoid division by zero in case the volume of water approaches the volume of the tank, the volume occupied by the gas is precalculated by subtracting the volume of the water from the volume of the tank and cannot go below a minimum of 0.001. A similar limit is applied in the case of the volume of the water or the mass of the water. If these amounts become very small, the program will not permit values of less than 1 for these variables.

The pressure which the pressurizer relief line experiences, PTPO, is the sum of the tank pressure PTZ69 plus any applicable head pressure TR01. The pressurizer relief line has temperature sensors TE463 through TE466 in its four initial branches. If there is no steam flow, the temperature indicated in the central control office (FIG. 920) is that of the environment plus about 25°F. If steam flows, the line carrying the steam will show the temperature of the steam. All other lines will show an increase of temperature to about half of the steam temperature as previously mentioned. This calculation occurs in the last portion of the program.

PRESSURIZER CONTROL SYSTEM SIMULATION (PREZCON)

The pressurizer control model or simulation follows the control function for the pressurizer PZR pressure and level and also contains calculations for the pressurizer spray flow PRWSP and CHWF14 and the pressurizer relief flow PRWR with associated malfunctions.

The inputs to the system are analog and contact inputs representing set point, and valve position in the central control office (see FIG. 920) and furnishes analog outputs for display purposes as well as for limit checking.

Referring to FIG. 92J, the selector switch HC459D for controlling the level of the pressurizer PZR is capable of being positioned through the use of the protection and logic chains in the P2000 computer through four distinct channels of communication. Because the dynamic model calculates single variables, analog outputs for the appropriate four channels are assigned. Included in this part of the program malfunctions M25 (PZR pressurizer) and malfunction (M26 level-low) are mechanized. When the malfunction is introduced by the instructor, variable V2(26) for PZR pressure, or variable V2(27) for PZR level, is set to a desired value.

This causes the proper variable in a given channel to give a false reading. By switching the selector switch HC459D to another channel, the difference is visible and the controller reacts accordingly.

For pressurizer level control, a subroutine PID2 is utilized which is hereinafter described. This subroutine accepts a level error signal and supplies the output based upon the control configuration. Comparisons of the auctioneered TAVG (see FIG. 92J recorder TR-412) and adjustable no load TAVG are made to yield the variable PRZK, which is then used in the level program controller. An output PCZ03 from the level program controller is then compared with the true level signal PLBF41 and the error, ERRO2 is obtained from the level set point PRLSET and the difference PLBF41 and PCZ03. The output of the controller TID2 is then used in the automatic controller, that is when PRAULZ is true. Then the manual control output of the controller HC459D is ramped up or down in accordance with the signal from the control panel.

Relief flow is calculated from the position of the relief valve PRWSL1-PRWSL4 and the difference in pressure between the pressurizer PZR and the relief tank PRT. The equation for this calculation is as follows:

$$W = G * \sqrt{\frac{\Delta P}{v}} \quad (1)$$

In this case, G is calculated as a combination of the admittances of the relief valves as shown in FIG. 98/2 where $G_1$, $G_2$, $G_3$, and $G_4$ represents the valves PRWFL1 through PRWFL4. The equivalent admittance is first calculated in the upper branch as shown on said Figure and then for the lower branch as follows:

$$G_{up} = \frac{G_1 * G_2}{G_1 + G_2}$$

$$G_{low} = \frac{G_3 * (G_4 + G_1)}{G_3 + G_4 + G_1}$$

or $G = G_{up} + G_{low}$ $G_1$, the implementation of malfunction M28 which provides for relief valve leak flow.

With respect to malfunction M28, the leak flow PRWFL1 is given as:

$$PRWFL1 = (PCZ07 + PCZ11) * \sqrt{\frac{PRPRS - PTPO}{PRSSTR}}$$

The relief valve flow PRWFL1, for example, is calculated by using the same expression as (1) described previously in this section. When the PZR pressure is greater or equal to 2500 pounds per square inch, the valve admittance is set to 1, while $\Delta P$ equals PRPRS-PTPO, and $v$ equals PRSSTR as above. The total leak flow PRWR is the sum of the individual valve flows PRWFL1 through PRWFL4 inclusive.

The pressurizer PZR heater controller PRHC is simulated by using the subroutine PID2 previously mentioned. The pressurizer pressure is compared to a set point and an error is fed to the controller. The output of the controller PRHC together with the reference signal is used to calculate pressurizer heater power based on the given program. The malfunction M31, where pressurizer heaters fail, is implemented by setting V2(32) to PRQPRP where V2(32) is introduced by the instructor.

The pressurizer spray automatic flash manual station is simulated as previously mentioned. The automatic action is proportional to the signals obtained from the set point and the error, while the manual action is made the function of the various valve positions. Malfunction M29, where the pressurizer valve fails either opened or closed, is implemented by inserting the value V2(30) or V5(30) for the valve admittance. In this case when the pressurizer pressure is greater than RCP8(1) the spray flow is set to zero. The constant spray is added to the spray flow obtained from the valve position and the pressure difference. Total spray flow is the sum of the individual flows PRWSP1 and PRWSP2.

Backup heaters are considered in the model if the logicals corresponding to the breaker position are true. Then the logicals are set to the nominal power of 750KW. Total heater power PRQTAL is obtained by adding all the individual heater powers (not shown), which are termed PRQPRP, PRQHA, PRQHB, and PRQHC.

CONTAINMENT BUILDING

The reactor system containment building (FIG. 1) is a steel lined reenforced concrete pressure vessel. The contained volume and design pressure of the vessel are sufficient to withstand and contain the contents of the reactor coolant system in the unlikely event of a loss of coolant accident. The containment building houses the reactor and reactor coolant system including the steam generators, reactor coolant pumps, pressurizer, piping, and the safety injection equipment.

CONTAINMENT BUILDING SIMULATION (CONPRS)

Referring to FIGS. 81E, 91F and 91G, the simulation model T21 of the containment building generates containment pressure, temperature, relative humidity, and containment sump level for display in the central control office on the control consoles.

The inputs to the containment simulation CONPRS include (a) heat losses from the plant and equipment, (b) flows and enthalpies from the containment spray system (c) malfunctions, such as steam breaks, feedwater breaks, or any loss-of-coolant accident, and (d) exhaust heat from the fan coolers and wall losses.

Recirculation is provided such that fluid in the containment sump can be delivered to the safety injection system when required.

The containment simulation CONPRS is based on a two-control-volume description, that is, a steam plus air space and a liquid (sump) space. The sump is dry under normal circumstances. A mass and energy balance is calculated for the steam, air and liquid space. In the air-steam space, the partial pressure of trapped air is included in the pressure calculation.

Leaks from the nuclear plant such as a loss of primary coolant, steam, or feedwater, are specified in terms of total inflow CNWIL, and its specific enthalpy CNHIL. The total flow is summed, and the mean enthalpy is calculated by mixing equations at the beginning of the program. Total inflow CNWIL is divided into steam and liquid flow by the following formula:

$$CNWIS = \frac{[CNHIL - h_f]}{h_{fg}} CNWIL$$

where the bracketed quantity is limited to positive quantities and:

$h_f = CNHIW = 160.0 + 1.7\ CNPC$
$h_{fg} = CNHIS = 1125.0 + 0.87\ CNPCS - h_f$

The above linear approximations are permitted by the relatively small range of containment pressure. Liquid flow CNWIW is calculated by subtracting the steam flow CNWIS from the total inflow CNWIL.

The atmospheric vent flow is set to zero in the instant simulation on the assumption that containment isolation occurs before any significant mass has escaped. The air-steam space mass balance is calculated as follows:

$$\frac{d}{dt} CNMSC = CNWIS - CNWVC$$

The air-steam space energy balance is calculated in accordance with the following equation:

$$\frac{d}{dt} CNEC = CNWIS * CNHIS$$
$$+ CNWSP*(CNHISP-CNCSP)$$
$$- CNWVC*CNHVC$$
$$+ CNQMC - CNQCW$$
$$- CNQCS - CNQFC$$

where CNWIS*CNHIS represents break inflow, CNWSP*(CNHISP − CNHCSP) represents containment spray, CNWVC*CNHVC represents vent outflow, CNQMC represents plant and equipment heat losses inside the containment building, CNQCW represents wall heat loss, CNQCS represent heat losses to the sump liquid, and CNQFC represents the heat removed by the fan coolers.

The wall heat loss CNQCW is calculated as follows:

$$CNQCW = [CNCTCW + CNINCW*CNNFAN]$$
$$*(CNTC - CNTW)$$

where the bracketed heat transfer coefficient consists of a constant plus a term dependent on fan coolers, that is, on circulation.

Then, the wall temperature CNTW is calculated from:

$$\frac{d}{dt} CNTW = \frac{1}{CNCPW*CNMW} [CNQCW - CNQW\phi]$$

where:

$$CNQW\phi = CNCTW\phi * [CNTW - CNT\phi]$$

The heat loss at the liquid surface of the containment sump is also based on a constant factor CNCTS plus a term dependent on fan coolers as follows:

$$CNQCS = CNCTCS + CNINCS * CNNFAN *(CNTC - CNTSMP)$$

The direct heat removal by fan coolers is computed from:

$$CNQFC = CNNFAN*CNCTFC* CNTC - CNT\phi$$

where the heat sink liquid temperature has been assumed the same as the outside temperature CNTO.

The air-steam space temperature and enthalpy are calculated from the following equation:

$$CNTC = \frac{CNEG}{CNMCO*CNPA+CNCVVS*CWMSC} - 460$$

where the denominator represents total air and steam heat capacity and:

$$CHNCSP = CNTC - 32.$$

The sump mass balance is calculated as follows:

$$\frac{d}{dt} CNMSP = CNWIW + CNWSP - CNWR$$

The volume CNVS of the sump is calculated as follows:

$$CNVS = \frac{CNMSP - CNMSO}{w}$$

where $$w = 62.$$

The level CNLVL in the sump is obtained by dividing the volume CNVS by the area CNA.

The liquid volume CNVS is subtracted from the total volume CNVCO to obtain the air-stream volume CNVC.

The sump energy balance CNESP is obtained as follows:

$$\frac{d}{dt} CNESP = CNWIW*CNHIW$$
$$+ CNQCS$$
$$+ CNWSP*CNHCSP$$
$$+ CNQMS$$
$$- CNWR*CNHSP$$

where:

CNQMS is the heat input to the containment liquid from the nuclear plant by conduction.

The temperature CNTSMP of the sump is obtained from the following:

$$CNTSMP = \frac{CNESP}{CNCPW*CNMSP} - 460.$$

and the enthalpy from:

$$CNHSP = CNTSMP - 32.$$

The containment pressure CNPC is obtained from the following equation:

$$CNPC = \frac{CNEC}{CNMCO*CNCPA+CNMS*CNCVVS} [CNMSC*CNRS+CNMCO*CNRA] \frac{1}{CNVC}$$

where:

CNRS and CNRA are gas constants for steam and air respectively.

The relative humidity CNTDP of the containment building is obtained by dividing the vapor partial pressure CNPCS by the saturation pressure $P_{sat}$. The vapor partial pressure CNPCS is calculated as follows:

$$CNPCS = \frac{CNMSC*CNRS*(CNTC+460)}{CNVC}$$

The saturation pressure $P_{sat}$ is calculated from temperature by a three-straight-line-segment fit. The temperature used is a weighted average temperature between the air temperature and the wall temperature of the containment building.

It is understood that the various inventive features in the improved method and simulation system, may be implemented in either an analog, digital, or analog/digital with or without single or multiple computer apparatus. Also many of the features are applicable in the simulation of other pressurized water reactor plant arrangements, boiling water reactor plants, and gas and other nuclear plant arrangements. It is further understood, that with respect to the individual models, that the changing of one or more models in the simulator does not affect the system, method, or operation of other models in the simulator.

Reference is made to U.S. patent application bearing number Ser. No. 333,901 entitled "Training Simulator For a Nuclear Power Plant" and filed by G. L. Gregg, R. E. Putman and J. W. Gomola which is assigned to the present assignee and filed concurrently herewith; and which is incorporated herein by reference and made a part hereof.

What is claimed is:

1. An automated training simulator for the real-time dynamic operation of a nuclear power plant wherein such power plant has a reactor coolant system that normally circulates fluid in a forward direction through one leg of the system into a nuclear reactor and from the reactor through another leg into the primary side of a steam generator by means of a reactor coolant pump, and in which, the fluid at times circulates in either a forward or reverse direction while the pump is not in operation; said simulator comprising a control console having a plurality of command devices corresponding to plant control devices to generate input data; calculating means including sequence controlling means having the following components a. first means to generate a data value relating to direction of coolant flow for a reactor coolant system in accordance with the input data, b. second means to generate a data value relating to average specific volume for fluid in one leg of a representative coolant loop in response to one direction of flow, c. third means to generate a data value relating to average specific volume for fluid in another leg of the representative reactor coolant loop in response to input data relating to one direction of flow, d. fourth means to generate a data value relating to the average specific volume of fluid for the primary side of a representative steam generator, e. fifth means to generate a data value relating to total change in specific volume in accordance with the data value relating to specific volume for the representative steam generator and the legs of the representative coolant loop, f. sixth means to generate a data value relating to flow in the representative reactor loop in accordance with the generated change in the specific volume data value, and indicating means responsive to the generated data value relating to flow to monitor the operation of corresponding portions of the representative plant.

2. An automated training simulator according to claim 1 wherein the sequence controlling means includes g. means to generate data values relating to admittances and pressures for a representative valve position and reactor coolant pump operation, h. means to generate a data value relating to pump speed, i. means governed by the data values relating to pump speed and the average specific volume for the representative reactor coolant loop to generate a data value relating to coolant loop pressure; and wherein the data value relating to flow direction is generated in accordance with the generated data values relating to admittances and pressures.

3. An automated training simulator according to claim 2 wherein the calculating means includes a programmed digital computer.

4. An automated training simulator according to claim 1 wherein the calculating means includes a programmed digital computer.

5. An automated training simulator for the real-time dynamic operation of a nuclear power plant in which a reactor coolant system normally circulates fluid in a forward direction through one leg of the system into a nuclear reactor and from the reactor through another leg into the primary side of a steam generator by means of a reactor coolant pump, and in which the fluid at times circulates in either a forward or reverse direction while the pump is not in operation, said simulator comprising a control console with a plurality of command devices corresponding to distinct plant control devices operable to generate input data;

calculating means including sequence controlling means having the following components a. first means to generate a data value relating to direction of flow in accordance with the input data from the command devices, b. second means to generate a data value relating to enthalpy for each of a first and second location in one leg of the representative coolant loop, c. third means to generate a data value relating to enthalpy for each of a first and second location in the other leg of the representative coolant loop, d. fourth means to generate a data value relating to steam generator outlet enthalpy, e. fifth means to generate data values relating to pressure and flow in the representative coolant loop in accordance with data values including the generated data values relating to enthalpy; and indicating means governed by the generated data values relating to flow, pressure, and enthalpy to monitor the operation of the representative plant.

6. An automated training simulator according to claim 5 wherein the generation of the data values relating to enthalpy for the first location in one leg is governed by a data value relating to reactor vessel outlet enthalpy for one direction of flow and governed by steam generator outlet enthalpy for the opposite direction of flow.

7. An automated training simulator according to claim 6 wherein the data values are generated in a programmed digital computer.

8. An automated training simulator according to claim 5 wherein the generation of the data value relating to enthalpy for the second location of one leg is governed by a data value relating to steam generator inlet enthalpy for one direction of flow and governed by a dynamic energy balance for the opposite direction of flow.

9. An automated training simulator according to claim 8 wherein the data values are generated in a programmed digital computer.

10. An automated training simulator according to claim 5 wherein the generation of the data value relating to enthalpy for the first location of the other leg is governed by a data value relating to steam generator outlet enthalpy for one direction of flow and governed by a data value relating to reactor vessel inlet enthalpy for the opposite direction of flow.

11. An automated training simulator according to claim 10 wherein the data values are generated in a programmed digital computer.

12. An automated training simulator according to claim 5 wherein the generation of the data value relating to enthalpy for the second location of the other leg is governed by a data value relating to energy balance at the inlet of the representative reactor vessel for one direction of flow and is governed by a data value relating to energy balance at the outlet of the representative reactor vessel for the other direction of flow.

13. An automated training simulator according to claim 12 wherein the data values are generated in a programmed digital computer.

14. An automated training simulator according to claim 5 wherein the calculating means includes a programmed digital computer.

15. An automated training simulator for the dynamic operation of a nuclear power plant that includes a reactor coolant system in which a reactor coolant pump normally circulates a fluid in a reactor coolant loop through a nuclear reactor vessel and the primary side of a steam generator, and in which a pressurizer is connected to the reactor coolant loop to maintain the pressure of the fluid therein within predetermined limits, and depending on the operated condition of the plant, such pressurizer can contain steam and water, or water only; said training simulator comprising
a control console with a plurality of command devices corresponding to distinct plant control devices operable to generate input signals in accordance with desired plant operations;
calculating means governed by said input signals to generate input data values including data values relating to selected conditions of a representative reactor coolant system, said calculating means further including sequence controlling means having the following components a. first means governed by the input data values to generate data values relating to pressurizer fluid volume,
b. second means to compare data values relating to pressurizer fluid volume,
c. third means to generate data values relating to pressurizer physical values in accordance with a calculation relating to pressurizer water and steam data values when the compared volume data values are of a first predetermined relationship,
d. fourth means to generate data values relating to pressurizer physical values in accordance with a calculation relating to pressurizer water only data values when the compared volume data values are of a second predetermined relationship,
e. fifth means to generate data values relating to pressurizer physical values in accordance with a calculation relating to a transition from steam and water data values to water only data values when compared volumes change from the first to the second relationship,
f. sixth means to generate data values relating to pressurizer physical values in accordance with a calculation relating to the transition from pressurizer water only data values to pressurizer steam and water data values when the compared volumes change from the second to the first relationship; and
indicating means responsive to the generated physical values to indicate reactor coolant system pressure.

16. An automated training simulator according to claim 15 wherein the sequence controlling means further includes
a. means to compare a generated data value relating to a first volume of fluid with a data value relating to a predetermined volume of fluid subsequent to the generation of data values in accordance with the transition from pressurizer water only data values to pressurizer steam and water data values, and
b. means governed by the compared data values relating to volume to reduce iteratively a curve fit discontinuity when said data values correspond to the formation of pressurizer steam.

17. An automated training simulator according to claim 16 wherein the iteration generates a data value relating to steam mass in accordance with a change from a bulk modulus calculation to a steam table calculation.

18. An automated training simulator according to claim 17 wherein the data values are generated in a programmed digital computer.

19. An automated training simulator according to claim 16 wherein the calculating means includes a programmed digital computer.

20. An automated training simulator according to claim 15 wherein the data values relating to pressurizer water and steam is generated in accordance with a two phase model calculation, and the data value relating to pressurizer water only is generated in accordance with a bulk modulus calculation.

21. An automated training simulator according to claim 20 wherein the data values are generated in a programmed digital computer.

22. An automated training simulator according to claim 15 wherein the input data values include data values relating to the surge of water into and out of the representative reactor coolant system.

23. An automated training simulator according to claim 22 wherein the input data values relating to surge flow include data values relating to water enthalpy when said input data values relate to water surge into the representative reactor coolant system.

24. An automated training simulator according to claim 23 wherein the data values are generated in a programmed digital computer.

25. An automated training simulator according to claim 22 wherein the data values are generated in a programmed digital computer.

26. An automated training simulator according to claim 15 wherein the input data values include data values relating to flow and temperature of a representative containment spray system.

27. An automated training simulator according to claim 26 wherein the data values are generated in a programmed digital computer.

28. An automated training simulator according to claim 15 wherein the calculating means includes a programmed digital computer.

* * * * *